US010045327B2

(12) United States Patent
Lotter et al.

(10) Patent No.: US 10,045,327 B2
(45) Date of Patent: *Aug. 7, 2018

(54) MOBILE COMMUNICATION DEVICE MONITORING SYSTEMS AND METHODS

(71) Applicant: eAgency, Inc., Newport Beach, CA (US)

(72) Inventors: Robert A. Lotter, Las Vegas, NV (US); Timothy S. Allard, Sheridan, OR (US)

(73) Assignee: EAGENCY, INC., Newport Beach, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/138,174

(22) Filed: Apr. 25, 2016

(65) Prior Publication Data

US 2016/0242143 A1 Aug. 18, 2016

Related U.S. Application Data

(63) Continuation-in-part of application No. 14/228,040, filed on Mar. 27, 2014, now Pat. No. 9,324,074, (Continued)

(51) Int. Cl.
*H04M 1/66* (2006.01)
*H04W 68/12* (2009.01)
(Continued)

(52) U.S. Cl.
CPC .......... *H04W 68/12* (2013.01); *G06F 21/552* (2013.01); *G06F 21/554* (2013.01);
(Continued)

(58) Field of Classification Search
CPC ..... H04W 68/12; H04W 4/001; H04W 4/008; H04W 8/005; H04W 8/18; H04W 12/08;
(Continued)

(56) References Cited

U.S. PATENT DOCUMENTS 6,282,275 B1 8/2001 Gurbani et al.
6,345,361 B1 2/2002 Jerger et al.
(Continued)

*Primary Examiner* — Mong-Thuy Tran
(74) *Attorney, Agent, or Firm* — Haynes and Boone, LLP

(57) ABSTRACT

Systems and methods are directed to monitoring the communications to and from a mobile communication device in accordance with one or more embodiments. For example in accordance with an embodiment, data services on a mobile communication device, such as communications, application use, functionality, operability, and/or presence, may be monitored against rules available from a central data center repository. The rules may be enforced on the mobile communication device through a token device in short range wireless communications with the mobile communication device. Thus, the token device may prevent certain data services of the mobile communication device within a local area to the token device. An alert may be provided to an administrator when unauthorized data services are detected and/or a message may be sent to a third party to prevent the unauthorized activity.

38 Claims, 34 Drawing Sheets

Related U.S. Application Data which is a continuation-in-part of application No. 13/405,907, filed on Feb. 27, 2012, now Pat. No. 8,712,396, which is a continuation of application No. 12/014,494, filed on Jan. 15, 2008, now Pat. No. 8,126,456, which is a continuation-in-part of application No. 11/695,500, filed on Apr. 2, 2007, now Pat. No. 7,996,005.

(60) Provisional application No. 60/885,384, filed on Jan. 17, 2007.

(51) Int. Cl.

| | | |
|---|---|---|
| *H04W 4/00* | (2018.01) | |
| *H04W 8/00* | (2009.01) | |
| *H04W 12/12* | (2009.01) | |
| *H04W 4/50* | (2018.01) | |
| *H04W 4/80* | (2018.01) | |
| *G06F 21/55* | (2013.01) | |
| *G06F 21/62* | (2013.01) | |
| *G06Q 20/32* | (2012.01) | |
| *G06Q 20/40* | (2012.01) | |
| *H04L 29/06* | (2006.01) | |
| *H04M 3/22* | (2006.01) | |
| *H04M 15/00* | (2006.01) | |
| *H04W 12/08* | (2009.01) | |
| *H04W 24/08* | (2009.01) | |
| *H04M 1/725* | (2006.01) | |
| *H04W 8/18* | (2009.01) | |
| *H04W 24/00* | (2009.01) | |

(52) U.S. Cl.
CPC ...... *G06F 21/6218* (2013.01); *G06F 21/6272* (2013.01); *G06Q 20/3278* (2013.01); *G06Q 20/40* (2013.01); *H04L 63/102* (2013.01); *H04L 63/1408* (2013.01); *H04L 63/20* (2013.01); *H04M 3/2218* (2013.01); *H04M 3/2281* (2013.01); *H04M 15/47* (2013.01); *H04M 15/48* (2013.01); *H04M 15/58* (2013.01); *H04M 15/93* (2013.01); *H04W 4/001* (2013.01); *H04W 4/008* (2013.01); *H04W 4/50* (2018.02); *H04W 4/80* (2018.02); *H04W 8/005* (2013.01); *H04W 12/08* (2013.01); *H04W 12/12* (2013.01); *H04W 24/08* (2013.01); *G06F 2221/2151* (2013.01); *H04M 1/72577* (2013.01); *H04M 2250/60* (2013.01); *H04W 8/18* (2013.01); *H04W 24/00* (2013.01)

(58) Field of Classification Search
CPC ..... H04W 12/12; H04W 24/00; H04W 24/08; H04L 63/102; H04L 63/1408; H04L 63/20; H04M 3/2218; H04M 3/2281; H04M 15/47; H04M 15/48; H04M 15/58; H04M 15/93; H04M 1/72577; H04M 2250/60; H04M 1/66; G06F 2221/2151; G06F 21/552; G06F 21/554; G06F 21/6218; G06F 21/6272; G06C 20/3278; G06C 20/40
USPC .................................................. 455/410, 418
See application file for complete search history.

(56) References Cited

U.S. PATENT DOCUMENTS

| | | |
|---|---|---|
| 6,577,861 B2 | 6/2003 | Ogasawara |
| 6,785,515 B1 | 8/2004 | Sommer et al. |
| 6,959,182 B2 | 10/2005 | Lingafeldt et al. |
| 7,024,548 B1 | 4/2006 | O'Toole, Jr. |
| 7,046,782 B2 | 5/2006 | Miller |
| 7,076,041 B2 | 7/2006 | Brown et al. |
| 7,139,553 B2 | 11/2006 | Alston |
| 7,231,218 B2 | 6/2007 | Diacakis et al. |
| 7,257,228 B2 | 8/2007 | Wheeler et al. |
| 7,280,981 B2 | 10/2007 | Huang et al. |
| 7,327,837 B1 | 2/2008 | Harlow et al. |
| 7,418,089 B2 | 8/2008 | Tiliks et al. |
| 7,543,051 B2 | 6/2009 | Greifeneder et al. |
| 7,570,943 B2 | 8/2009 | Sorvari et al. |
| 7,684,792 B2 | 3/2010 | Lundblade et al. |
| 7,725,387 B1 | 5/2010 | Fitch et al. |
| 7,738,646 B2 | 6/2010 | Sundaram et al. |
| 7,761,381 B1 | 7/2010 | Fitch et al. |
| 7,814,163 B2 | 10/2010 | Lee et al. |
| 7,890,743 B2* | 2/2011 | Buchanan ............ G06F 15/16 340/539.23 |
| 7,984,074 B1 | 7/2011 | Becher et al. |
| 8,014,755 B2 | 9/2011 | Sun et al. |
| 8,027,448 B2 | 9/2011 | Jorasch et al. |
| 8,045,958 B2 | 10/2011 | Kahandaliyanage |
| 8,266,676 B2 | 9/2012 | Hardjono et al. |
| 8,683,333 B2* | 3/2014 | Garbow ............... G06Q 30/02 715/706 |
| 8,712,407 B1 | 4/2014 | Cope et al. |
| 9,324,074 B2* | 4/2016 | Lotter .................... H04L 63/20 |
| 2002/0021791 A1 | 2/2002 | Hellmann et al. |
| 2002/0067821 A1 | 6/2002 | Benson et al. |
| 2002/0143934 A1 | 10/2002 | Barker et al. |
| 2003/0076941 A1 | 4/2003 | Tiliks et al. |
| 2003/0130940 A1 | 7/2003 | Hansen et al. |
| 2004/0029569 A1 | 2/2004 | Khan et al. |
| 2004/0132436 A1 | 7/2004 | Dupont et al. |
| 2004/0208304 A1 | 10/2004 | Miller |
| 2005/0003804 A1 | 1/2005 | Huomo et al. |
| 2005/0086255 A1 | 4/2005 | Schran et al. |
| 2005/0113113 A1 | 5/2005 | Reed |
| 2005/0154688 A1 | 7/2005 | Bolt et al. |
| 2005/0166060 A1* | 7/2005 | Goldthwait ......... G06F 21/6218 713/182 |
| 2005/0188079 A1 | 8/2005 | Motsinger et al. |
| 2005/0282559 A1 | 12/2005 | Erskine et al. |
| 2006/0026108 A1 | 2/2006 | Wilson et al. |
| 2006/0080321 A1 | 4/2006 | Horn et al. |
| 2006/0144832 A1 | 7/2006 | Barnett et al. |
| 2006/0165060 A1* | 7/2006 | Dua ..................... G06Q 20/20 370/352 |
| 2006/0181411 A1 | 8/2006 | Fast et al. |
| 2006/0190473 A1 | 8/2006 | Ovsyannikov et al. |
| 2006/0209809 A1 | 9/2006 | Ellingham et al. |
| 2006/0287004 A1 | 12/2006 | Fuqua |
| 2007/0026842 A1 | 2/2007 | Haave et al. |
| 2007/0192865 A1 | 8/2007 | Mackin |
| 2007/0214088 A1 | 9/2007 | Graham et al. |
| 2008/0009268 A1 | 1/2008 | Ramer et al. |
| 2008/0064381 A1 | 3/2008 | Ackley |
| 2008/0112332 A1 | 5/2008 | Pepper |
| 2008/0134282 A1 | 6/2008 | Fridman et al. |
| 2008/0147452 A1 | 6/2008 | Renz et al. |
| 2008/0168135 A1 | 7/2008 | Redlich et al. |
| 2008/0201311 A1 | 8/2008 | Ertugrul et al. |
| 2008/0208748 A1 | 8/2008 | Ozment et al. |
| 2009/0098825 A1 | 4/2009 | Huomo et al. |
| 2009/0132718 A1 | 5/2009 | Groll et al. |
| 2009/0171805 A1 | 7/2009 | Gould et al. |
| 2009/0254993 A1 | 10/2009 | Leone |
| 2010/0251329 A1* | 9/2010 | Wei ..................... H04L 63/1408 726/1 |
| 2012/0124658 A1* | 5/2012 | Brudnicki ............. G06F 21/34 726/9 |
| 2012/0296919 A1* | 11/2012 | Sinha .................... H04L 67/22 707/749 |
| 2013/0036048 A1* | 2/2013 | Campos ............... G06Q 20/36 705/41 |
| 2013/0079037 A1* | 3/2013 | Dobyns ............... H04W 4/008 455/456.3 |

(56) References Cited

U.S. PATENT DOCUMENTS

| | | | | |
|---|---|---|---|---|
| 2014/0025958 A1* | 1/2014 | Calman | G06Q 20/3224 | 713/189 |
| 2014/0137206 A1* | 5/2014 | Hansmann | H04W 12/08 | 726/4 |
| 2014/0259093 A1* | 9/2014 | Narayanaswamy | H04L 67/20 | 726/1 |
| 2014/0380425 A1* | 12/2014 | Lockett | H04L 63/20 | 726/4 |
| 2015/0348018 A1* | 12/2015 | Campos | G06Q 20/36 | 705/41 |
| 2016/0127900 A1* | 5/2016 | John Archibald | H04W 12/06 | 726/7 |
| 2017/0046679 A1* | 2/2017 | Gotlieb | G06Q 20/20 | |
| 2017/0262391 A1* | 9/2017 | Mankovskii | G06F 13/20 | |

\* cited by examiner

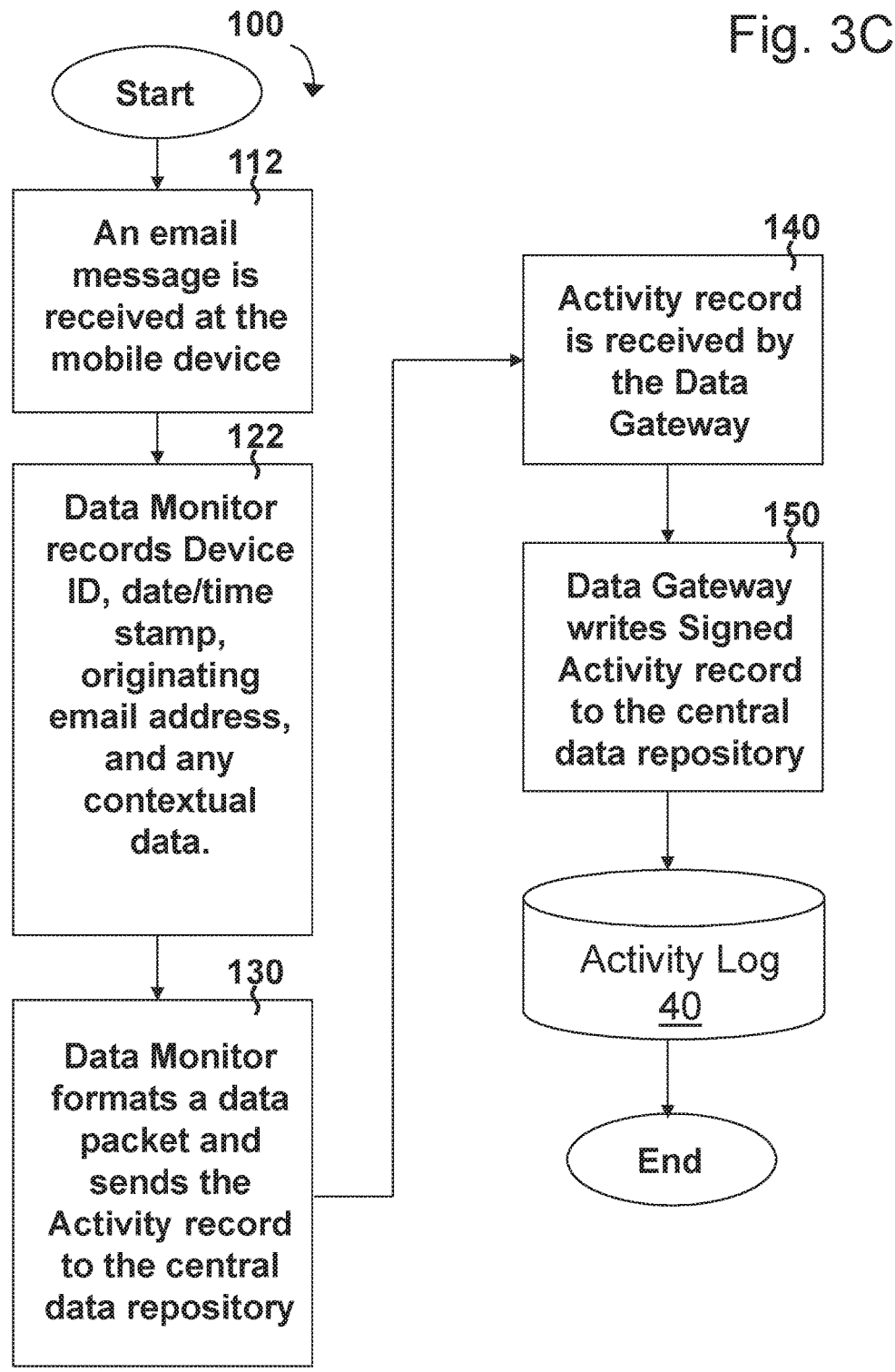

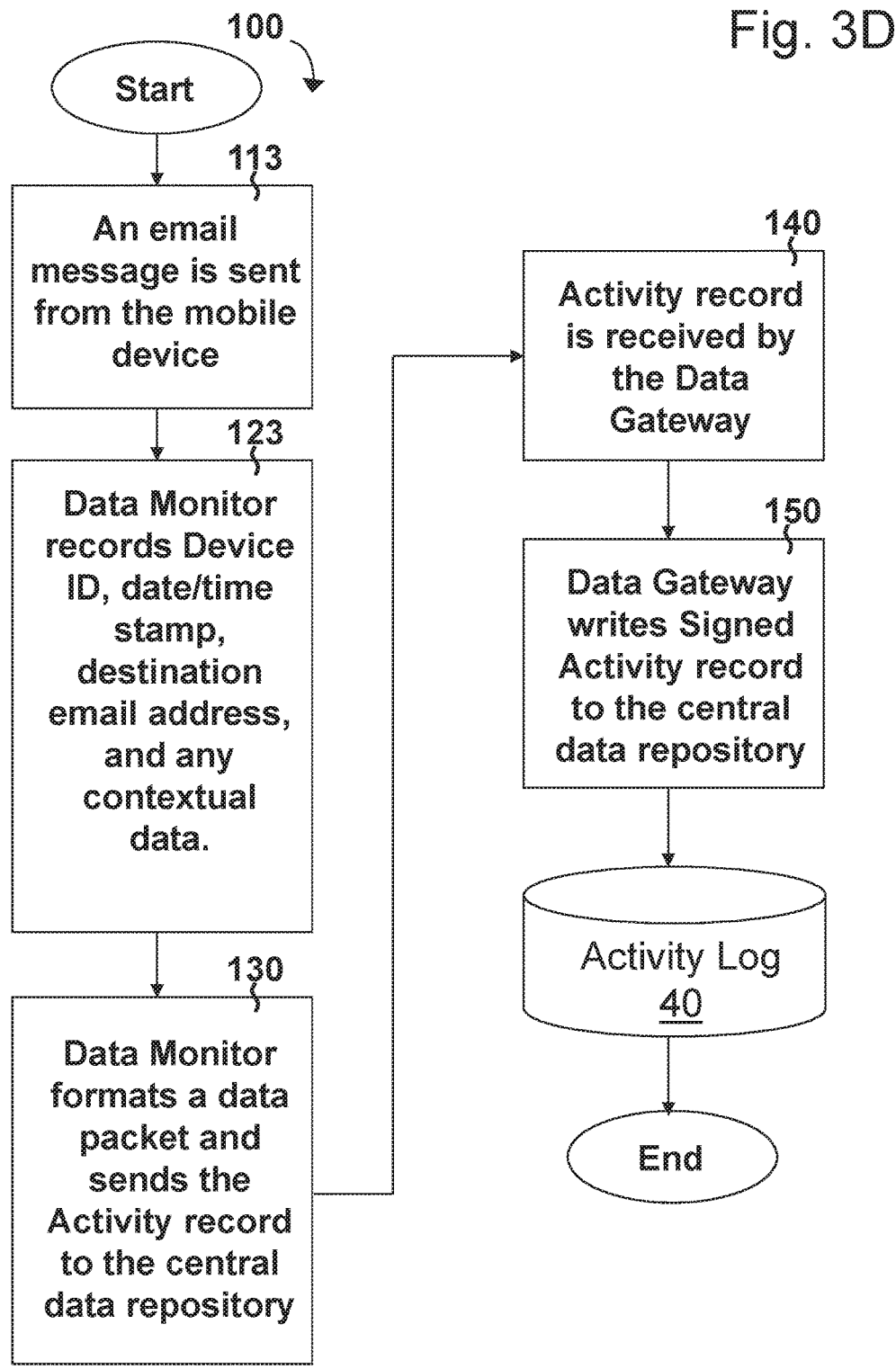

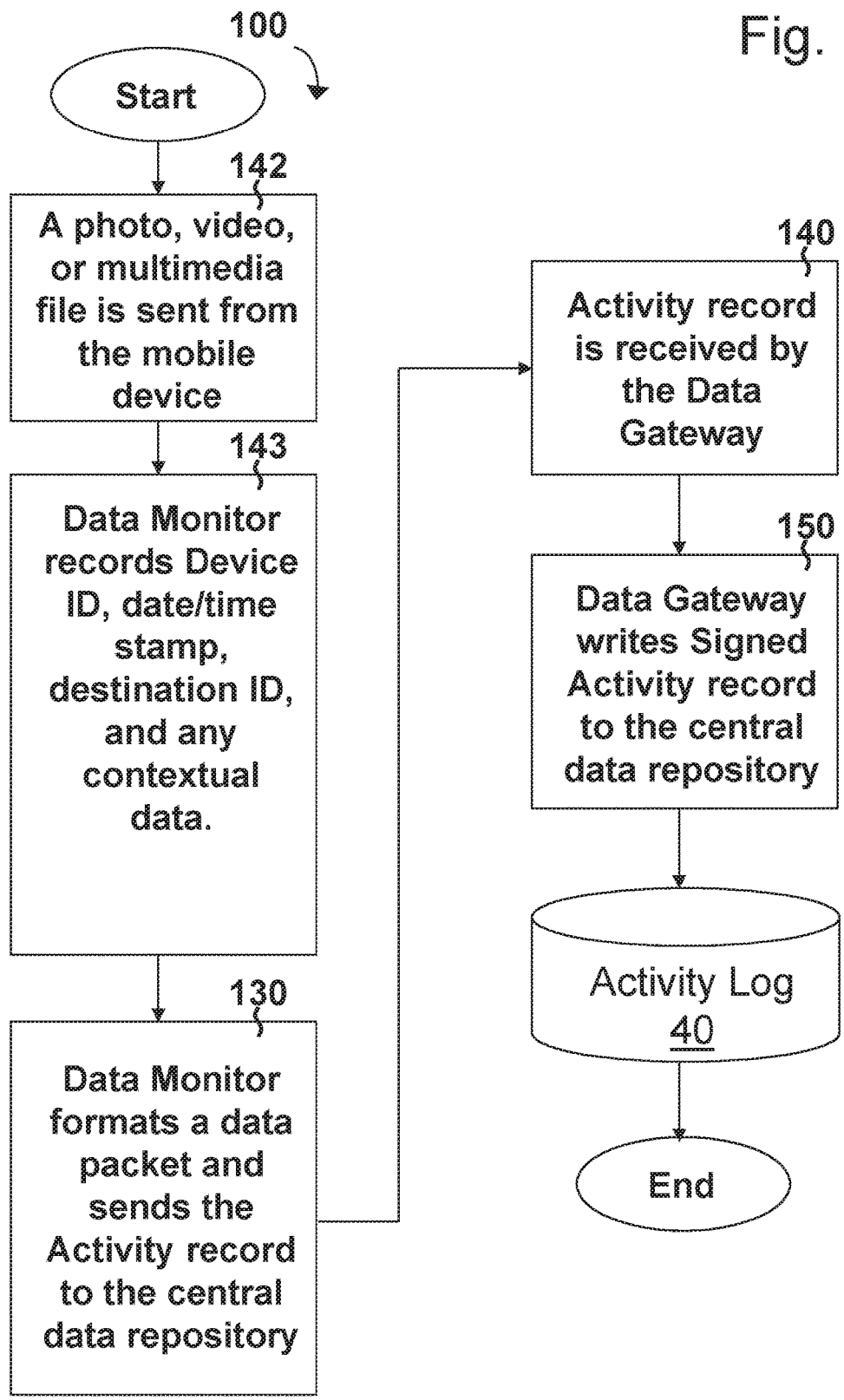

Fig. 4A

Activity Log 40

| Record ID | Acct ID | Msg Type | In/Out | Start Time | End Time | CallerID | Log |
|---|---|---|---|---|---|---|---|
| 100 | 200 | Wallet | In | 23:51:01 1/1/2007 | | John Doe | $28.50 – Debit Card 1 |
| 101 | 200 | Phone | Out | 22:42:01 1/1/2007 | 22:45:56 1/1/2007 | 213-555-1212 | |
| 102 | 201 | SMS | In | 22:35:26 1/1/2007 | | 909-123-1234 | Meet me at 4... |
| 103 | 200 | Email | Out | 18:15:21 1/1/2007 | | john@acme.com | Want a better... |
| 104 | 202 | IM | Out | 16:12:09 1/1/2007 | | mypal12 | Hey John... |
| 105 | 202 | Phone | In | 14:20:12 1/1/2007 | 14:36:41 1/1/2007 | 605-852-9797 | |
| 106 | 203 | Email | In | 10:51:32 1/1/2007 | | alice@mx.com | Thanks for calling... |

Fig. 4B

Activity Log 40

| Record ID | Long | Lat | CRC | Auth | Auth ID | Carrier Log Auth |
|---|---|---|---|---|---|---|
| 100 | 33.6235 | 117.8644 | 132132 | Bio | 1101 | N/A |
| 101 | 58.1254 | 111.2154 | 321354 | Password | 1110 | ATT 1235468 |
| 102 | 14.2135 | 25.6448 | 31654 | N/A | N/A | Verizon 123546 |
| 103 | 94.6548 | 96.3215 | 65465496 | Password | 1101 | Rogers 2165468 |
| 104 | 15.1245 | 11.2154 | 2135468 | Bio | 1221 | N/A |
| 105 | 13.2154 | 52.3164 | 3213546 | Bio | 1385 | Sprint 54687978 |
| 106 | 23.1524 | 94.2546 | 032165 | Bio | 2546 | AllTel 24657685 |

Fig. 5

Permissions 50

| Record ID | Acct ID | Data Service | Allow | Deny | Alert Type | Alert Number |
|---|---|---|---|---|---|---|
| 100 | 200 | Email | True | False | Email | alice@acme.com |
| 101 | 200 | Phone | True | False | SMS | 909-123-1234 |
| 102 | 200 | SMS | False | True | Email | alice@acme.com |
| 103 | 201 | Email | True | False | Email | joe@abc.com |
| 104 | 201 | Email | True | False | SMS | 605-852-9797 |
| 105 | 201 | IM | True | False | SMS | 605-852-9797 |
| 106 | 201 | SMS | True | False | Email | john@mx.com |
| 107 | 202 | Wallet | True | False | SMS | 987-123-1234 |

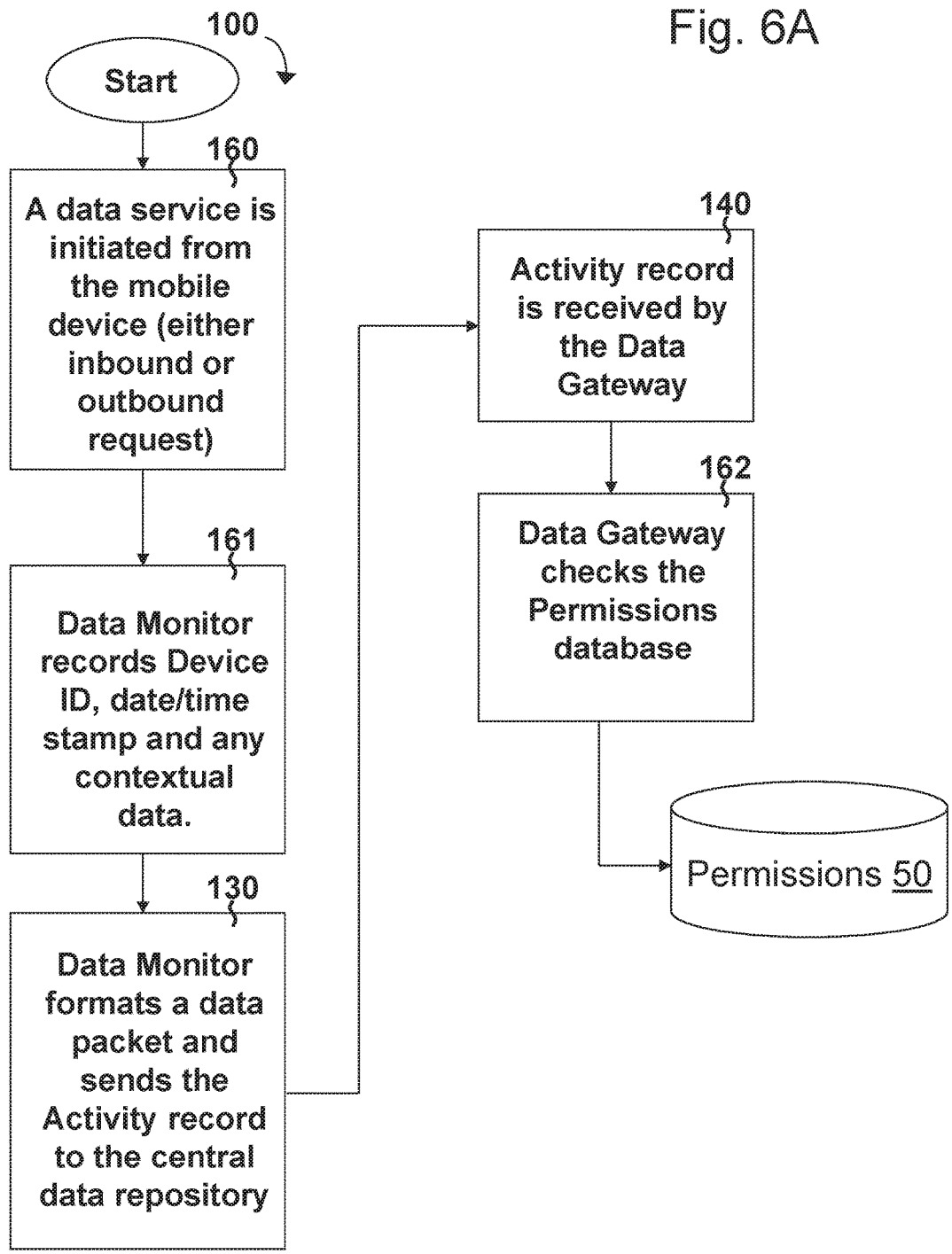

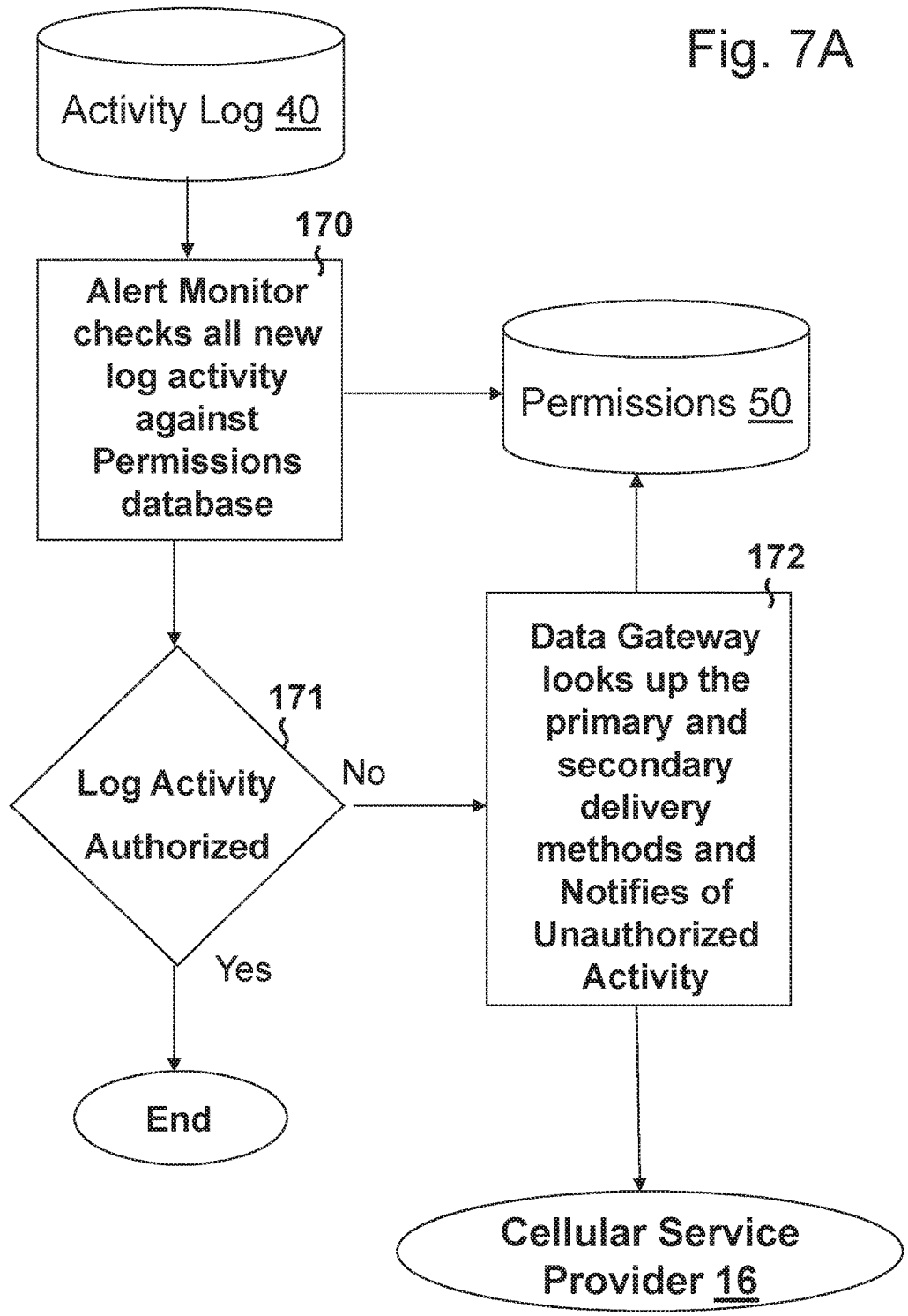

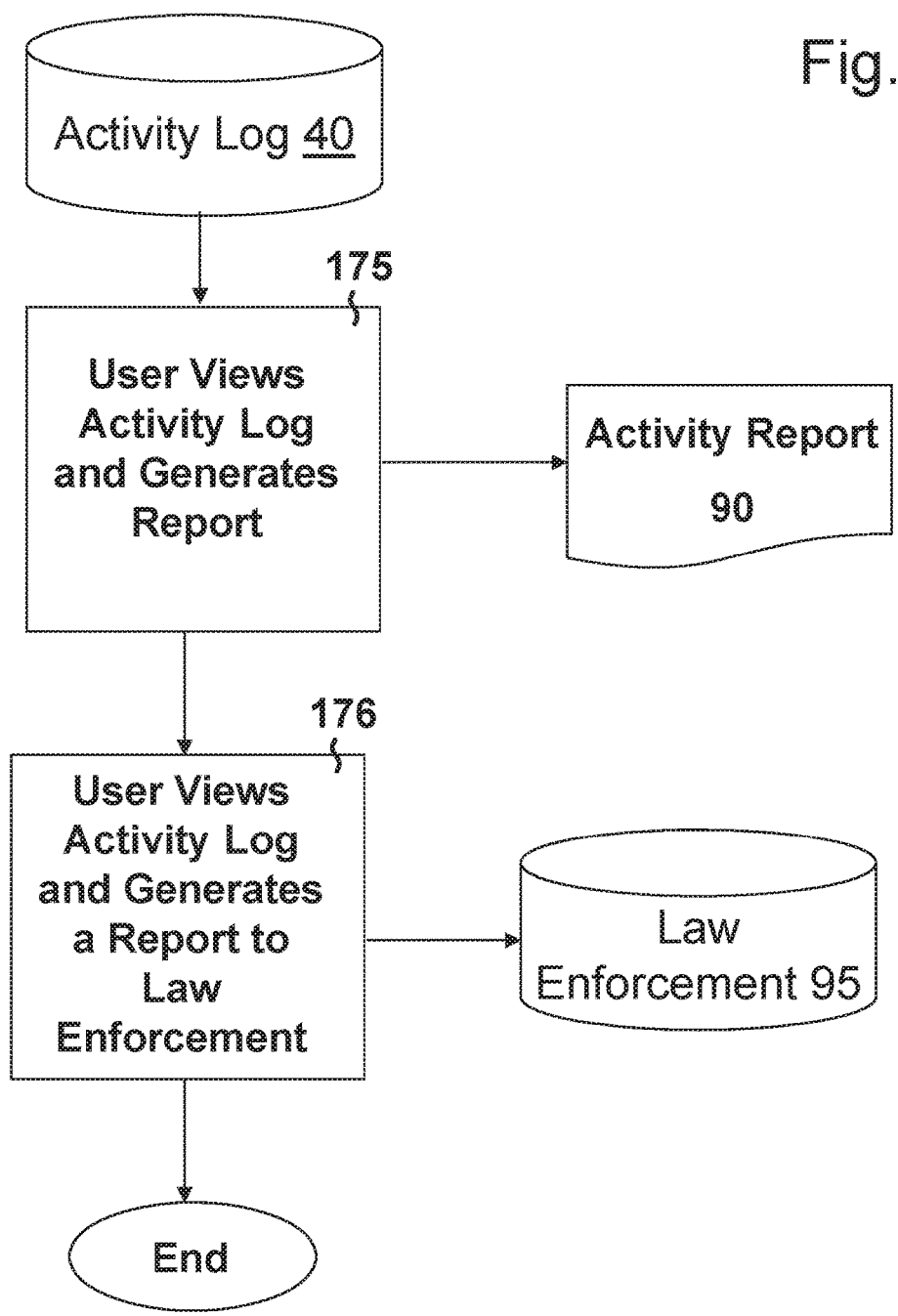

MOBILE COMMUNICATION DEVICE MONITORING SYSTEMS AND METHODS

CROSS-REFERENCE TO RELATED APPLICATIONS

This Patent Application is a Continuation-In-Part Patent Application claiming priority to and the benefit of U.S. patent application Ser. No. 14/228,040 filed Mar. 27, 2014, which is a Continuation-In-Part Patent Application claiming priority to and the benefit of U.S. patent application Ser. No. 13/405,907 filed Feb. 27, 2012, now U.S. Pat. No. 8,712,396 issued Apr. 29, 2014, which is a Continuation-In-Part Patent Application claiming priority to and the benefit of U.S. patent application Ser. No. 12/014,494 filed Jan. 15, 2008, now U.S. Pat. No. 8,126,456 issued Feb. 28, 2012, which is a Continuation-In-Part Patent Application claiming priority to and the benefit of U.S. patent application Ser. No. 11/695,500 filed Apr. 2, 2007, now U.S. Pat. No. 7,996,005 issued Aug. 9, 2011, both of U.S. patent application Ser. No. 12/014,494 and U.S. patent application Ser. No. 11/695,500 claiming priority to and the benefit of U.S. Provisional Patent Application No. 60/885,384 filed Jan. 17, 2007, which are all incorporated herein by reference in their entirety.

TECHNICAL FIELD

The present invention relates generally to communication systems and, more particularly, to mobile communication devices and systems and methods for monitoring the communication devices.

BACKGROUND

Near Field Communication (NFC) allows a communications channel to be opened between two phones by touching them together or by touching the phone to a terminal (ie. a debit/credit card reader at a grocery checkout stand). GSM Association members have conducted trials throughout the world using NFC and are now starting to commercially launch the technology. It is expected that most new smartphones will soon be enabled with NFC capabilities. Similar to GPS chips and the enabling of location based services, it will take several years before applications and infrastructures are developed to take advantage of these new capabilities. In November 2010, AT&T®, Verizon® and T-Mobile® launched a joint venture (ISIS) to develop a single platform for mobile payments based on NFC.

It is expected that marrying NFC technology with existing smart phone technology will provide for a multitude of additional functionalities. For example, payments may be made by simply touching the phone to a terminal at checkout or another NFC enabled phone. In other embodiments, devices may be linked and perform various processing functions utilizing NFC or other short range wireless communications.

However, in some situations, both smart phone and NFC technologies, singly and in combination, may allow undesirable access to a device and/or device uses/features by a user. Conventional systems to limit device use and functionality, or alert other users of undesirable or restricted device use or presence, are limited in scope and availability.

For example, some application stores and devices can control the content presented to an end user through the use of age classifications such as Teen, Mature, PG13, etc. However, this approach can be impractical for many reasons. For example, it is common for teens to state that they are older than they are to gain access to adult features on social networks and devices can be passed down from parent to child. Similarly, certain environments may wish to restrict access to various users, applications, and device functionalities, such as sensitive work environments, restricted access locations, and areas having safety issues. Malicious and abusive users have found many inventive workarounds to traditional device detection systems, such as tin foil to block GPS tracking or WiFi/Cell Tower "man in the middle" spoofing to intercept and circumvent security protocols. Low cost alternatives may be desirable to prevent device usage or particular device features and/or applications in limited cases. For example, many states have passed safety laws restricting device use while operating a vehicle. However, such laws may be difficult to enforce by parents and guardians, who may only rely on their child's promise to comply and traditional policing efforts to enforce such laws.

There is thus a need in the art for improved systems and methods for monitoring device communications, application use, functionality, and presence.

SUMMARY

Systems, methods, and program products are disclosed, in accordance with one or more embodiments of the present invention, which are directed to monitoring device communications, application use, functionality, operability, and/or presence, such as those associated with a mobile smart phone or other mobile communication device, using limited use devices and/or tokens, which may be a smart, portable, NFC, RFID, or other short range wireless communication chip (e.g., Bluetooth or Bluetooth Low Energy). For example in accordance with an embodiment, each of the data services, applications, and/or hardware features installed on a wireless device, such as a cell phone, a Smartphone, or a personal digital assistant (PDA), tablet, or other device may be monitored against one or more permissions (e.g., rules) stored in a central repository.

In some embodiments, an administrator may be provided with the ability to monitor and restrict access to presence, utilization, and/or communications of a communication device. An administrator may be a parent, a work supervisor, a security service administrator, or a network administrator (as examples).

In this regard, various embodiments of the present disclosure allow for permission rules to be set for a mobile communication device, where the permission rules affect the device communications, application use, functionality, operability, and/or presence of a mobile device within an area. Thus, the aforementioned device services uses may be limited based on permission rules related to desired or undesirable use of the mobile device. The use may further be related to an activity associated with or using the mobile device, such as a location of use of the mobile device, a time of use of the mobile device, or application/hardware features initiated, in use, or available with the mobile device.

In order to affect the mobile communication device with these permission rules, the rules may be generally communicated to the communication device. However, in order to affect a mobile device in a more limited manner, such as based on location, load the permission rules to the device locally where the rules may not previously be installed on the device, or to detect the device usage, presence, or operation, a token device may be utilized, such as a wireless beacon device. The token device may connect to the mobile device over short range wireless communications, such as radio frequencies using RFID, NFC communications, Bluetooth Low Energy, or other communication protocol. The token device may further include a memory storing information necessary to provide the permission rules to the mobile device. For example, the permission rules may be directly stored to the token device, or an identifier (ID) may be stored to the token device, where the identifier is used to retrieve permission rules by the mobile device from a service provider or otherwise cause the service provider to configure the mobile device.

The mobile device may be configured with the permission rules to either allow use or disallow use of applications, features, hardware, and/or other operability functions of the mobile device. Thus, where the mobile device is disallowed from certain functionality during certain activities using the mobile device, the permission rules may prevent such use. Similarly, if the activities using the mobile device currently allow certain functionalities, such uses may be activated and/or downloaded to the mobile device. Moreover, based on the presence and/or use of the mobile device during certain activities, as well as the data services use during the activities, another device, such as one of a parent, supervisor, or other administrator may be alerted. Such alerts may further include the location of the mobile device to allow for quick retrieval and resolution of use issues.

In this regard, the token device may be mounted in a localized area, where the token device may affect mobile devices within a proximity around the token device, such as a designated area. For example, the token device may be mounted to a secure file cabinet, a room, a vehicle or sub-area of the vehicle, or other area where control of a device and/or detection of the device may be desirable. Thus, the token device may utilize short range wireless communications within the proximity to only affect devices entering and within the proximity. An administrator may set permission rules for allowed application use, functionality, operability, and/or presence of the mobile device specific to the proximity for the token device. The permission rules may then be pushed to the mobile device by the token device or otherwise used to configure the mobile device on detection of the mobile device by the token device Additionally, a parent or other administrator may be provided with the ability to monitor mobile access and/or use. The parent or administrator may authorize or otherwise approve the use of a particular device, and set rules as to which type of applications can be accessed and/or utilized. The device and/or one or more associated and/or unassociated calls, text messages or Internet accesses can each be an IDENTITY that is being blocked, monitored or alerted by the system using rules to restrict access to content based on a classification.

Additional rules can be applied to alert and/or restrict or block access to the device and/or application based on a geographical location (sometimes referred to as a geo location or geo stamp), a proximity to the device, a time of day, single purchase thresholds, weekly purchase thresholds, content based on classification, alerts generated when the account balance goes below a certain threshold, and/or other suitable rules for monitoring, blocking, or restricting content.

In accordance with some embodiments, security protocols may be provided to the end user in the event of a lost or stolen phone including the ability for the user or an administrator to remotely wipe the device, log and alert the geo location whenever the device or application is used, or obtain any combination of services and events (e.g., time, threshold, communication, etc.) being monitored by the system. This type of real-time monitoring of a user's (e.g., a child's or an employee's) device may provide real-time monitoring and security to parents and administrators without requiring broad based, simultaneous access to other location specific security systems.

Data services may include all forms of communications between the device and a third party including, for example, cellular voice calls, short message service (SMS) text messages, email, instant messaging sessions, and/or the applications used by the data services including, for example, the digital wallet, address book, calendar, and/or tasks maintained on the wireless device. In accordance with some embodiments, monitoring may be performed for a multitude of communication protocols for sending or receiving data including, for example, protocols associated with cellular networks, personal identification number (PIN)-to-PIN messaging, Wi-Fi standards, Bluetooth standards, Personal Area Networks, Near Field Communication, Local Area Networks, and/or Public Networks.

According to some embodiments of the present invention, a user may specify the permissions for each data service associated with a wireless device. The user may specify whether use of the service is allowed or denied for any identity that is not currently in the permissions for the device. In addition to the forensic information collected and stored regarding the communication transaction, an embodiment of the present invention collects, stores, and analyzes the contextual information contained within the data including financial transactions, text, files, pictures, audio, location, hardware, use, and/or all other manner of digital and analog content transmitted between a mobile communications device and a third party.

In accordance with some embodiments of the present invention, systems, methods, and program products are disclosed that alerts the user whenever an unauthorized activity is detected. For example, the user may specify one or more methods of notification including email, SMS text message, voice call, and/or any other publicly accepted machine-to-machine communications protocol to alert the user whenever an unauthorized activity is detected. In general in accordance with some embodiments, the type of unauthorized activity being monitored may include any form of information transmission and/or reception (e.g., of audio, photo, video, textual data, or multimedia information), any type of change to the wireless data device, any form of financial transaction transmission and/or reception (e.g., a transaction recipient, a transaction originator, an amount threshold by account used, a time of day, a geo location, or other aspect of a financial transaction), and/or device presence or hardware operability (e.g., unauthorized devices in an area, usage of device cameras in the area, etc.). Similarly in accordance with some embodiments, the user notification of unauthorized activity may be provided in any form of communication, including for example audio, photo, video, textual data, and/or multimedia information.

More specifically in accordance with one or more embodiments of the present invention, a client application installed on a mobile communications device, such as for example a cell phone, PDA, or tablet transmits detailed device usage information using a wireless data connection from the device to a central repository accessible from a network (e.g., the Internet). For example, monitoring of device usage may include such things as inbound or outbound phone calls, inbound or outbound SMS Text Messages, inbound or outbound Instant Messages, Web Browser Access, Address Book changes (e.g., Adds, Modifications, and/or Deletions), Calendar Appointment changes (e.g., Adds, Modifications, and/or Deletions), Tasks changes (e.g., Adds, Modifications, and/or Deletions), changes to the installed applications on the device (e.g., Adds, Modifications, and/or Deletions), and/or inbound or outbound multimedia files.

In addition to the client application in accordance with one or more embodiments of the present invention, a web-based monitoring application, which is controlled by an administrative user such as for example a parent or manager, monitors the contents of the central repository. For example, based on rules selected by the administrative user, the device usage is allowed, denied, and/or an alert is sent to the administrative user notifying them of an unauthorized event. In accordance with some embodiments of the present invention, existing location services (e.g., GPS, cell-based location applications, or network-based location applications) may be employed to include the monitoring and alerting of the physical location of the device. Furthermore in accordance with some embodiments, the information stored in the central repository may be signed and/or encrypted to provide secure storage and authentication, such as for chain of custody or other evidentiary reasons.

Moreover, a token device may be used to limit the use of the mobile communication device, as well as alert a parent or administrator of the use or presence of the mobile communication device, within an area around the token device. The token device may use short range wireless communication to communicate with the mobile communication device. Additionally, the token device may be used to configure the mobile communication device with the permission rules based on connection to the mobile communication device.

In accordance with one embodiment of the present invention, a system includes memory configured to store programs and database information; a processor, coupled to the memory, configured to access the database information and run the programs; and a communication gateway, coupled to the processor and the memory, configured to receive information on data service use and activities of a mobile, wireless, communication device being monitored by the system. The database information may include an activity log database configured to store an entry such as a signed entry for each data service use received from the mobile, wireless, communication device; and a permissions database configured to store rules as to whether the data service use is allowed for the mobile, wireless, communication device. The programs may include an alert monitor program configured to compare the entry for each of the data service uses and activities stored in the activity log database to the rules stored in the permissions database and provide an alert if the data service use of the mobile, wireless, communication device is not allowed.

In accordance with another embodiment of the present invention, a mobile communications device includes a memory configured to store programs and data; a processor, coupled to the memory, configured to run the programs stored in the memory; a communications port configured to wirelessly communicate with a data center; and wherein the programs include a monitoring program configured to monitor data service uses and activities of the mobile communications device and compile information of the data service uses and activities for transmission to the data center via the communications port, wherein the data service uses comprise inbound and outbound activity between the mobile communications device and a third party and changes to the data stored in the memory.

In accordance with another embodiment of the present invention, a method of monitoring a mobile communication device includes storing rules associated with data service uses and activities for the mobile communication device; receiving information for one of the data service uses and activities from the mobile communication device; optionally signing the information; storing the (signed or unsigned) information for the data service use; checking the data service use to the corresponding rule associated with the data service use; and providing an alert if the data service use is unauthorized based on the corresponding rule.

In accordance with another embodiment of the present invention, a method of monitoring a mobile communication device includes monitoring data service uses and activities of the mobile communication device; compiling information of one of the data service uses; and transmitting the information of the data service use to a data center (to sign and store the information in some embodiments), wherein the data service uses comprise inbound and outbound activity between the mobile communications device and a third party and changes to data stored in the mobile communication device.

In accordance with another embodiment of the present invention, a computer-readable medium is disclosed on which is stored a computer program for performing a method of monitoring a mobile communication device, the method includes storing rules associated with data service uses and activities for the mobile communication device; receiving information for one of the data service uses from the mobile communication device; storing the information (e.g., with a signature in some embodiments) for the data service use; checking the data service use to the corresponding rule associated with the data service use; and providing an alert if the data service use is unauthorized based on the corresponding rule.

In accordance with another embodiment of the present invention, a computer-readable medium is disclosed on which is stored a computer program for performing a method of monitoring a mobile communication device, the method includes monitoring data service uses and activities of the mobile communication device; compiling information of one of the data service uses; and transmitting the information of the data service use to a data center to, if desired, store with a digital signature, wherein the data service uses comprise inbound and outbound activity between the mobile communications device and a third party and changes to data stored in the mobile communication device.

In accordance with another embodiment of the present invention, a system includes a service provider configured to provide a network to support communications for a plurality of mobile communications devices; and a network data monitor associated with the service provider and configured to monitor communications of the plurality of mobile communications devices communicating through the service provider and generate monitoring information to provide to a data center, the monitoring information including information on data services uses and activities of the mobile communications devices. The data services uses, for data services associated with each mobile communications device, include inbound and outbound communications of the mobile communications device; any additions, modifications, and/or deletions within the mobile communication device of applications; and any additions, modifications, and/or deletions within the mobile communication device to application data, and/or any incoming or outgoing data services uses associated with a mobile or digital wallet application. The data services uses may further include any attempt by an application to access privileged user information within the mobile communications device.

In accordance with another embodiment of the present invention, a system includes a data center having a memory configured to store programs and database information; a processor, coupled to the memory, configured to access the database information and run the programs; a communication gateway, coupled to the processor, configured via a service provider to receive information, including contextual information, on data services uses and activities of mobile communications devices, being monitored by the data center. The service provider includes a network data monitor configured to monitor each data service use for each mobile communications device; compile the monitoring information associated with each data service use for each mobile communications device; and provide the monitoring information associated with each data service use for each mobile communications device to be received by the communication gateway. The data services uses, for data services associated with the mobile communications device, inbound and outbound communications of the mobile communications device; and any addition, modification, and/or deletion within the mobile communications device to application data, wherein the information associated with the data services uses comprise message information for a message application data service use, including at least one of associated originating or destination email address, username, or telephone number along with contextual data. The data base information includes an activity log database configured to store an entry for each data service use based on the monitoring information, including contextual information, received from the mobile communications device; and a permissions database configured to store rules as to whether each data service use is allowed for the mobile communications device. The programs may include an alert monitor program configured to compare the entry for each data service use stored in the activity log database to the associated rule stored in the permissions database and to provide an alert if the data service use of the mobile communications device is not allowed.

In accordance with another embodiment of the present invention, a mobile communications device includes a first memory configured to store mobile programs and mobile data; a first processor, coupled to the first memory, configured to run the mobile programs stored in the first memory; and a first communications port configured to wirelessly communicate with a data center via a service provider. The mobile programs include a data monitor program configured to monitor data services uses and activities of the mobile communications device; compile information, including contextual information, of the data services uses; and transmit the information to the data center via the communications port and the service provider. The information includes an address book information for an address book application data service use, including date/time stamp and contextual data associated with the address book addition, modification, and/or deletion; calendar information for a calendar application data service use, including date/time stamp and contextual data associated with the calendar addition, modification, and/or deletion; and/or task information for a task application data service use, including date/time stamp and contextual data associated with the task addition, modification, and/or deletion; and or transaction information for a mobile wallet application data service use.

In accordance with another embodiment of the present invention, a method, of monitoring a mobile communications device communicating via a service provider, includes storing rules associated with data services uses for the mobile communications device at a data center, wherein the data services uses, for data services associated with the mobile communications device, include inbound and outbound communications of the mobile communications device; any additions, modifications, and/or deletions within the mobile communications device to applications; and any additions, modifications, and/or deletions within the mobile communications device to application data. The method further includes receiving monitoring information, including the corresponding contextual information, for one of the data services uses of the mobile communications device, the monitoring information generated by a network data monitor associated with the service provider; storing the monitoring information for the data service use; checking the data service use based on the monitoring information to the corresponding rule associated with the data service use; and providing an alert if the data service use is unauthorized based on the corresponding rule.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIGS. 4A-4B illustrate an exemplary table representation of the Activity Log database of FIG. 1 in accordance with an embodiment of the present invention.

FIG. 5 is an exemplary table representation of the Permissions database of FIG. 1 in accordance with an embodiment of the present invention.

FIGS. 6A-6C illustrate exemplary flowcharts where the data service on a wireless device is processed or blocked based on the contextual information being passed through the data service in accordance with an embodiment of the present invention.

FIGS. 7A-7B illustrate exemplary flowcharts of the Alert Monitor tool of FIG. 1 in accordance with an embodiment of the present invention.

FIG. 8 illustrates an exemplary flowchart of a reporting process such as the Reporting tool in accordance with an embodiment of the present invention.

Embodiments of the present invention and their advantages are best understood by referring to the detailed description that follows. It should be appreciated that like reference numerals are used to identify like elements illustrated in one or more of the figures.

DETAILED DESCRIPTION

Figure 1:
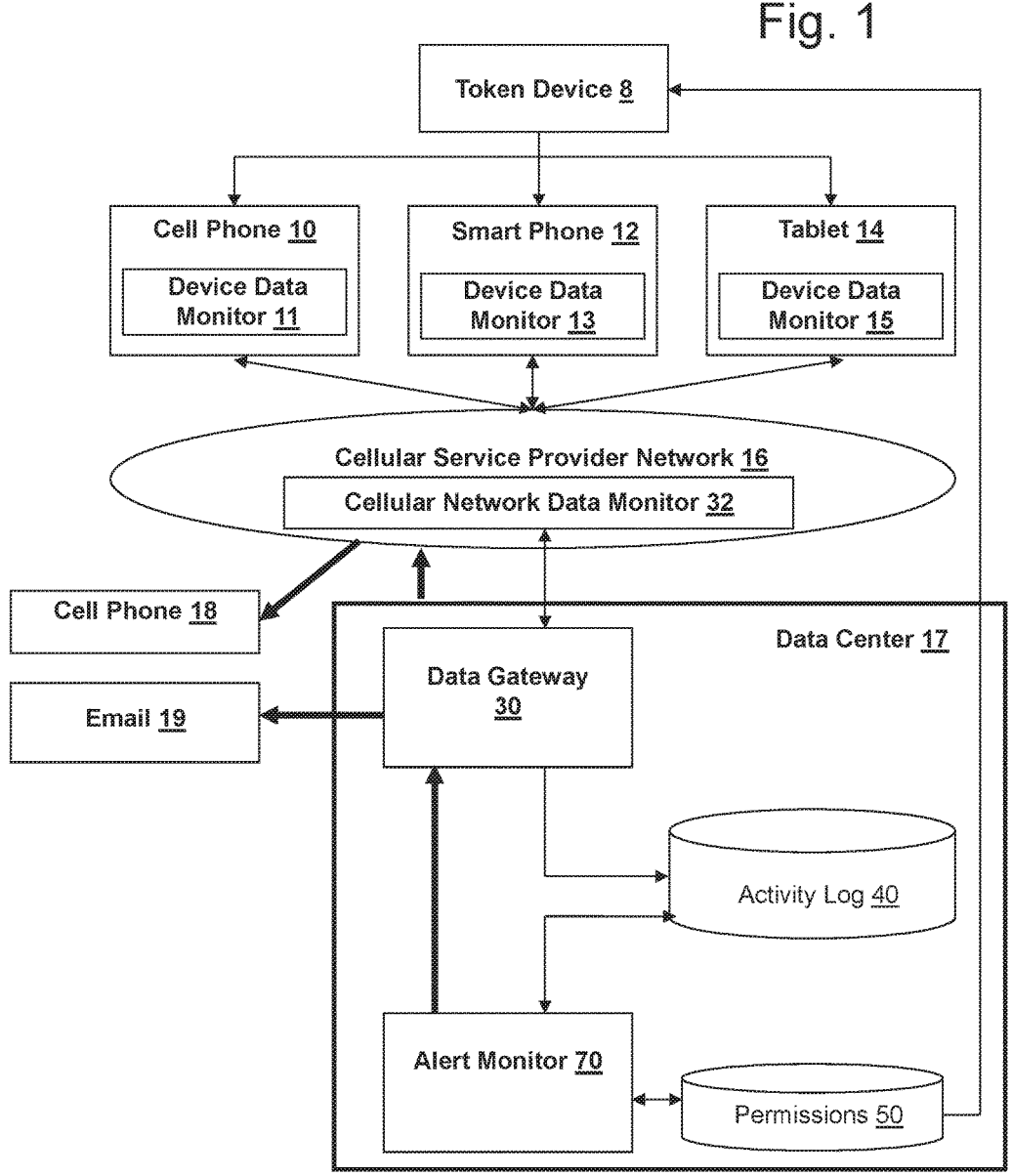
FIG. 1 is a block diagram of a system including a Data Monitor tool to monitor the activities on a wireless device via the device or from the carrier network, a Data Gateway for collecting the activity on a wireless device, and an Alert Monitor in accordance with an embodiment of the present invention.

FIG. 1 illustrates a Data Gateway program tool 30 and wireless devices 10, 12, and 14 represent users whose activities are monitored, restricted, and/or allowed according to an embodiment of the present invention. Each of the devices 10, 12, and 14 may include a respective Device Data Monitoring program tool 11, 13, and 15 which communicates with the Data Gateway 30. For example, wireless devices 10, 12, and 14 include memory and a processor configured to run various programs (e.g., software applications) stored in the memory, including respective Data Monitoring program tools 11, 13, and 15.

Data services and activities used on the wireless devices 10, 12, and 14 are monitored for activity by their respective Data Monitoring program tool 11, 13, and 15 or the Cellular Network Data Monitor 32 located within the Cellular Service Provider Network 16 which communicates (e.g., via a communication port such as through a wireless communication gateway having an antenna) to the Data Gateway 30 via a wireless data connection such as provided by a cellular service provider 16. Alternatively, the devices 10, 12, and 14 may send their activity information through any available communications network (e.g., any standards or protocols) including for example PIN-to-PIN, Wi-Fi, Bluetooth, Personal Area Networks, Near Field Communication, Local Area Networks, and/or Public Networks (e.g., cellular networks, satellite networks, and/or the Internet).

As described in more detail below, the Data Gateway 30 maintains an Activity Log 40 database in a Data Center 17. Activity Log 40 contains an entry for each use of a data service on wireless devices 10, 12, and 14. As described in more detail below, Data Center 17 also contains a Permissions 50 database that lists the wireless devices to be monitored (e.g., wireless devices 10, 12, and 14) and the rules to apply to allow, deny, and/or alert of data service activity occurring on the wireless devices being monitored.

An Alert Monitor 70 program waits for new entries to be made into Activity Log 40. Each new entry is checked against the Permissions 50 database. Whenever unauthorized activity is detected, Alert Monitor 70 sends an alert to one or more users via Data Gateway 30, such as for example to a cell phone 18 using SMS Text Messaging or an Email 19 account. The preferred method of notification may be maintained in the Permissions 50 database which can support many forms of data communications including voice messages, SMS Text Messages, email, and/or any other publicly accepted machine-to-machine communications protocol.

Additionally, a token device 8 may receive the rules from permissions 50 database. The rules may be loaded to token device 8 by data center 17, or data center 17 may configure token device 8 with an identifier (ID), such as a universally unique ID, which may allow for wireless devices 10, 12, and 14 to retrieve the rules. Token device 8 may wirelessly connect to wireless devices 10, 12, and 14, and cause device data monitors 11, 13, and 15 to configure wireless devices 10, 12, and 14 with the rules from permissions 50 database. In various embodiments, token device 8 may load the rules to wireless devices 10, 12, and 14. However, in other embodiments, token device 8 may cause device data monitors 11, 13, and 15 to retrieve the rules for use on wireless devices 10, 12, and 14. Moreover, in still further embodiments, token device 8 may interface with data center 17 to cause monitoring and enforcement of the rules on wireless devices 10, 12, and 14. The permission rules may be set by an administrator for token device 8, and may be updated by the administrator, where updates may be pushed to token device 8 for use with enforcing the updated rules on wireless devices 10, 12, and 14 when connected to token device 8.

Data Gateway 30 and Alert Monitor 70, in accordance with one or more embodiments of the present invention, may represent one or more computers (e.g., servers or other processor-based systems) for performing the operations described herein (e.g., by executing software and communicating through a gateway or other communication interface), including communicating with Activity Log 40 and Permissions 50 databases (e.g., memory such as server-based storage). Data Monitoring program tools 11, 13, and 15 may represent, for example, software run by corresponding processors of wireless devices 10, 12, and 14 or may represent hardware-based systems (e.g., separate processors) for performing the desired operations described herein. Token device 8 may correspond to a hardware device, such as an RFID tag or card, a Bluetooth Low Energy or LTE Direct uni- or bi-directional hardware beacon device, or an NFC enabled device, for performing the operations described herein (e.g., by causing enforcement of rules on wireless devices 10, 12, and 14 through short range wireless communications between token device 8 and wireless devices 10, 12, and 14). Token device 8 may function in a passive state, such as a passive antenna of a token or device, where Token device 8 is activated through detection of a wireless signal from another device, such as wireless devices 10, 12, and 14. In such embodiments, token device 8 may respond to the signal with information necessary to enforce rules on a communication device. In other embodiments, token device 8 may correspond to an active device, including power sources, processing and memory features, and active communication ports or antennas, which may actively scan or detect nearby devices, such as wireless devices 10, 12, and 14. In such embodiments, token device 8 may actively attempt to connect to wireless device 10, 12, and 14 in order to provide and/or enforce permission rules on wireless devices 10, 12, and 14 during the connection.

Furthermore, the various programs or system elements may be combined or be discreet, as desired for the specific application. For example, Data Gateway 30 and Alert Monitor 70 may represent one computer or software program or separate computers and software programs for performing the various functions disclosed herein. Similarly for example, Activity Log 40 and Permissions 50 databases may represent one memory or discrete memory for storing the information disclosed herein. Additionally, the various programs may be stored on a computer-readable medium that may be programmed or loaded into a particular device. For example, data monitor 11 may be a software program stored on a computer-readable medium or otherwise provided to and programmed into wireless device 10 to perform the desired functions as described herein.

Figure 2:
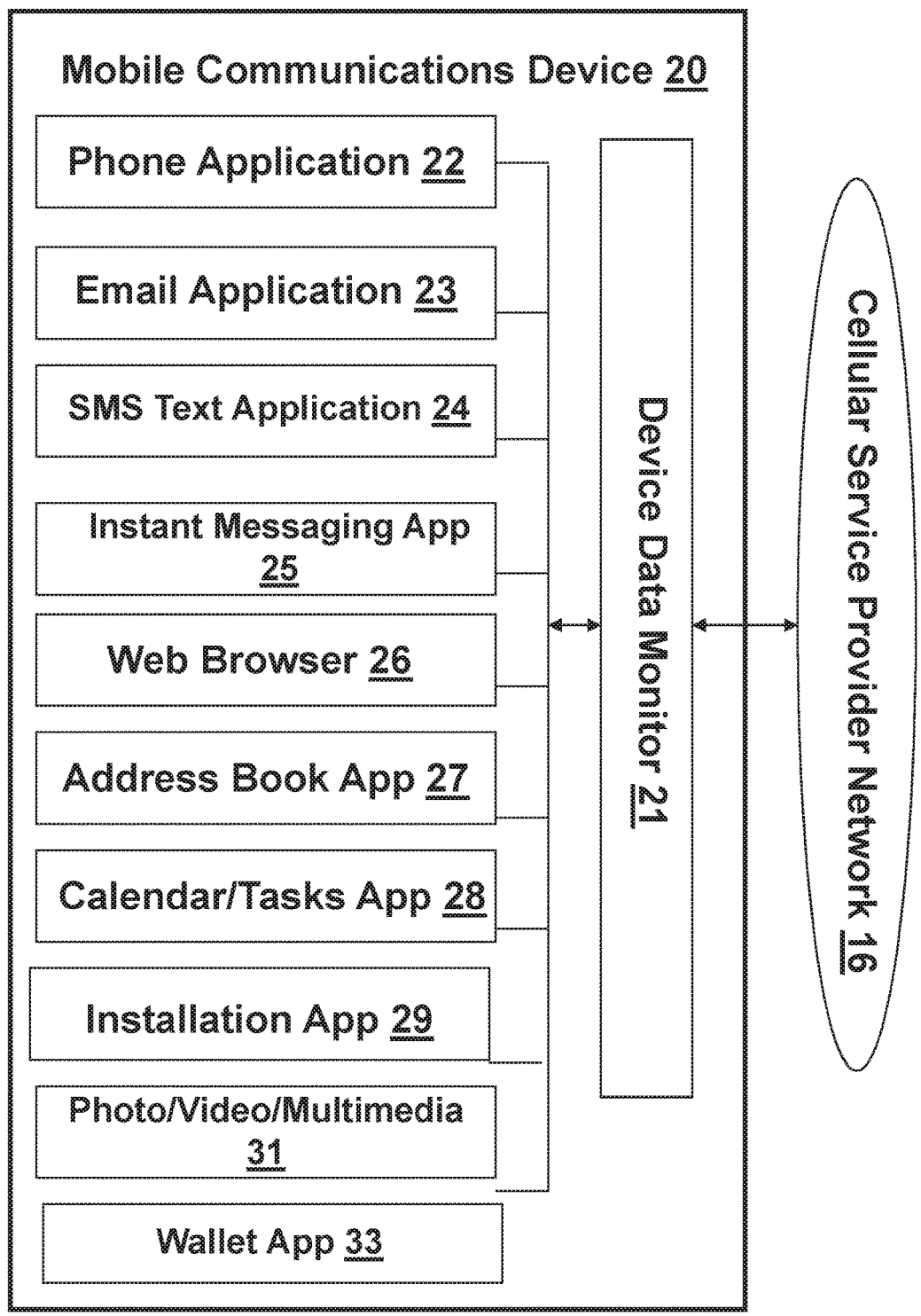
FIG. 2 is a block diagram of a system including a monitoring tool associated with a mobile communications device in accordance with an embodiment of the present invention.

FIG. 2 illustrates in more detail a Device Data Monitor 21 program tool which captures the data service activity on a Mobile Communications Device 20 in accordance with an embodiment of the present invention. For example, device data monitor 21 program tool may be an exemplary representation of data monitor 11, 13, or 15 and similarly mobile communications device 20 may be an exemplary representation of device 10, 12, or 14. Each Mobile Communications Device 20 contains one or more applications that may use a communication protocol (e.g., a conventional communication protocol) to send or receive information (e.g., digital data packets or other forms of communications) or provide supporting applications to facilitate the communications process (e.g., an Address Book which contains an email address used to send an email communication and/or a digital wallet which contains account information used to complete a financial transaction).

In accordance with an embodiment of the present invention, these communication applications and their supporting applications may be referred to as a data service. These data services may include one or more of a Phone Application 22 for sending or receiving voice communications, an Email Application 23 for sending or receiving email communications, a SMS Text Application 24 for sending or receiving SMS text messages, an Instant Messaging Application 25 for sending or receiving instant messages, a Web Browser Application 26 for sending or receiving HTTP requests and responses, an Address Book Application 27 for storing contact information, a Calendar/Task Application 28 for storing appointment information, an Installation Application (sometimes referred to herein as an App) 29 for storing information regarding the installed applications on the device, a Photo/Video/Multimedia Application 31 for sending or receiving multimedia files, as well as generating multimedia files utilizing one or more hardware features such as a camera of communications device 20, and/or a Digital Wallet 33 for storing account information used to make financial transactions.

As described in more detail below, Device Data Monitor 21 program tool monitors the inbound and outbound activity for each of these data services and sends a detailed log of these activities to a central repository using Cellular Service Provider 16. Alternatively, Data Monitor 21 program tool may send the activity information through any available communications network, such as for example the Internet, a company network, and/or a public cellular network.

As would be understood by one skilled in the art, embodiments of the present invention provide certain advantages over conventional approaches. For example, a conventional approach may simply provide parental controls which monitor and block Internet and email access from a desktop and which primarily prevent access to unwanted content or block the transmission of personally identifiable information or monitor and block the display of inappropriate application store content based upon the end user's age. Blocking usually results in the child finding an unmonitored computer or changing the age associated with the account's profile to access the blocked content. For example, most gaming consoles today are enabled with Internet access and do not inherently include parental controls and most social networks limit access to the profiles of younger account holders but have no way of verifying the child's age once the date of birth has been updated in the user's profile. Parental control applications generally do not log the blocked content or monitor financial transactions initiated from a mobile device and none pro-actively notify the parent or administrative user of the event. Additionally, none are capable of monitoring a cell phone or other mobile communications device which today have comparable communication capabilities as a desktop computer. Additionally, current solutions are incapable of enforcing device application use, functionality, operability, and/or presence within limited areas and/or based on specific activities of the device, such as length of use, specific application usage, and/or hardware feature presence or usage.

As another example of a conventional approach, child and employee monitoring of financial transactions and geographic location may be provided from a cell phone, but this approach typically requires an active search by the parent or manager to locate the device or reviewing transactions days or weeks after the purchase. Perimeter boundaries or virtual fencing could be deployed using existing location technology, but again all of these location approaches are after-the-fact of direct contact with a predator or after a potentially life threatening event is in progress.

In contrast in accordance with one or more embodiments of the present invention, systems and methods are disclosed for example to detect the potentially life threatening event before physical contact is made with the user of a monitored wireless device, and/or to use perimeter boundaries (virtual fencing) along with time of day restrictions to detect and/or block unauthorized use of the device. As an example, Mobile Communications Device 20 may include a GPS-based or other type of location-determination application (e.g., as part of phone application 22 or Device Data Monitor 21) that periodically or continuously determines the location of Mobile Communications Device 20, with this location information provided to Data Center 17 (e.g., stored in Activity Log 40) via Data Monitor 21 with an optional alert provided to an administrator (e.g., parent) based on location parameter settings (e.g., virtual fence). For example, the GPS information may be provided by Device Data Monitor 21 to Data Center 17, where it is stored in activity log 40, and an alert provided to the administrator if the Mobile Communications Device 20 enters a restricted area or proceeds outside of a defined geographic region or utilizes an application in a restricted environment. In other embodiments, the location may be detected and rules may be enforced through the use of a short range wireless token device, such as a beacon device using short range wireless communications. In general, Data Monitor 21 provides various information to Data Center 17 to permit an administrator (e.g., parent or manager) to monitor the activities (e.g., location, communications with a third party, and/or changes to applications or other data within Mobile Communications Device 20) of a user of Mobile Communications Device 20, with an optional alert provided to the administrator if an unauthorized activity occurs.

Figure 3A:
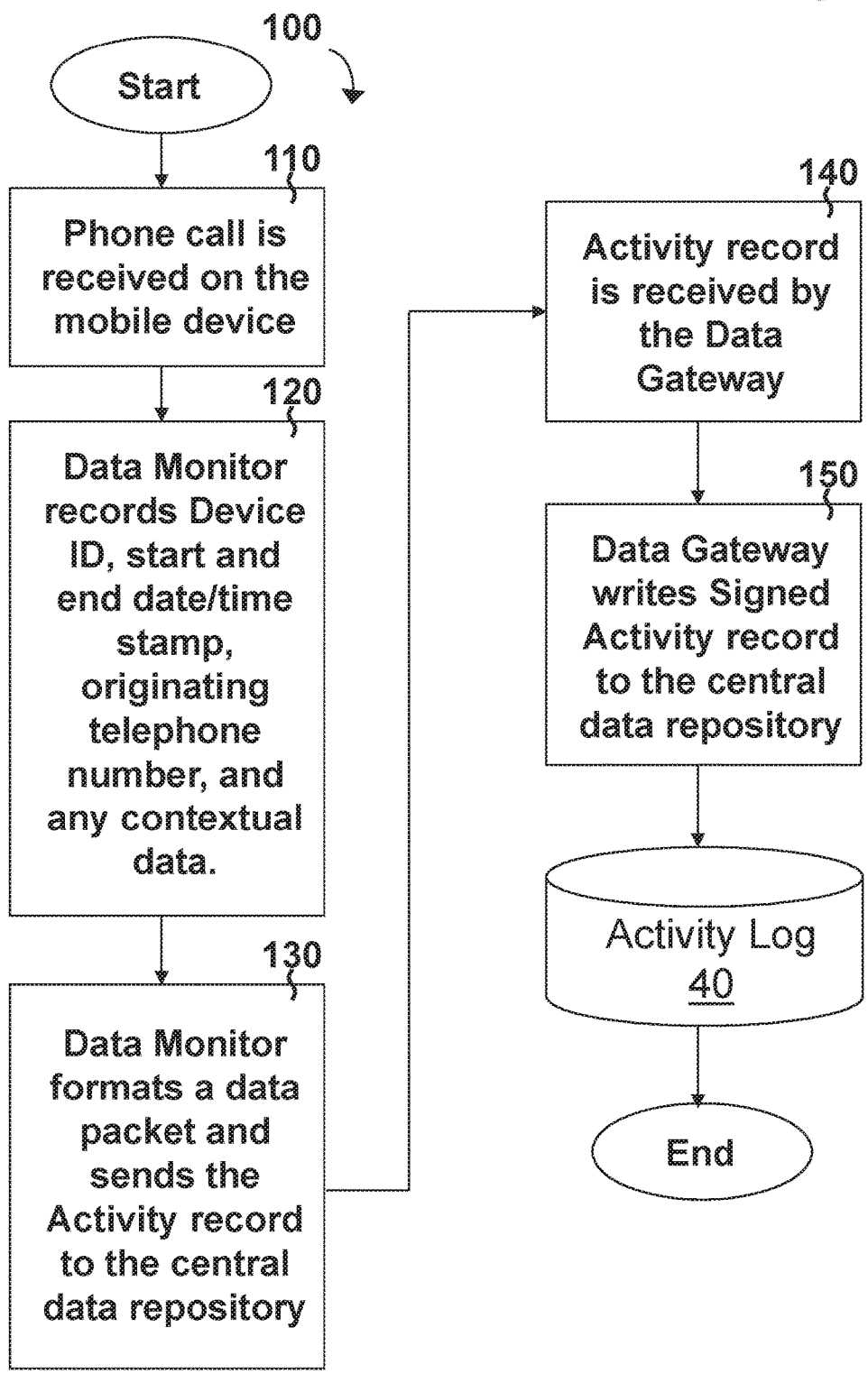
FIGS. 3A-3S illustrate exemplary flowcharts of the monitoring and collecting (logging) of event activity in FIG. 1 for each of the data services of FIG. 2 in accordance with one or more embodiments of the present invention.

For example, FIG. 3A illustrates a data flowchart for the capturing of an inbound voice call using Phone Application 22 on Mobile Communications Device 20 in accordance with an embodiment of the present invention. Initially, in step 110, a phone call is received on Mobile Communications Device 20. In step 120, Data Monitor 21 located on the Mobile Communications Device 20 or within the Cellular Service Provider Network 16 (as examples) recognizes that Phone Application 22 data service has been initiated and begins to capture information regarding the use of the data service including, for example, the unique Device ID of the Mobile Communications Device 20, the start and end date/time stamp of the call, the originating phone number, and/or any contextual data. Once the call has been terminated (step 130), Data Monitor 21 formats a data packet which includes the collected information (Activity Record) and sends one or more data packets to the central repository located in Data Center 17. In step 140, Data Gateway 30 located in Data Center 17 receives the data packet(s) and then writes the data packet(s) in step 150 to Activity Log 40, a central repository for all data collected from Mobile Communications Device 20.

Data gateway 30 may optionally write the data packet(s) in step 150 in a signed (e.g., digitally signed) fashion to activity log 40, in accordance with an embodiment of the present invention. For example, the activity record may be signed to identify (e.g., authenticate) the information and provide a chain of custody and authenticity for the stored information (e.g., for custody of evidence or other documentation requirements), as would be understood by one skilled in the art. Furthermore as a specific example, Data Gateway 30 may optionally provide encryption and decryption processing for information related to the activity record and/or additional information, such as through the use of any one of several private or public key encryption or signature algorithms including the RSA algorithm (by RSA Security of Bedford, Mass.), the Digital Encryption Standard (DES), the Advanced Encryption Standard (AES), and broad families of signature or hash algorithms such as the Secure Hash Algorithm (SHA) and the Message Digest (MD) algorithm.

In general depending upon the level of security desired and the specific requirements or applications, the activity record may not have to be encrypted. For example, by not encrypting the activity record, considerable savings may be achieved in terms of processing, power savings, time, and/or memory. Thus, the activity record may be securely recorded and validated by generating an associated signature that can be verified. Consequently, the activity record is viewable and useable in a conventional fashion, but is also verifiable through the signature (e.g., for chain of custody or other evidentiary purposes), as would be understood by one skilled in the art.

Figure 3B:
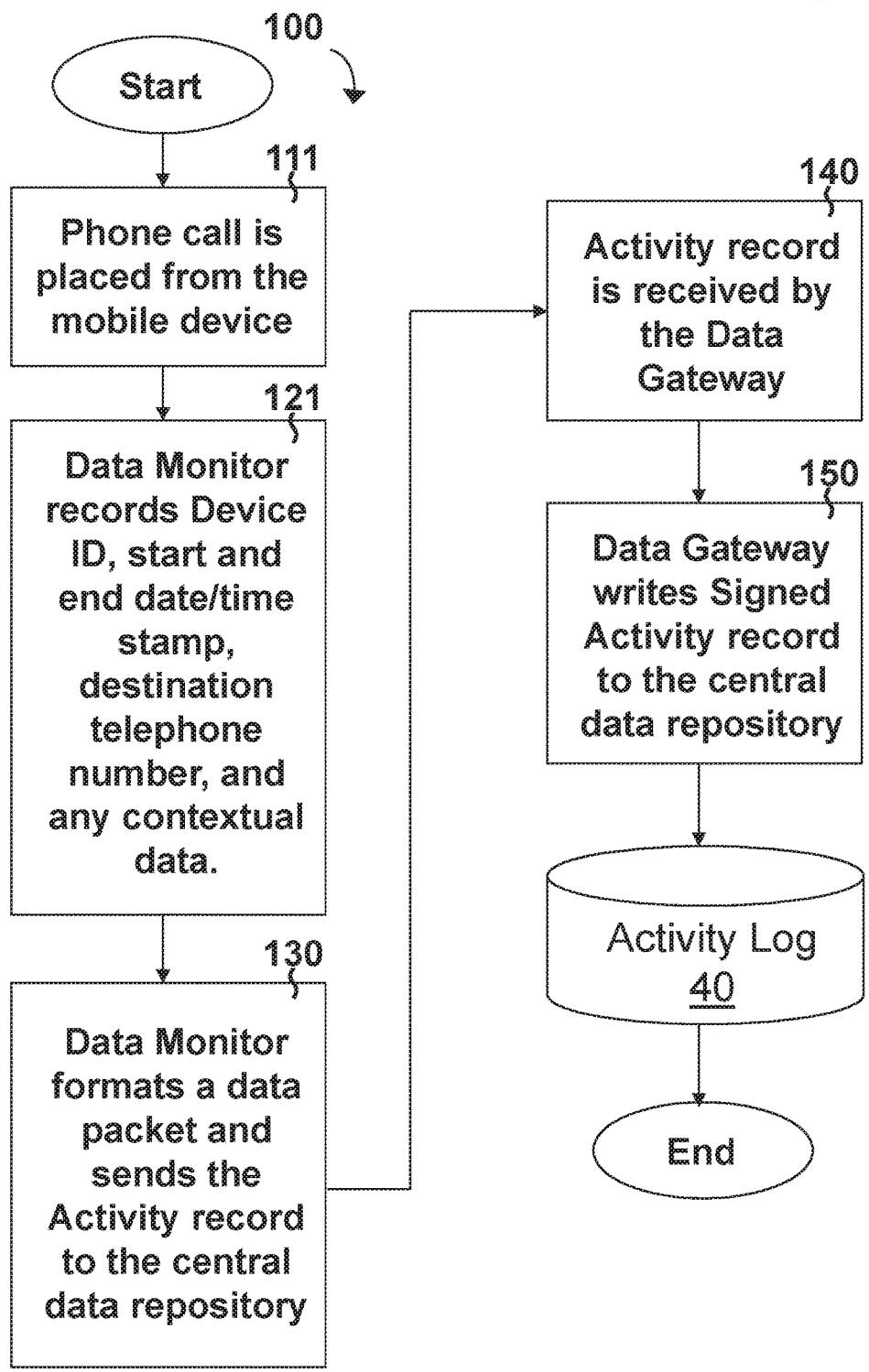

FIG. 3B illustrates a data flowchart for the capturing of an outbound voice call using Phone Application 22 on Mobile Communications Device 20 in accordance with an embodiment of the present invention. Initially, in step 111, a phone call is placed from Mobile Communications Device 20. In step 121, Data Monitor 21 recognizes that Phone Application 22 data service has been initiated and begins to capture information regarding the use of the data service including, for example, the unique Device ID of Mobile Communications Device 20, the start and end date/time stamp of the call, the destination phone number, and/or any contextual data. Once the call has been terminated (Step 130), Data Monitor 21 formats a data packet which includes the collected information (Activity Record) and sends one or more data packets to the central repository located in Data Center 17. In step 140, Data Gateway 30 located in Data Center 17 receives the data packet(s) and then writes the data packet(s) in step 150 (e.g., optionally in a signed and/or encrypted fashion as discussed in reference to FIG. 3a) to Activity Log 40, a central repository for all data collected from Mobile Communications Device 20.

FIG. 3C illustrates a data flowchart for the capturing of an inbound email message using Email Application 23 on Mobile Communications Device 20 in accordance with an embodiment of the present invention. Initially, in step 112, an email message is received on Mobile Communications Device 20. In step 122, Data Monitor 21 recognizes that Email Application 23 data service has been initiated and begins to capture information regarding the use of the data service including, for example, the unique Device ID of Mobile Communications Device 20, the date/time stamp of the message, the originating email address, and/or any contextual data. Once the message has been received (Step 130), Data Monitor 21 formats a data packet which includes the collected information (Activity Record) and sends one or more data packets to the central repository located in Data Center 17. In step 140, Data Gateway 30 located in the Data Center 17 receives the data packet(s) and then writes the data packet(s) in step 150 (e.g., optionally in a signed and/or encrypted fashion as discussed in reference to FIG. 3a) to Activity Log 40, a central repository for all data collected from Mobile Communications Device 20.

FIG. 3D illustrates a data flowchart for the capturing of an outbound email message using Email Application 23 on Mobile Communications Device 20 in accordance with an embodiment of the present invention. Initially, in step 113, an email message is sent from Mobile Communications Device 20. In step 123, the Data Monitor 21 recognizes that Email Application 23 data service has been initiated and begins to capture information regarding the use of the data service including, for example, the unique Device ID of Mobile Communications Device 20, the date/time stamp of the message, the destination email address, and/or any contextual data. Once the message has been sent (Step 130), Data Monitor 21 formats a data packet which includes the collected information (Activity Record) and sends one or more data packets to the central repository located in Data Center 17. In step 140, Data Gateway 30 located in Data Center 17 receives the data packet(s) and then writes the data packet(s) in step 150 (e.g., optionally in a signed and/or encrypted fashion as discussed in reference to FIG. 3a) to Activity Log 40, a central repository for all data collected from Mobile Communications Device 20.

Figure 3E:
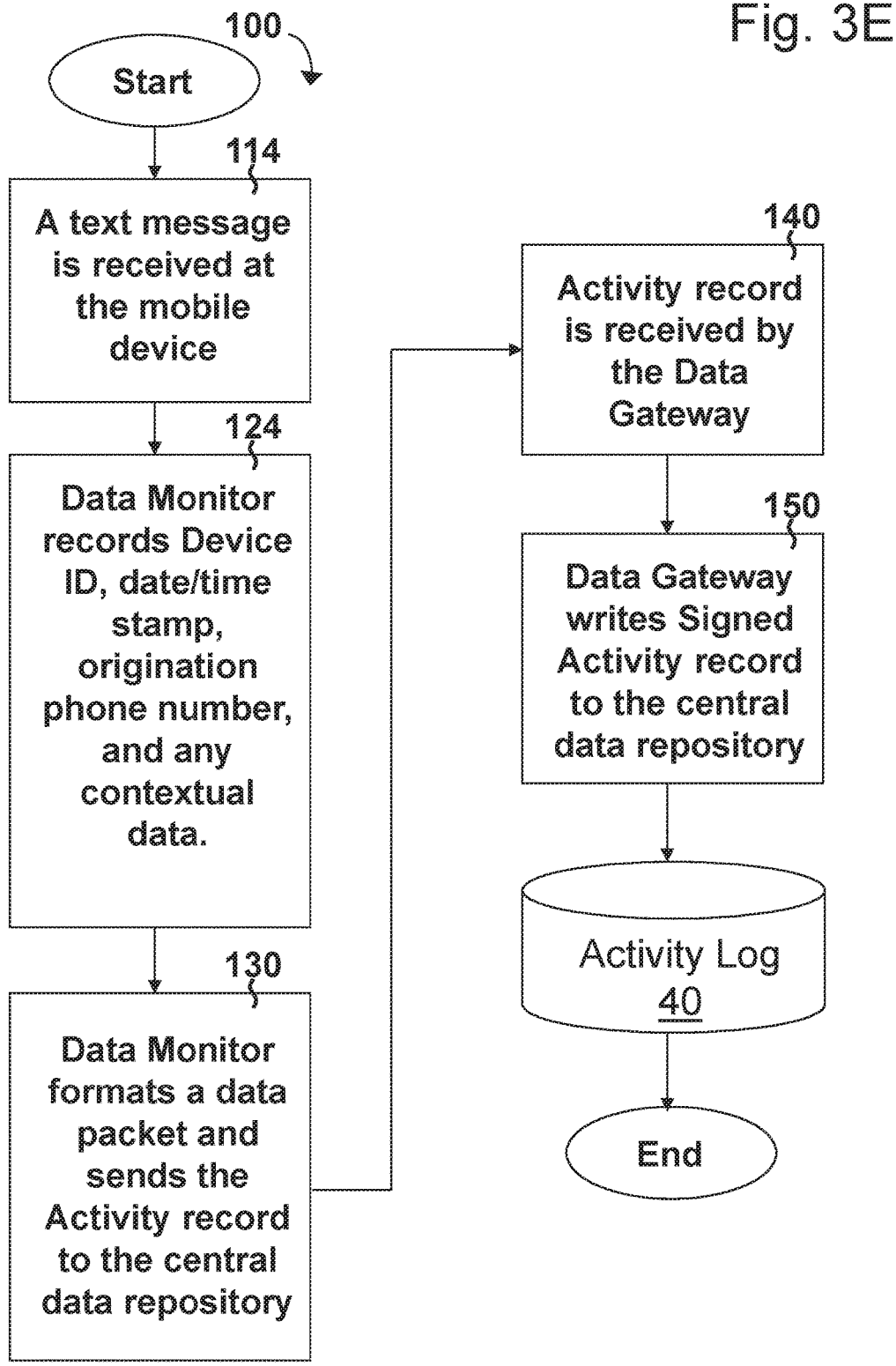

FIG. 3E illustrates a data flowchart for the capturing of an inbound text message using SMS Text Application 24 on Mobile Communications Device 20 in accordance with an embodiment of the present invention. Initially, in step 114, a text message is received on Mobile Communications Device 20. In step 124, Data Monitor 21 recognizes that the SMS Text Application 24 data service has been initiated and begins to capture information regarding the use of the data service including, for example, the unique Device ID of Mobile Communications Device 20, the date/time stamp of the message, the originating phone number, and/or any contextual data. Once the message has been received (Step 130), Data Monitor 21 formats a data packet which includes the collected information (Activity Record) and sends one or more data packets to the central repository located in Data Center 17. In step 140, Data Gateway 30 located in Data Center 17 receives the data packet(s) and then writes the data packet(s) in step 150 (e.g., optionally in a signed and/or encrypted fashion as discussed in reference to FIG. 3a) to Activity Log 40, a central repository for all data collected from Mobile Communications Device 20.

Figure 3F:
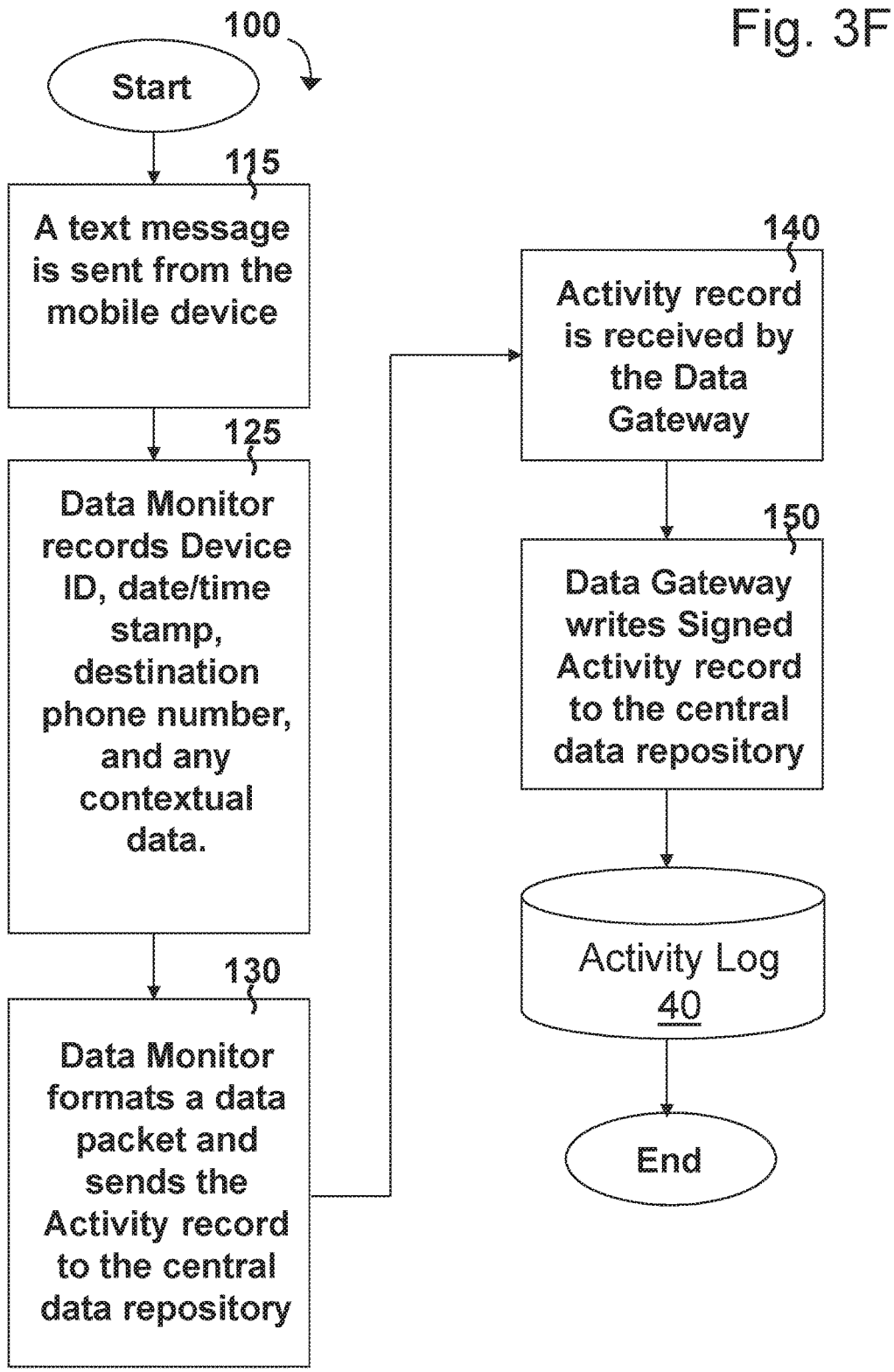

FIG. 3F illustrates a data flowchart for the capturing of an outbound text message using SMS Text Application 24 on Mobile Communications Device 20 in accordance with an embodiment of the present invention. Initially, in step 115, a text message is sent from Mobile Communications Device 20. In step 125, Data Monitor 21 recognizes that SMS Text Application 24 data service has been initiated and begins to capture information regarding the use of the data service including, for example, the unique Device ID of Mobile Communications Device 20, the date/time stamp of the message, the destination phone number, and/or any contextual data. Once the message has been sent (Step 130), Data Monitor 21 formats a data packet which includes the collected information (Activity Record) and sends one or more data packets to the central repository located in Data Center 17. In step 140, Data Gateway 30 located in Data Center 17 receives the data packet(s) and then writes the data packet(s) in step 150 (e.g., optionally in a signed and/or encrypted fashion as discussed in reference to FIG. 3*a*) to Activity Log 40, a central repository for all data collected from Mobile Communications Device 20.

Figure 3G:
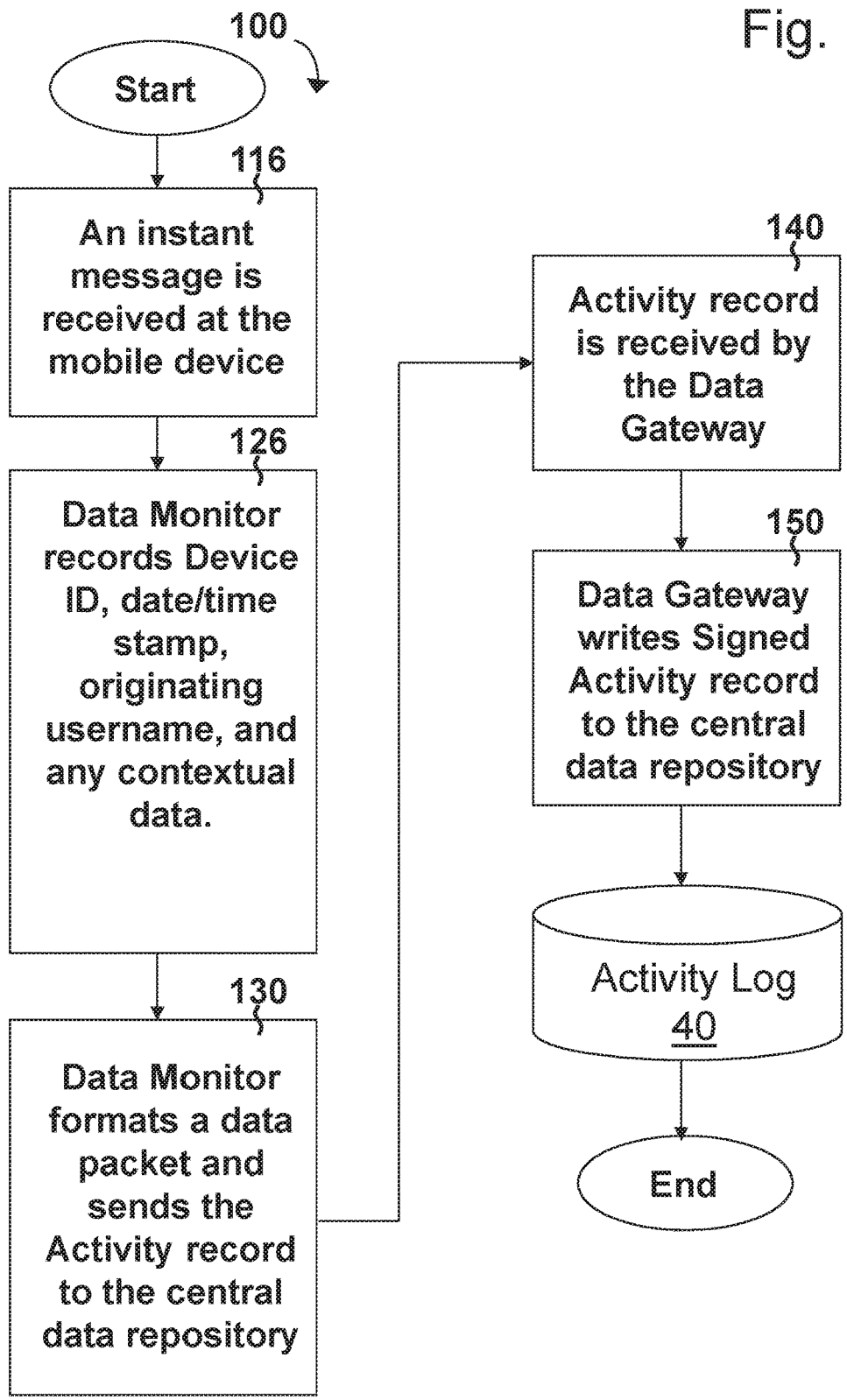

FIG. 3G illustrates a data flowchart for the capturing of an inbound instant message using Instant Messaging Application 25 on Mobile Communications Device 20 in accordance with an embodiment of the present invention. Initially, in step 116, an instant message is received on Mobile Communications Device 20. In step 126, Data Monitor 21 recognizes that Instant Messaging Application 25 data service has been initiated and begins to capture information regarding the use of the data service including, for example, the unique Device ID of Mobile Communications Device 20, the date/time stamp of the message, the originating username, and/or any contextual data. Once the message has been received (Step 130), Data Monitor 21 formats a data packet which includes the collected information (Activity Record) and sends one or more data packets to the central repository located in Data Center 17. In step 140, Data Gateway 30 located in Data Center 17 receives the data packet(s) and then writes the data packet(s) in step 150 (e.g., optionally in a signed and/or encrypted fashion as discussed in reference to FIG. 3*a*) to Activity Log 40, a central repository for all data collected from Mobile Communications Device 20.

Figure 3H:
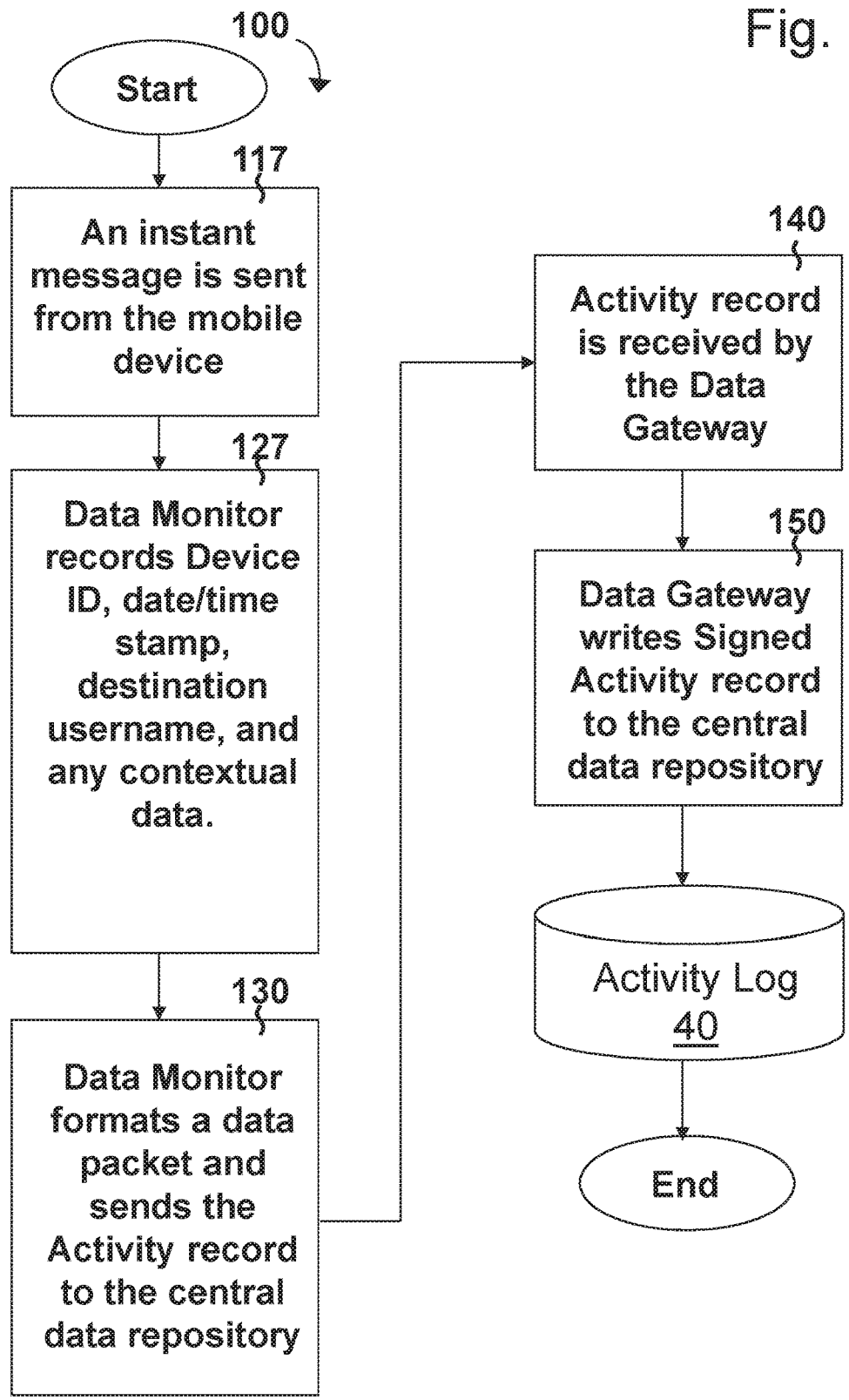

FIG. 3H illustrates a data flowchart for the capturing of an outbound instant message using Instant Messaging Application 25 on Mobile Communications Device 20 in accordance with an embodiment of the present invention. Initially, in step 117, an instant message is sent from Mobile Communications Device 20. In step 127, Data Monitor 21 recognizes that Instant Messaging Application 25 data service has been initiated and begins to capture information regarding the use of the data service including the unique Device ID of Mobile Communications Device 20, the date/time stamp of the message, the destination username, and/or any contextual data. Once the message has been sent (Step 130), Data Monitor 21 formats a data packet which includes the collected information (Activity Record) and sends one or more data packets to the central repository located in Data Center 17. In step 140, Data Gateway 30 located in Data Center 17 receives the data packet(s) and then writes the data packet(s) in step 150 (e.g., optionally in a signed and/or encrypted fashion as discussed in reference to FIG. 3*a*) to Activity Log 40, a central repository for all data collected from Mobile Communications Device 20.

Figure 3I:
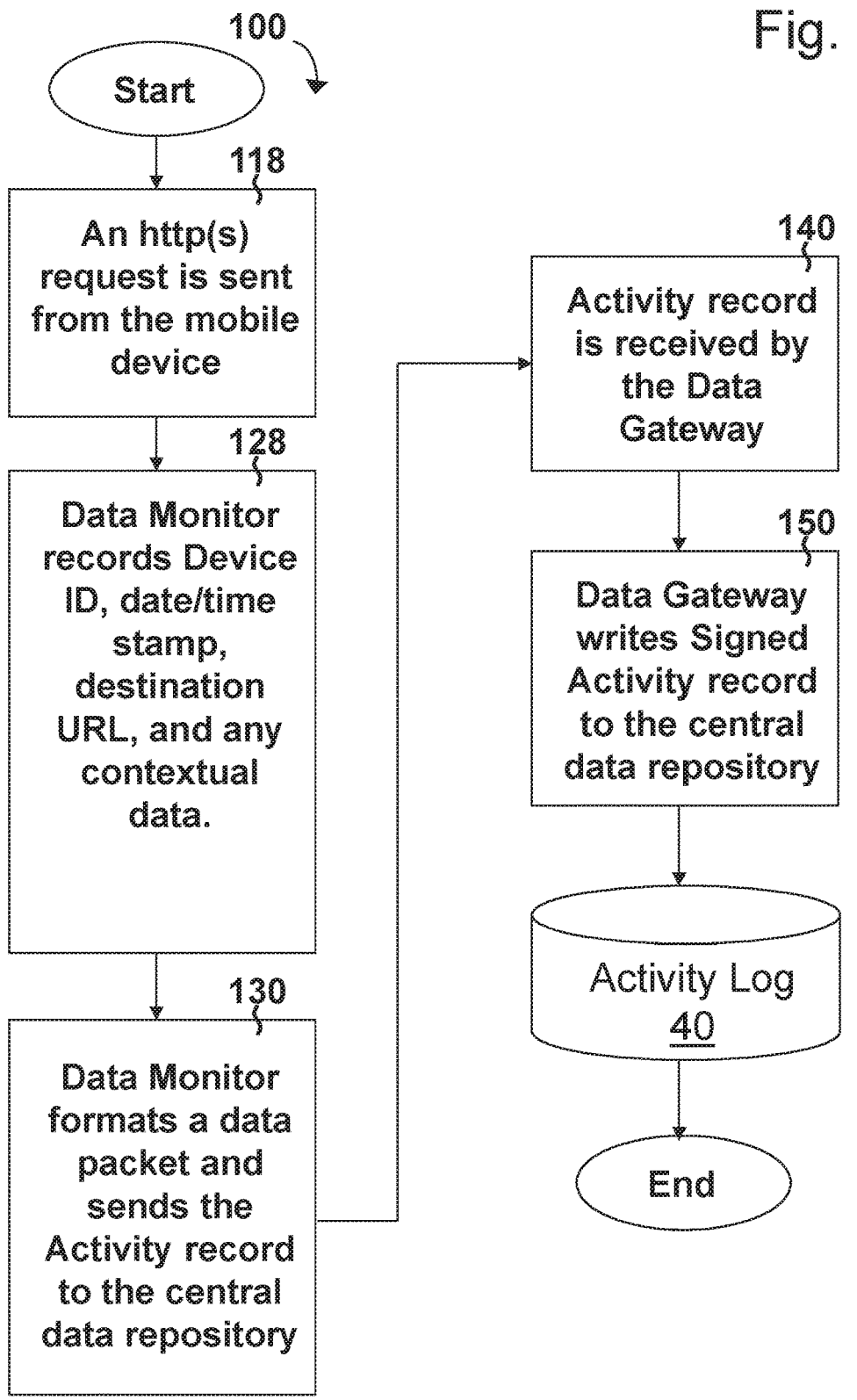

FIG. 3I illustrates a data flowchart for the capturing of an HTTP (Internet) request using Web Browser Application 26 on Mobile Communications Device 20 in accordance with an embodiment of the present invention. Initially, in step 118, an HTTP request is sent from Mobile Communications Device 20. In step 128, Data Monitor 21 recognizes that Web Browser Application 26 data service has been initiated and begins to capture information regarding the use of the data service including, for example, the unique Device ID of Mobile Communications Device 20, the date/time stamp of the request, the destination URL, and/or any contextual data. Once the request has been completed (Step 130), Data Monitor 21 formats a data packet which includes the collected information (Activity Record) and sends one or more data packets to the central repository located in Data Center 17. In step 140, Data Gateway 30 located in Data Center 17 receives the data packet(s) and then writes the data packet(s) in step 150 (e.g., optionally in a signed and/or encrypted fashion as discussed in reference to FIG. 3*a*) to Activity Log 40, a central repository for all data collected from Mobile Communications Device 20.

Figure 3J:
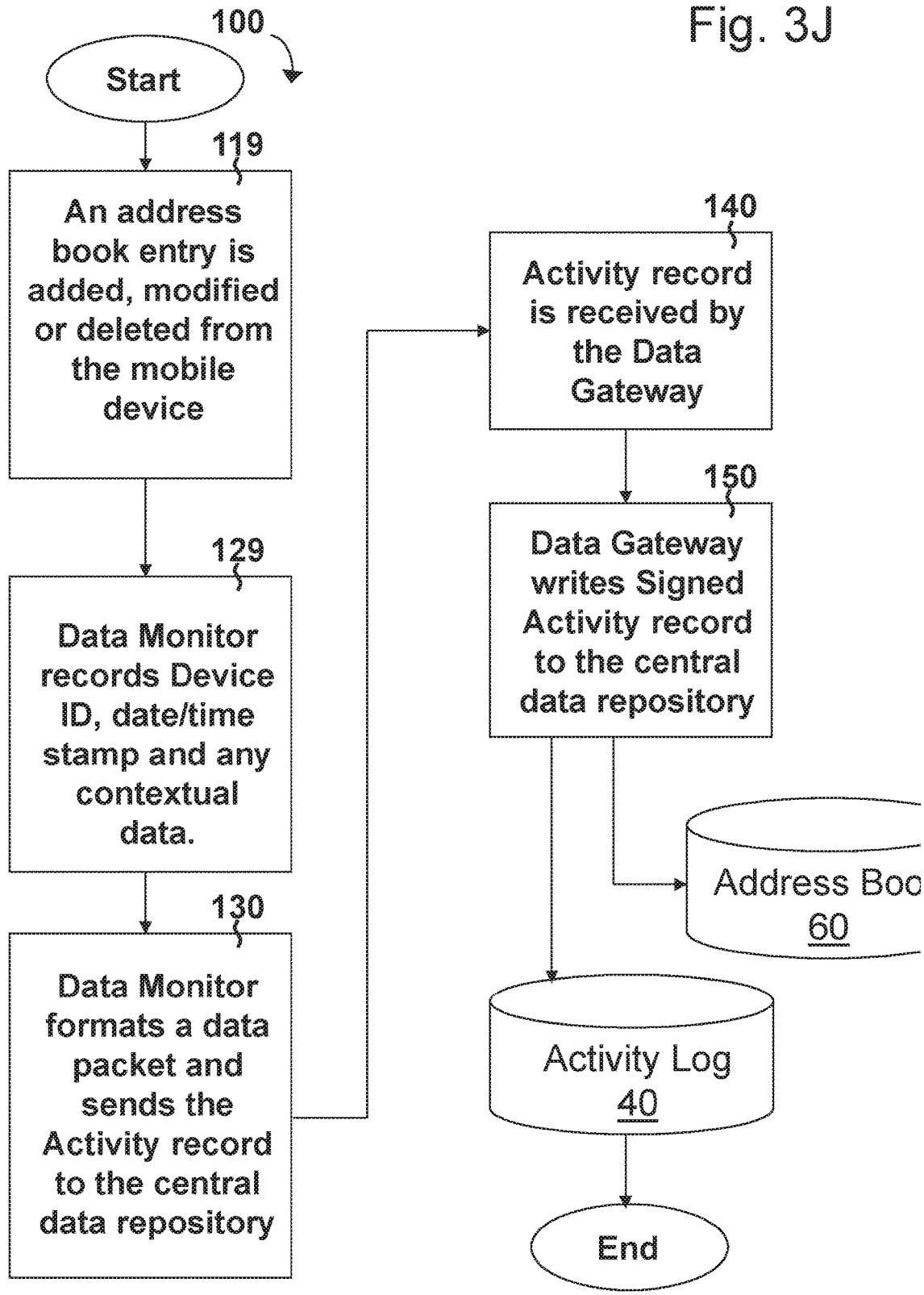

FIG. 3J illustrates a data flowchart for the capturing of a change to the address book using Address Book Application 27 on Mobile Communications Device 20 in accordance with an embodiment of the present invention. Initially, in step 119, an add, modify, or delete address book transaction is initiated on Mobile Communications Device 20. In step 129, Data Monitor 21 recognizes that Address Book Application 27 data service has been initiated and begins to capture information regarding the use of the data service including, for example, the unique Device ID of Mobile Communications Device 20, the date/time stamp of the change, and/or any contextual information such as the phone number or name that was changed. Once the transaction has been completed (Step 130), Data Monitor 21 formats a data packet which includes the collected information (Activity Record) and sends one or more data packets to the central repository located in Data Center 17. In step 140, Data Gateway 30 located in Data Center 17 receives the data packet(s) and then writes the data packet(s) in step 150 (e.g., optionally in a signed and/or encrypted fashion as discussed in reference to FIG. 3*a*) to Activity Log 40, a central repository for all data collected from Mobile Communications Device 20, and to Address Book 60, a central repository backup for all address book records residing on Mobile Communications Device 20.

Figure 3K:
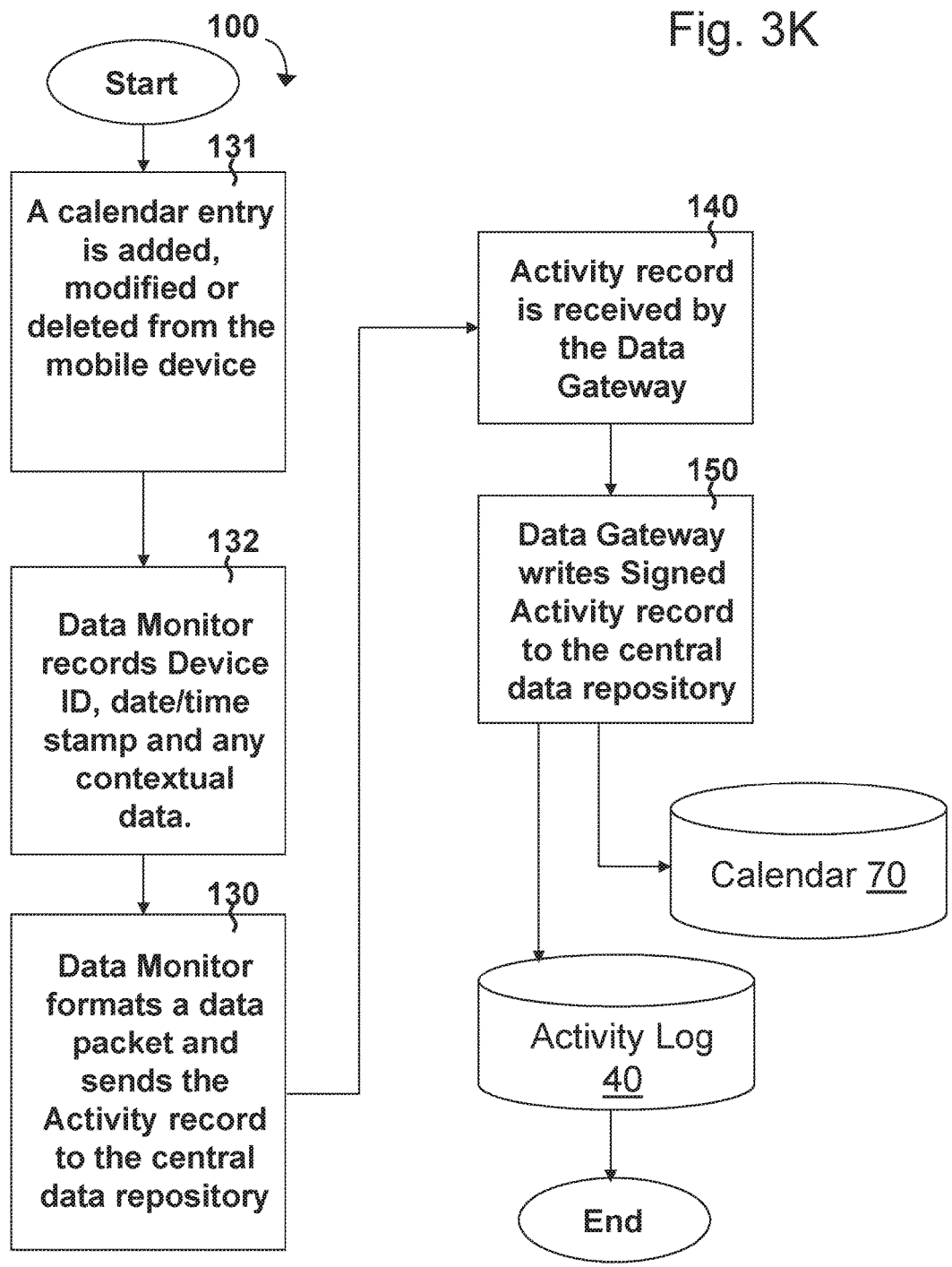

FIG. 3K illustrates a data flowchart for the capturing of a change to the calendar using Calendar/Task Application 28 on Mobile Communications Device 20 in accordance with an embodiment of the present invention. Initially, in step 131, an add, modify, or delete calendar transaction is initiated on Mobile Communications Device 20. In step 132, Data Monitor 21 recognizes that Calendar/Task Application 28 data service has been initiated and begins to capture information regarding the use of the data service including, for example, the unique Device ID of Mobile Communications Device 20, the date/time stamp of the change, and/or any contextual information such as the date or meeting location that was changed. Once the transaction has been completed (Step 130), Data Monitor 21 formats a data packet which includes the collected information (Activity Record) and sends one or more data packets to the central repository located in Data Center 17. In step 140, Data Gateway 30 located in Data Center 17 receives the data packet(s) and then writes the data packet(s) in step 150 (e.g., optionally in a signed and/or encrypted fashion as discussed in reference to FIG. 3*a*) to Activity Log 40, a central repository for all data collected from Mobile Communications Device 20, and to Calendar 70, a central repository backup for all calendar records residing on Mobile Communications Device 20.

Figure 3L:
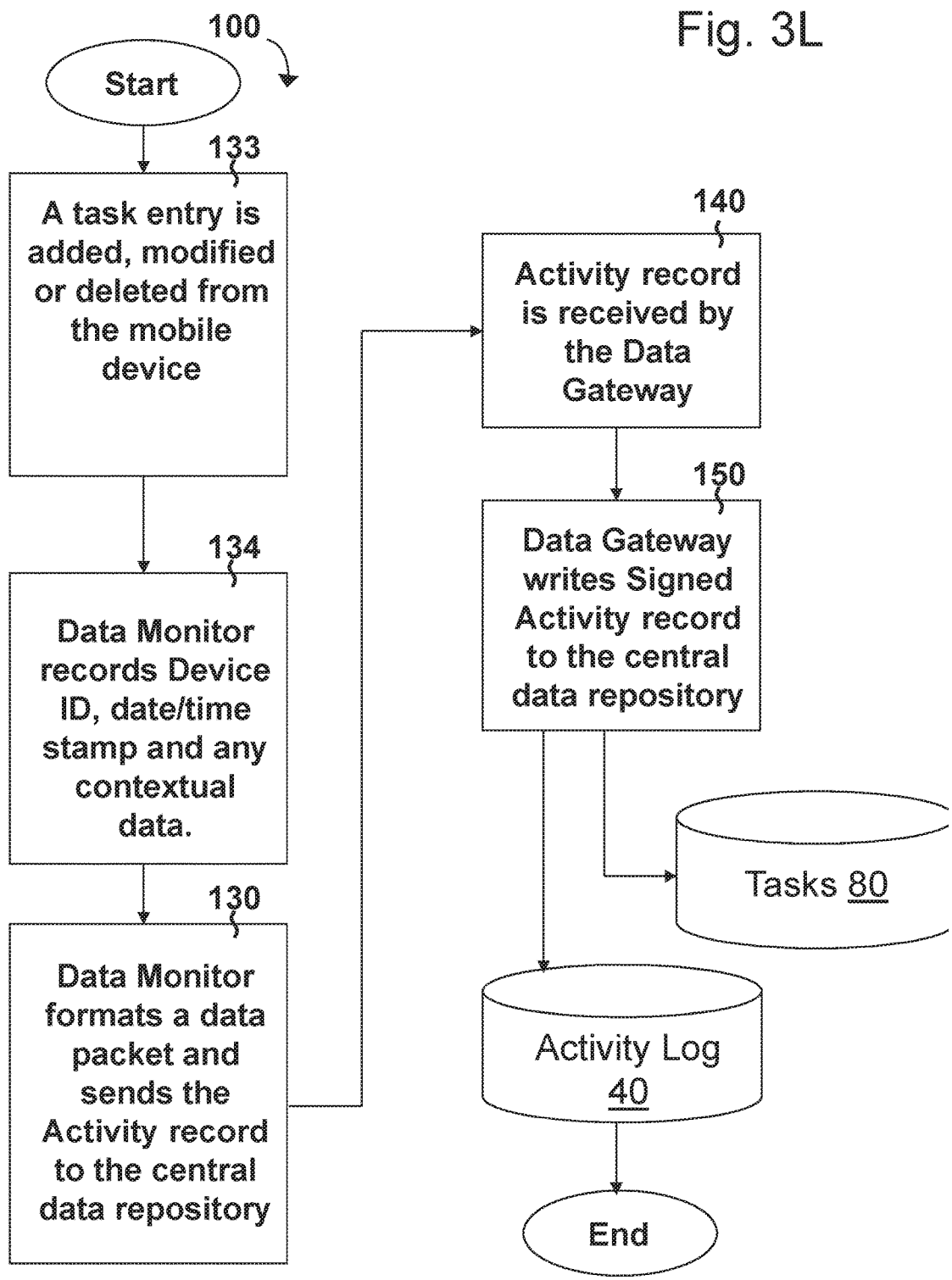

FIG. 3L illustrates a data flowchart for the capturing of a change to the task list using Calendar/Task Application 28 on Mobile Communications Device 20 in accordance with an embodiment of the present invention. Initially, in step 133, an add, modify, or delete task transaction is initiated on Mobile Communications Device 20. In step 134, Data Monitor 21 recognizes that Calendar/Task Application 28 data service has been initiated and begins to capture information regarding the use of the data service including, for example, the unique Device ID of Mobile Communications Device 20, the date/time stamp of the change, and/or any contextual information such as the date or task details that were changed. Once the transaction has been completed (Step 130), Data Monitor 21 formats a data packet which includes the collected information (Activity Record) and sends one or more data packets to the central repository located in Data Center 17. In step 140, Data Gateway 30 located in Data Center 17 receives the data packet(s) and then writes the data packet(s) in step 150 (e.g., optionally in a signed and/or encrypted fashion as discussed in reference to FIG. 3a) to Activity Log 40, a central repository for all data collected from Mobile Communications Device 20, and to Tasks 80, a central repository backup for all task records residing on Mobile Communications Device 20.

Figure 3M:
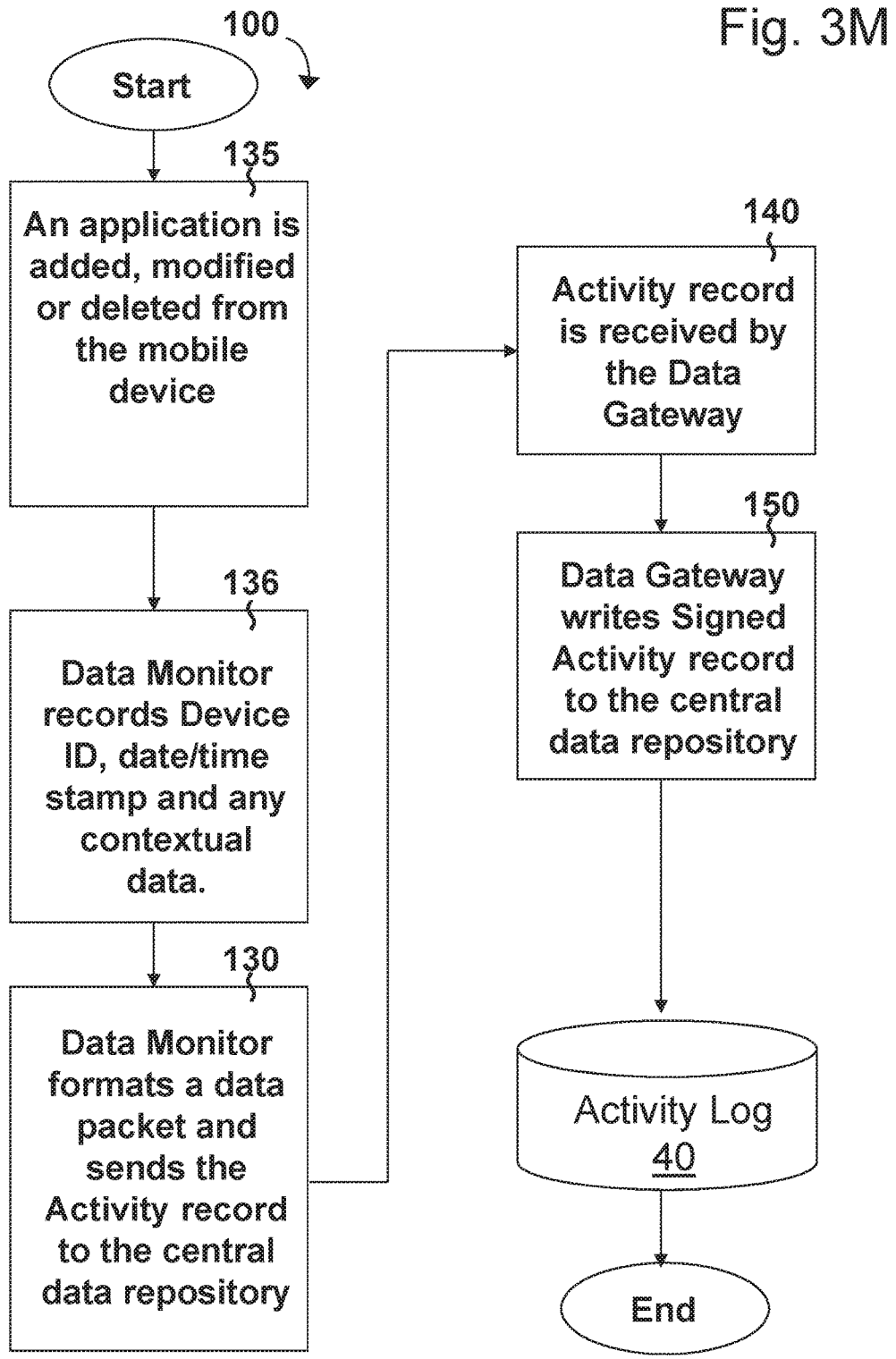

FIG. 3M illustrates a data flowchart for the capturing of a change to the list of installed applications on Mobile Communications Device 20 using Installation Application 29 on Mobile Communications Device 20 in accordance with an embodiment of the present invention. Initially, in step 135, an add, modify, or delete of an application is initiated on Mobile Communications Device 20. In step 136, Data Monitor 21 recognizes that Installation Application 29 data service has been initiated and begins to capture information regarding the use of the data service including the unique Device ID of Mobile Communications Device 20, the date/time stamp of the change, and/or any contextual information such as the name of the application(s) that were changed. Once the transaction has been completed (Step 130), Data Monitor 21 formats a data packet which includes the collected information (Activity Record) and sends one or more data packets to the central repository located in Data Center 17. In step 140, Data Gateway 30 located in Data Center 17 receives the data packet(s) and then writes the data packet(s) in step 150 (e.g., optionally in a signed and/or encrypted fashion as discussed in reference to FIG. 3a) to Activity Log 40, a central repository for all data collected from Mobile Communications Device 20.

Figure 3N:
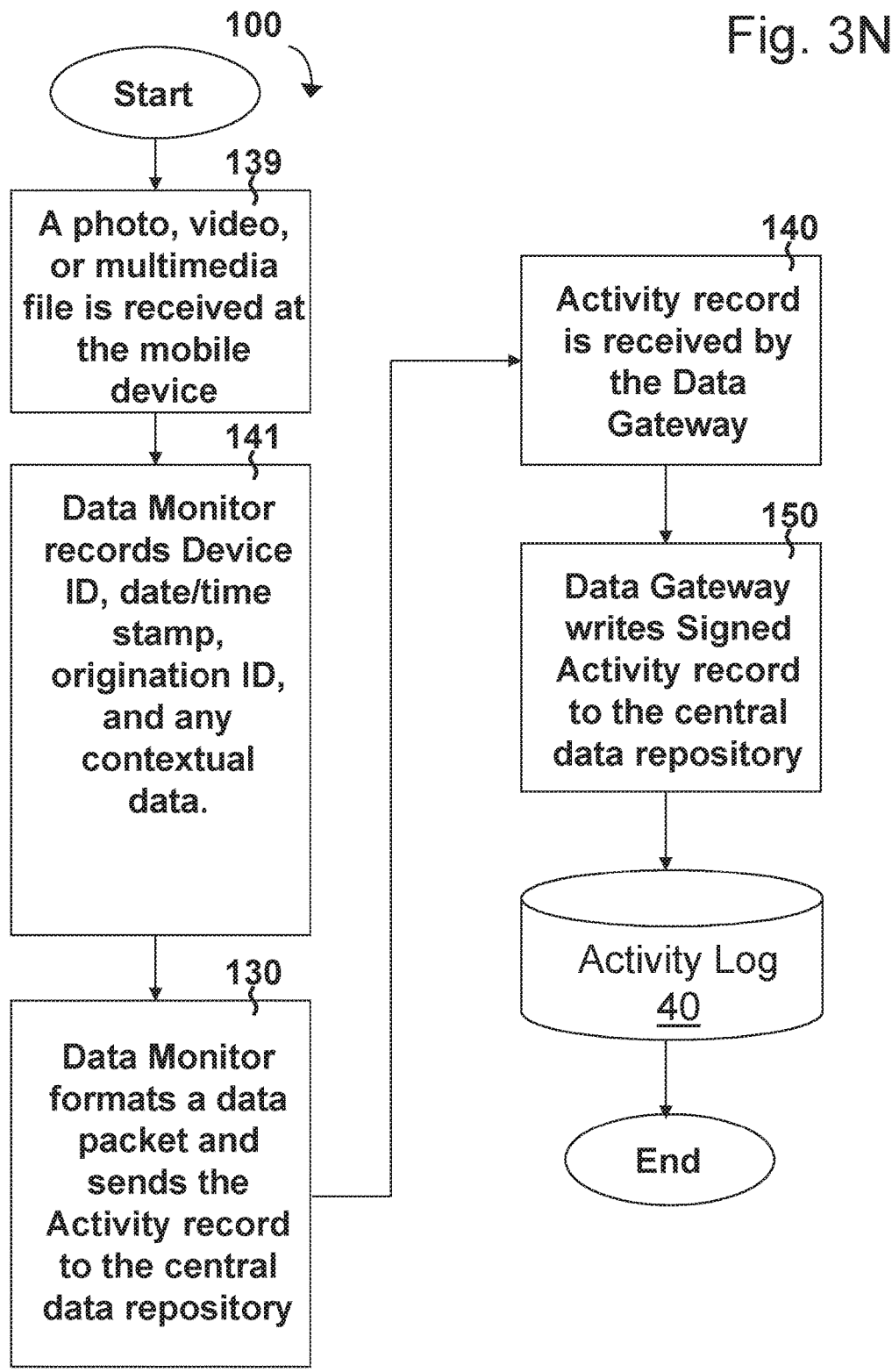

FIG. 3N illustrates a data flowchart for the capturing of an inbound photo, video, or other multimedia file using Photo/Video/Multimedia Application 31 on Mobile Communications Device 20 in accordance with an embodiment of the present invention. Initially, in step 139, a multimedia file is received on Mobile Communications Device 20. In step 141, Data Monitor 21 recognizes that the Photo/Video/Multimedia Application 31 data service has been initiated and begins to capture information regarding the use of the data service including, for example, the unique Device ID of Mobile Communications Device 20, the date/time stamp of the file transfer, an origination ID such as the originating phone number, username or link, and/or any contextual information contained in the file. Once the message has been received (Step 130), Data Monitor 21 formats a data packet which includes the collected information (Activity Record) and sends one or more data packets to the central repository located in Data Center 17. In step 140, Data Gateway 30 located in Data Center 17 receives the data packet(s) and then writes the data packet(s) in step 150 (e.g., optionally in a signed and/or encrypted fashion as discussed in reference to FIG. 3a) to Activity Log 40, a central repository for all data collected from Mobile Communications Device 20.

FIG. 3O illustrates a data flowchart for the capturing of an outbound photo, video, or other multimedia file using Photo/Video/Multimedia Application 31 on Mobile Communications Device 20 in accordance with an embodiment of the present invention. Initially, in step 142, a multimedia file is sent from Mobile Communications Device 20. In step 143, Data Monitor 21 recognizes that Photo/Video/Multimedia Application 31 data service has been initiated and begins to capture information regarding the use of the data service including, for example, the unique Device ID of Mobile Communications Device 20, the date/time stamp of the file transfer, a destination ID such as the destination phone number, username or link, and/or any contextual information contained in the file. Once the message has been sent (Step 130), Data Monitor 21 formats a data packet which includes the collected information (Activity Record) and sends one or more data packets to the central repository located in Data Center 17. In step 140, Data Gateway 30 located in Data Center 17 receives the data packet(s) and then writes the data packet(s) in step 150 (e.g., optionally in a signed and/or encrypted fashion as discussed in reference to FIG. 3a) to Activity Log 40, a central repository for all data collected from Mobile Communications Device 20.

Figure 3P:
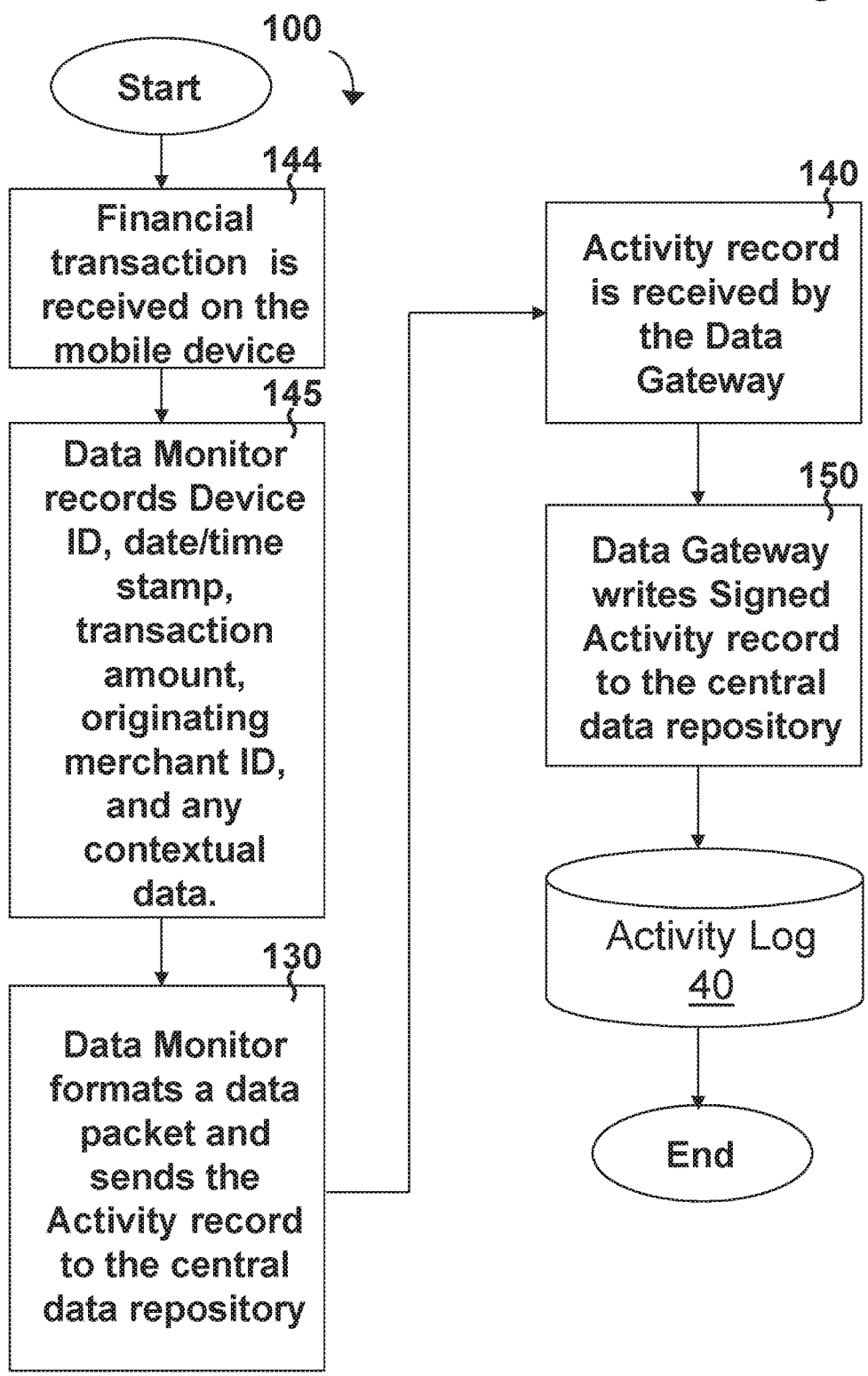

FIG. 3P illustrates a data flowchart for the capturing of an inbound financial transaction using Digital Wallet Application 33 on Mobile Communications Device 20 in accordance with an embodiment of the present invention. Initially, in step 144, a financial transaction is received on Mobile Communications Device 20. In step 145, Data Monitor 21 located either on the Mobile Communications Device 20 or within the Cellular Service Provider Network 16 (e.g. Network Data Monitor 200 as discussed in reference to FIG. 11) recognizes that Digital Wallet 33 data service has been initiated and begins to capture information regarding the use of the data service including, for example, the unique Device ID of the Mobile Communications Device 20, the date/time stamp of the transaction, the transaction amount, the originating merchant identity (ID), and/or any contextual data associated with the transaction. Once the transaction has been completed (step 130), Data Monitor 21 formats a data packet which includes the collected information (e.g., in an Activity Record) and sends one or more data packets to the central repository located in Data Center 17. In step 140, Data Gateway 30 located in Data Center 17 receives the data packet(s) and then writes the data packet(s) in step 150 (e.g., optionally in a signed and/or encrypted fashion as discussed in reference to FIG. 3a) to Activity Log 40, a central repository for all data collected from Mobile Communications Device 20.

Figure 3Q:
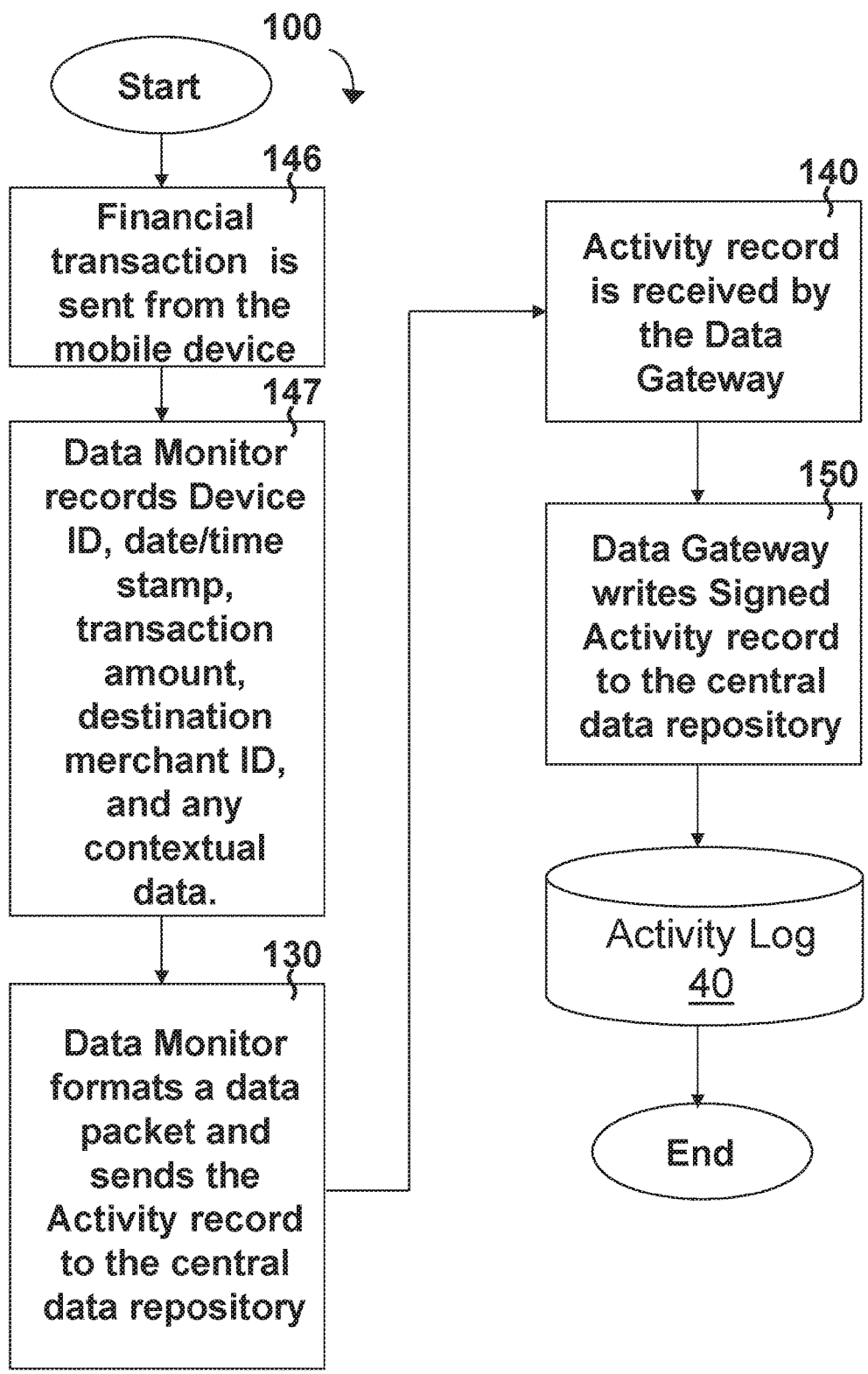

FIG. 3Q illustrates a data flowchart for the capturing of an outbound financial transaction using Digital Wallet Application 33 on Mobile Communications Device 20 in accordance with an embodiment of the present invention. Initially, in step 146, a financial transaction is sent from Mobile Communications Device 20. In step 147, Data Monitor 21 located either on the Mobile Communications Device 20 or within the Cellular Service Provider Network 16 (e.g. Network Data Monitor 200 as discussed in reference to FIG. 11) recognizes that Digital Wallet 33 data service has been initiated and begins to capture information regarding the use of the data service including, for example, the unique Device ID of the Mobile Communications Device 20, the date/time stamp of the transaction, the transaction amount, the destination merchant ID, and/or any contextual data associated with the transaction. Once the transaction has been completed (step 130), Data Monitor 21 formats a data packet which includes the collected information (e.g., in an Activity Record) and sends one or more data packets to the central repository located in Data Center 17. In step 140, Data Gateway 30 located in Data Center 17 receives the data packet(s) and then writes the data packet(s) in step 150 (e.g., optionally in a signed and/or encrypted fashion as discussed in reference to FIG. 3a) to Activity Log 40, a central repository for all data collected from Mobile Communications Device 20.

Figure 3R:
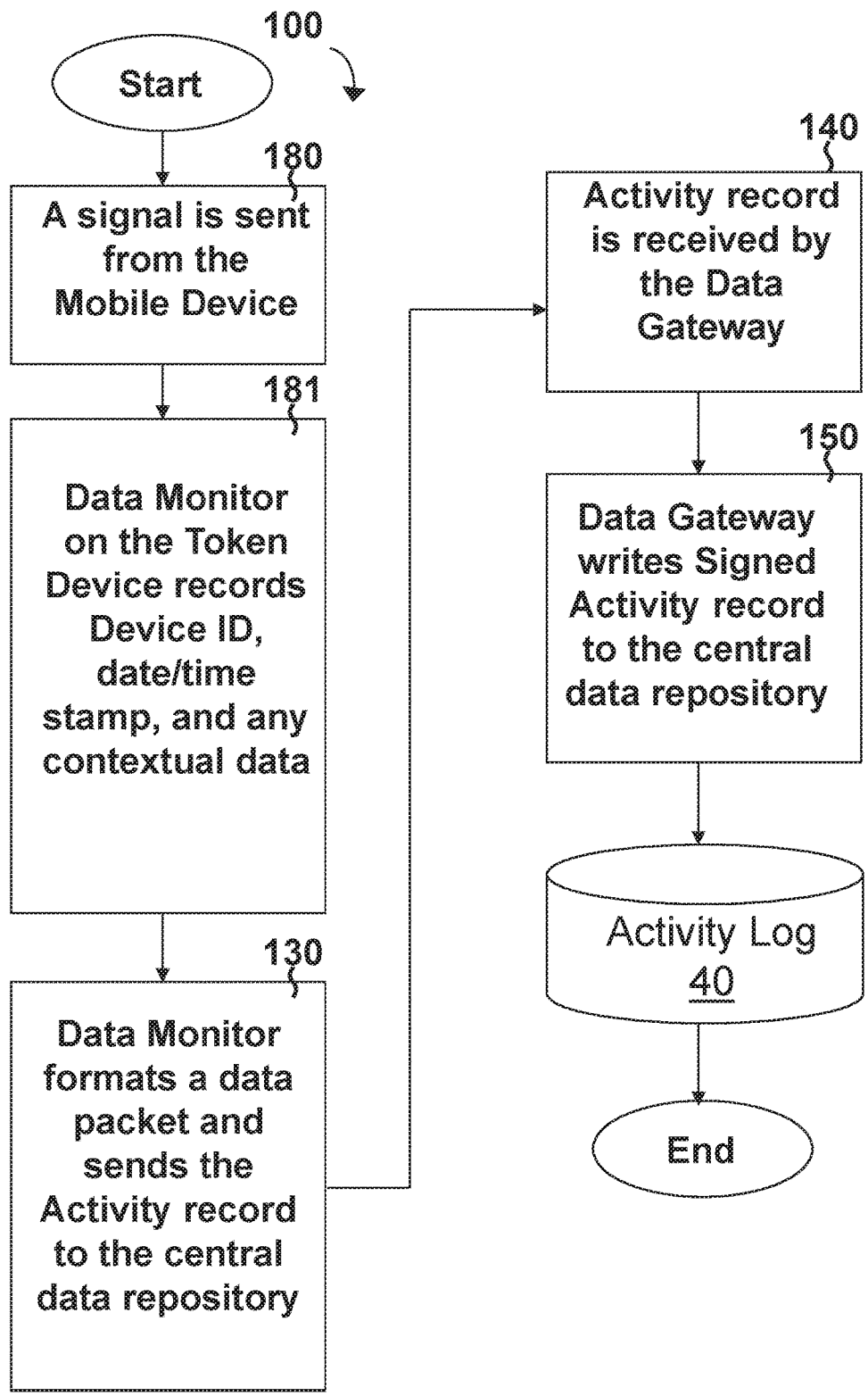

FIG. 3R illustrates a data flowchart for the detection of Mobile Communications Device 20 by a Data Monitor 21 on Token Device 8 and determination of data services uses and activities of Mobile Communications Device 20 while in proximity to Token Device 8. Initially, at step 180, Mobile Communications Device 20 broadcasts a signal, such as a wireless signal that is detectable by other nearby devices including Token Device 8. In other embodiments, Mobile Communications Device 20 may be detectable by Token Device 8 instead by a signal broadcast by Token Device 8, such as a query that Mobile Communications Device 20 is responsive to with an ID for Mobile Communications Device 20. At step 180, Mobile Communications Device 20 and Token Device 8 may connect and share data, for example, an ID for Mobile Communications Device 20 and/or Token Device 8, as well as permission rules associated with Token Device 8 for enforcement on Mobile Communications Device 20 in various embodiments. At step 181, Token Device 8 records information on data services uses, such as application and/or hardware usage, and activities of Mobile Communications Device 20, for example, using Data Monitor 21. The activities may correspond to current location of Mobile Communications Device 20, time of usage of Mobile Communications Device 20, or other parameter related to a user's activity with Mobile Communications Device 20. At step 130, Data Monitor 21 on Token Device 8 formats a data packet for the recorded data, and sends the data packet to Data Center 17 for recording in a central data repository. For example, at step 130 the data packet may be sent to the central data repository for use with permission rules to be enforced on Mobile Communications Device 20. In various embodiments, the permission rules may be enforced through transfer of the rules to Mobile Communications Device 20 and/or configuration of Mobile Communications Device 20 over a wireless connection by the data center and/or Token Device 8. The rules may affect Mobile Communication Device 20 in order to prevent, restrict, or allow usage of an application or device, such as Mobile Communications Device 20. At step 140, an activity record is received by the Data Gateway and used to store data services uses and device activities, which may be used with permission rules to determine allowed activities. Thus, at step 150, the data center writes one or more signed activity records to Activity Log 40 (e.g., optionally in a signed and/or encrypted fashion as discussed in reference to FIG. 3a), which may correspond to a central repository for all data collected from Mobile Communications Device 20.

Figure 3S:
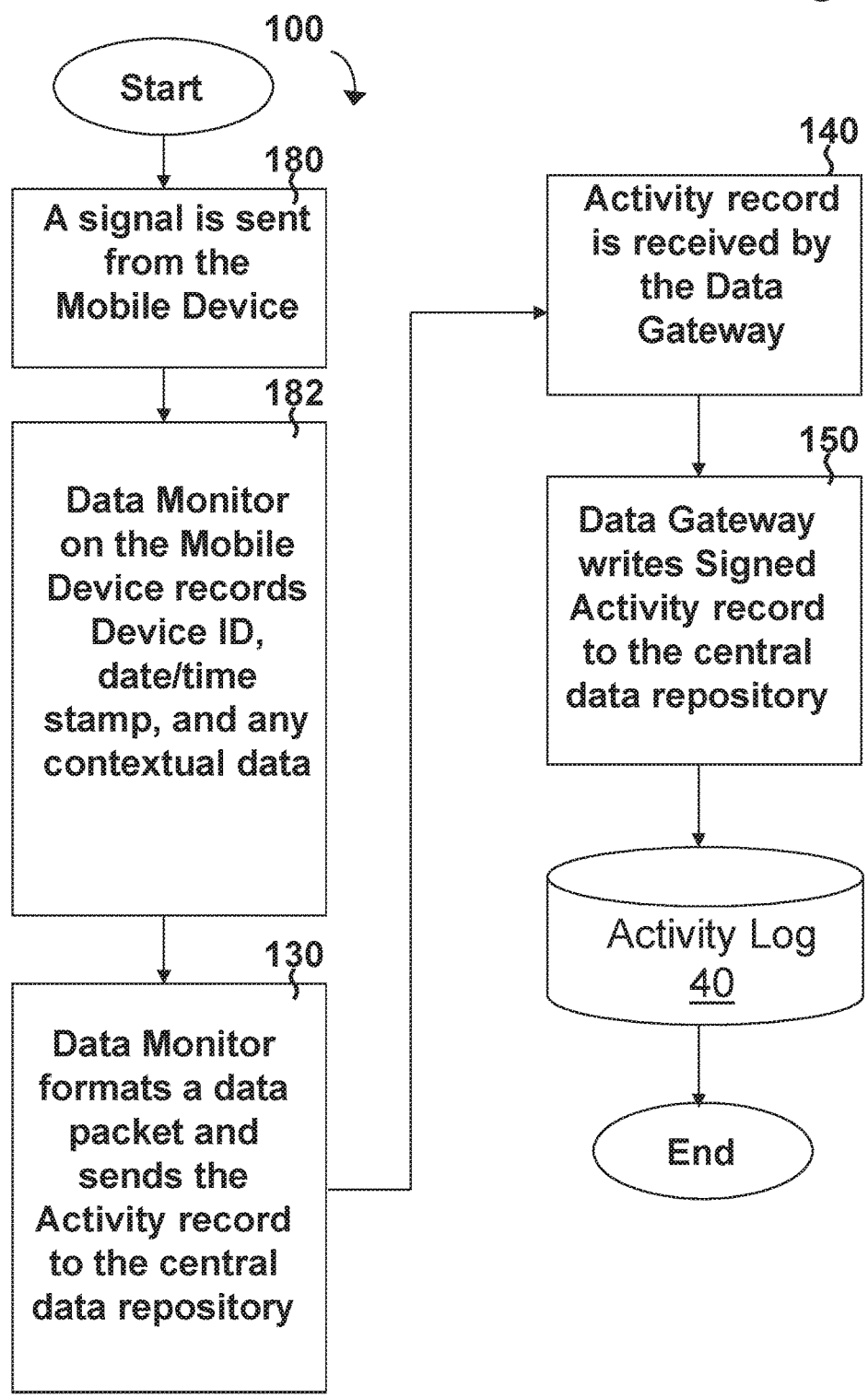

FIG. 3S illustrates a data flowchart for the detection of Token Device 8 by Data Monitor 21 on Mobile Communications Device 20 and determination of data services uses and activities of Mobile Communications Device 20 while in proximity to Token Device 8. Initially, at step 180, Mobile Communications Device 20 broadcasts a signal, such as a wireless signal that is detectable by other nearby devices including Token Device 8. In other embodiments, Mobile Communications Device 20 may be detectable by Token Device 8 instead by a signal broadcast by Token Device 8, such as a query that Mobile Communications Device 20 is responsive to with an ID for Mobile Communications Device 20. At step 180, Mobile Communications Device 20 and Token Device 8 may connect and share data, for example, an ID for Mobile Communications Device 20 and/or Token Device 8, as well as permission rules associated with Token Device 8 for enforcement on Mobile Communications Device 20 in various embodiments. At step 182, Token Device 8 records information on data services uses, such as application and/or hardware usage, and activities of Mobile Communications Device 20, for example, using Data Monitor 21. The activities may correspond to current location of Mobile Communications Device 20, time of usage of Mobile Communications Device 20, or other parameter related to a user's activity with Mobile Communications Device 20. At step 130, Data Monitor 21 on Token Device 8 formats a data packet for the recorded data, and sends the data packet to Data Center 17 for recording in a central data repository. For example, at step 130 the data packet may be sent to the central data repository for use with permission rules to be enforced on Mobile Communications Device 20. In various embodiments, the permission rules may be enforced through transfer of the rules to Mobile Communications Device 20 and/or configuration of Mobile Communications Device 20 over a wireless connection by the data center and/or Token Device 8. Additionally, in further embodiments, Data Monitor 21 of Mobile Communications Device 20 may retrieve the permissions rules using an ID of Token Device 8 sent to Data Monitor 21 during step 180. The rules may affect Mobile Communication Device 20 in order to prevent, restrict, or allow usage of an application or device, such as Mobile Communications Device 20. At step 140, an activity record is received by the Data Gateway and used to store data services uses and device activities, which may be used with permission rules to determine allowed activities. Thus, at step 150, the data center writes one or more signed activity records to Activity Log 40 (e.g., optionally in a signed and/or encrypted fashion as discussed in reference to FIG. 3a), which may correspond to a central repository for all data collected from Mobile Communications Device 20.

One aspect of the monitoring capabilities in accordance with one or more embodiments of the present invention is the ability for the application to successfully log the activity that is occurring on Mobile Communications Device 20 into a centrally located Activity Log 40. An exemplary structure for Activity Log 40 database is shown in tabular form in FIGS. 4A and 4B in accordance with an embodiment of the present invention.

The first column identifies a unique key (referred to in FIG. 4A as a record ID) that is automatically assigned to each row of the database. This is followed by a unique account ID which identifies the account associated with the log record, the data service that was invoked (referred to in FIG. 4A a message type), and whether the communication was inbound (in) or outbound (out) from the Mobile Communications Device 20. The Start Time is a date/time stamp identifying the start of a call or completion of a data service or financial transaction. The End Time is a date/time stamp identifying the completion of a call.

The Caller ID field shows the originating phone number, email address, merchant ID or username for inbound communications or data service uses and the destination phone number, email address, merchant ID or username for outbound communications or data service uses. The Log field collects contextual information regarding the transaction which can include the contents of an email message, instant message, text message, debit or credit card transaction details (e.g., an amount or a card name or other card identifier), or any other form of information in accordance with some embodiments, including audio, photo, video, textual data, and/or multimedia information.

The remaining fields found in FIG. 4B are supplemental data elements associated with a data transaction with a mobile device such as Mobile Communications Device 20 in accordance with one or more embodiments of the present invention. These data elements are optional and may be implemented and may be used, for example, for legal proceedings and other supplemental applications. The Long field shows the Longitude of the phone at the time of the transaction. The Lat field shows the Latitude of the phone at the time of the transaction (e.g., information provided by GPS, cell-based location applications, or network-based location applications as discussed previously herein). The CRC (cyclic redundancy code) field is the digital signature information of the database record to ensure its authenticity (e.g., as discussed in reference to FIG. 3a), which may be used to provide the CRC checksum or other types of error-detecting code information desired. The Auth field is the method of authentication used such as Biometric, password, no authentication (N/A), none, etc. The Auth ID field (e.g., authorization identification) is the identity of the person that authorized the transaction. The Carrier Log Auth field (e.g., authorization field) is the record number of the carrier's accounting system which relates to the transaction (e.g., cell phone carrier, financial transaction entity, or other data communication provider information as discussed in reference to, for example FIG. 1, depending on the type of data communication and/or financial transaction).

The rules that govern the access to data services on Mobile Communications Device 20 are maintained, for example, in Permissions 50 database. In accordance with an embodiment of the invention, this database would be accessible by the owner of the account using an HTML web interface. An exemplary structure for Permissions 50 database is shown in tabular form in FIG. 5 in accordance with an embodiment of the present invention.

The first column identifies a unique key that is automatically assigned to each row of the database. This is followed by a unique account ID which identifies the account associated with the permission record. The next field lists the data service for which the rules are to be applied, followed by the specific rules as to allow or deny access to that data service on the Mobile Communications Device 20.

As an example, a value of true in the Allow column would allow the use of that data service for any entry found in the address book on the Mobile Communications Device 20, while a value of true in the Deny column would deny the use of that data service for any entry not found in the address book on the Mobile Communications Device 20. As another example, in accordance with an alternate embodiment of the present invention, would be to allow or deny use of the data service based on the contextual content of the message.

The Alert Type and alert number fields identify the corresponding preferred method of alert notification and related contact information (e.g., email address, phone number, etc. to use to provide the alert). Multiple rows in the database for the same Account and Data Service would be used to alert multiple users of an unauthorized event as exemplified in Record ID rows 103 and 104 of FIG. 5 in accordance with an embodiment of the present invention.

As shown in FIG. 5, permissions database 50 may include rules associated with financial transactions as exemplified in Record ID row 107 of FIG. 5 associated with a "Wallet" data service (e.g., a wallet application such as a digital or mobile wallet application that executes some or all of a financial transaction associated with, for example, a mobile communications device).

Figure 6B:
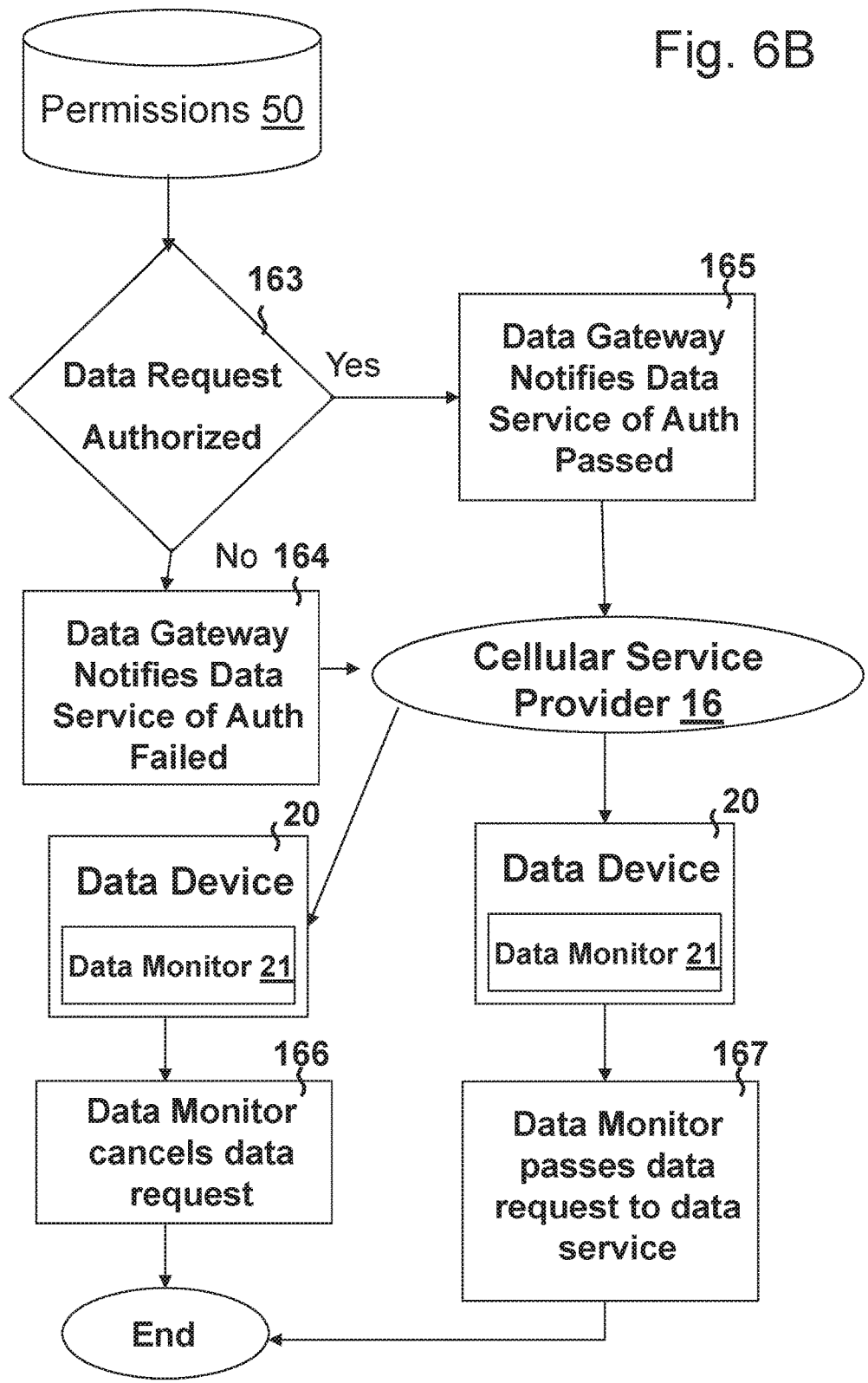

FIGS. 6A and 6B illustrate exemplary data flowcharts in accordance with an alternative embodiment of the invention where the contextual content of the communication is checked against permissions 50 database prior to allowing Mobile Communications Device 20 access to the data services 22 through 29 and 31. Initially, in step 160, one or more data services 22 through 29 and 31 may be initiated on Mobile Communications Device 20. In step 161, Data Monitor 21 recognizes that a data service has been initiated and begins to capture information regarding the use of the data service including, for example, the unique Device ID of Mobile Communications Device 20, the date/time stamp, the originating or destination phone number, email address, or username, and/or the contextual content of the data packet.

Once the request for a data service has been received (Step 130), Data Monitor 21 formats a data packet which includes the collected information (Activity Record) and sends one or more data packets to the central repository located in Data Center 17. In step 140, Data Gateway 30 located in Data Center 17 receives the data packet(s) and then checks the content of the data packet(s) in step 162 against Permissions 50 database located in Data Center 17. If the data request was not authorized (step 163), Data Gateway 30 notifies (step 164) Mobile Communications Device 20 by sending a message through Cellular Service Provider 16 to Data Monitor 21 on Mobile Communications Device 20. In Step 166, Data Monitor 21 cancels the data service request. If the data request was authorized (step 163), Data Gateway 30 notifies (step 165) Mobile Communications Device 20 by sending a message through Cellular Service Provider 16 to Data Monitor 21 on Mobile Communications Device 20. In Step 167, Data Monitor 21 completes the authorized data service request.

Figure 6C:
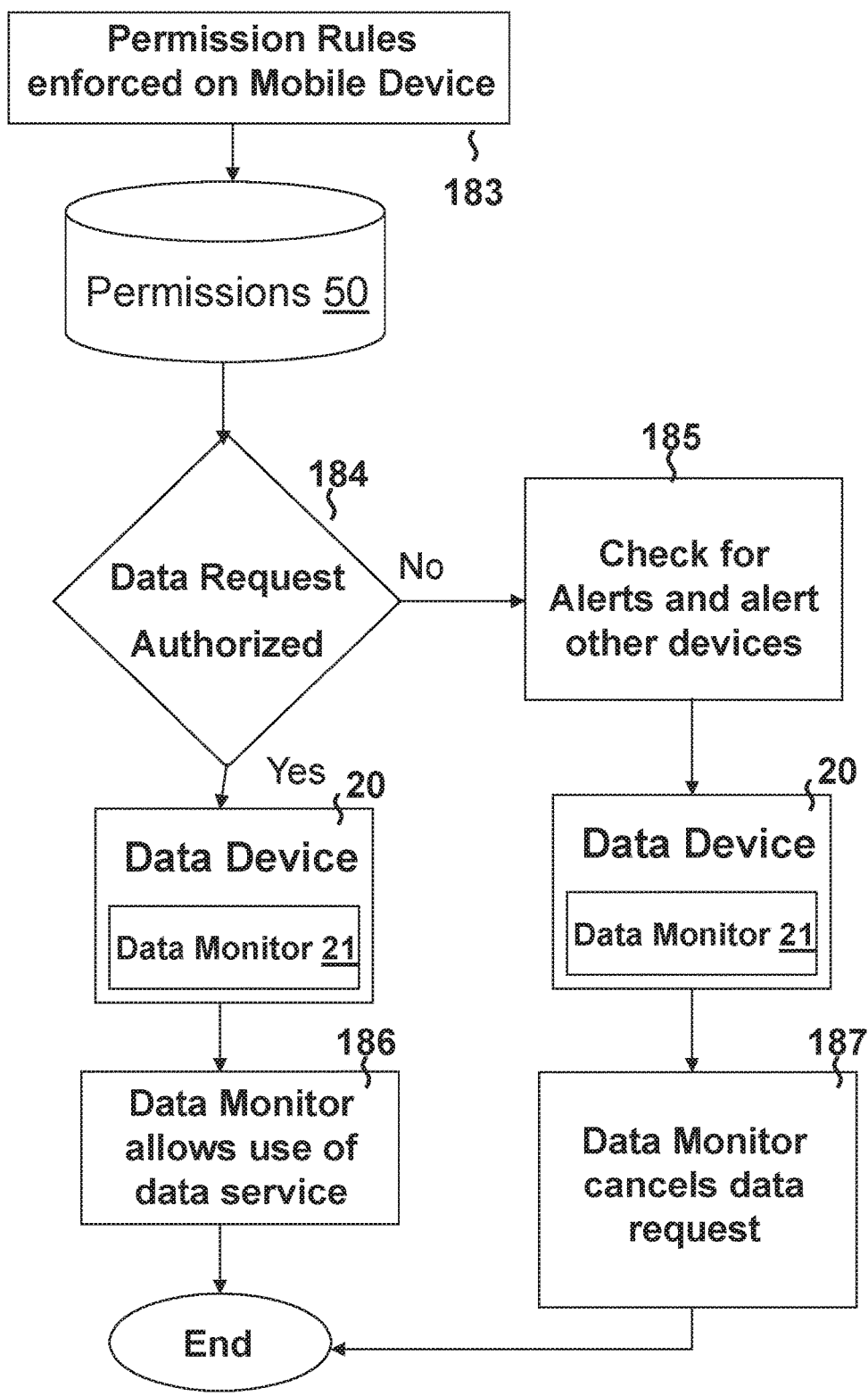

FIG. 6C illustrate an exemplary data flowchart in accordance with an embodiment of the invention where a token device is used to enforce permission rules on a mobile device, for example, in the flowchart of FIG. 3R. In FIG. 6C, the permission rules for Mobile Communication Device 20 may be stored locally to a data monitor on a data device, such as Token Device 8 and/or Mobile Communication Device 20. For example, instead of Data Center 17 acting as the enforcing entity for Mobile Communication Device 20, Data Monitor 21 may be local to Token Device 8 and/or Mobile Communication Device 20, where Data Monitor 21 stores the permission rules and enforces the permission rules on Mobile Communication Device 20. Thus, FIG. 6C includes an alternative embodiment from FIG. 6A and FIG. 6B where permission rules may be stored locally instead of at Data Center 17. In this regard, FIG. 6C displays an enforcements of rules on Mobile Communications Device 20 by Token Device 8 at step 183. Enforcement of the permission rules may include communicating the permission rules from Token Device 8 and/or Data Center 17 to Mobile Communication Device 20, or configuring Mobile Communication Device 20 by Token Device 8 and/or Data Center 17 using the permission rules.

Using the rules from permissions 50 database, a request for data authorization on Mobile Communications Device 20 is generated at step 184. For example, where Data Monitor 17 is one Token Device 8 and/or Mobile Communication Device 20, Data Monitor 21 may capture data corresponding to an event and identify an event occurring with Mobile Communication Device 20 that may be restricted and/or allowed based on permission rules. Thus, the data services use on Mobile Communications Device 20 with a corresponding activity may be determined to be allowed or restricted based on the rules. If the data request is unauthorized, at step 185, other devices are checked and alerted of the data request. Additionally, data monitor 21 prevents use of the data services use at step 187. However, if the data services use is allowed, at step 186, data monitor 21 allows the data services use based on the activity of Mobile Communications Device 20. In order to allow or prevent the activity/event, Data Monitor 21 on Token Device 8 may send the permissions to Mobile Communication Device 8, where Token Device 8 may further store the activity/event for later retrieval and/or communication to Data Center 17. Conversely, where Data Monitor 21 on Mobile Communication Device 20, Data Monitor 21 may request the permission rules from Token Device 8, where Mobile Communication Device 20 may store the activity/event for enforcement on Mobile Communication Device 20 and/or later retrieval and communication to Data Center 17.

Figure 7B:
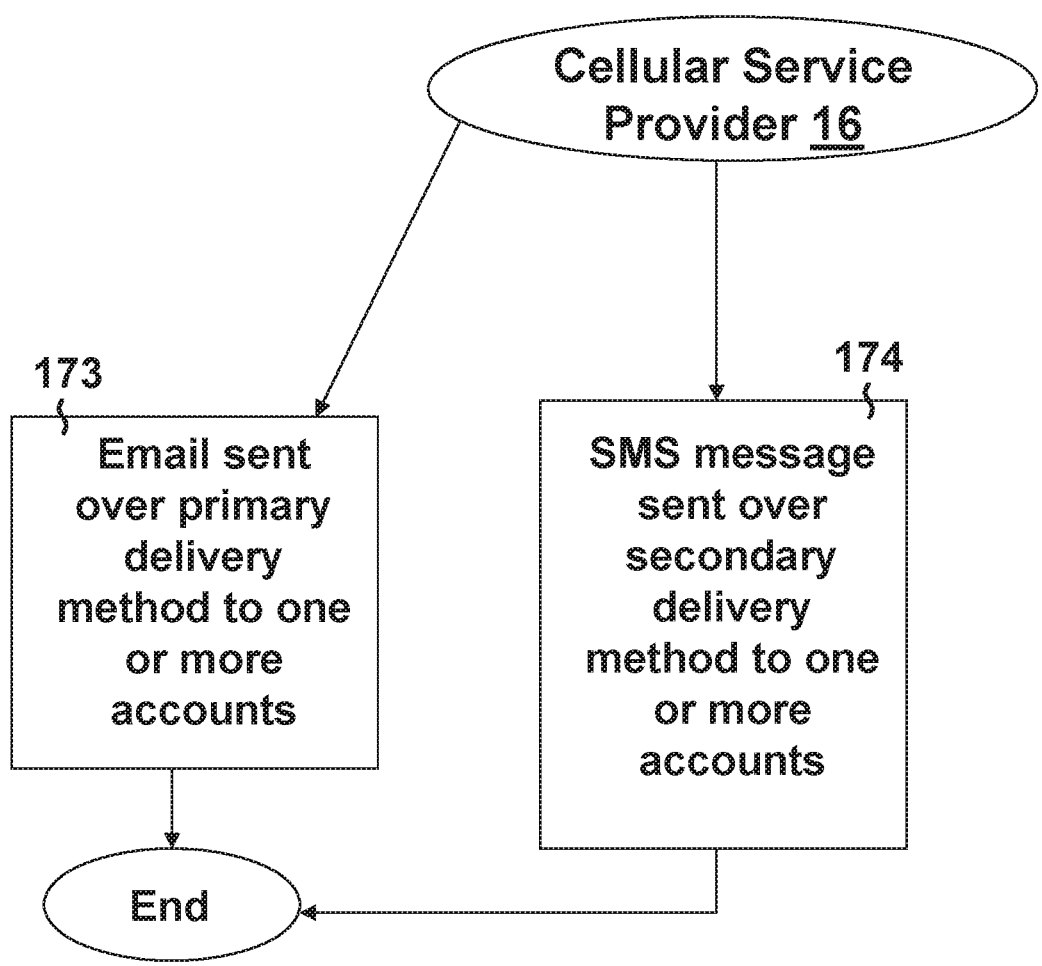

FIGS. 7A and 7B illustrate exemplary data flowcharts for the notification of unauthorized events on Mobile Communications Device 20 in accordance with an embodiment of the present invention. In Step 170, Alert Monitor 70 is monitoring the records being entered into Activity Log 40 database by Data Gateway 30. Each record is checked against Permissions 50 database. If the Log Activity is authorized (step 171), no further action is required.

If the Log Activity is not authorized (step 171), then Data Gateway 30 looks up the delivery notification method in Permissions 50 database (step 172) and sends an alert message via Cellular Service Provider 16 or alternately through any available communications network including for example PIN-to-PIN, Wi-Fi, Bluetooth, Personal Area Networks, Local Area Networks, and/or Public Networks (e.g., cellular networks, satellite networks, and/or the Internet) to one or more destinations. As an example, step 173 identifies an email message being sent to one of the users of the account while step 174 identifies an SMS text message being sent to an alternate user of the account. In accordance with one or more embodiments of the present invention, many forms of data communications may be supported, including for example voice messages, SMS Text Messages, email or any other publicly accepted machine-to-machine communications protocol.

FIG. 8 illustrates an exemplary data flowchart for the reporting or exporting of information stored in the Activity Log 40 database in accordance with one or more embodiments. For example, an administrator (e.g., user) of the application or system (e.g., of Data Center 17) may view the contents of Activity Log 40 and request an Activity Report 90 from the system (step 175). Alternatively or in addition, the administrator may be requested or may identify a situation where the content of Activity Log 40 contains evidence of a criminal act and is reported (step 176) via an electronic transmission to a Law Enforcement agency 95.

For example, the administrator may discover a photograph of child pornography (or other illegal activity) captured in a Multimedia Messaging Service (MMS) message provided to the monitored mobile phone (e.g., Mobile Communications Device 20). This photograph along with the message headers, identifying source IDs and other evidentiary information may be filed, for example, electronically with the Center for Missing and Exploited Children or to the appropriate government agency. In general in accordance with one or more embodiments, Activity Report 90 and/or information provided to Law Enforcement agency 95 may satisfy chain of custody or other forms of custody of evidence requirements with respect to authenticity of the record or other information due to the signing (and possible encryption) of the information as discussed previously (e.g., in reference to FIGS. 3A-3Q). Thus as disclosed herein, a report containing authenticating data may be generated (e.g., from activity logs) between Mobile Communications Device 20 and a third party, which may be utilized for example by the party monitoring Mobile Communications Device 20 and/or by law enforcement authorities or other entities (e.g., agencies or organizations) lawfully provided with the report.

As disclosed herein, systems, methods, and program products are disclosed, in accordance with one or more embodiments of the present invention, which are directed to monitoring the communications to and from a wireless data device. For example in accordance with an embodiment, each of the data services on a wireless device, such as a cell phone, a Smartphone, a personal digital assistant (PDA), or a tablet, may be monitored against the permissions (e.g., rules) stored in a central repository. Data services may include all forms of communications between the device and a third party including, for example, cellular voice calls, short message service (SMS) text messages, email, instant messaging sessions, and/or the applications used by the data services including, for example, the address book, calendar, financial transactions and tasks maintained on the wireless device.

For example in accordance with one or more embodiments, a client application installed on a mobile communications device, such as for example a cell phone, PDA, or tablet, transmits detailed device usage information and activities, such as locations and other parameters of use of the mobile communication device, using a wireless data connection from the device to a central repository. Alternatively or in combination with the client application installed on a mobile communications device, in accordance with one or more embodiments, a network data monitor may be installed on a communications network communicating with the mobile communications device to monitor and collect the detailed mobile communications device usage information to provide to the central repository. The communications network may represent a network of a cellular service provider or any other type of communications network (e.g., any standards or protocols) including for example PIN-to-PIN, Wi-Fi, Bluetooth, Personal Area Networks, Near Field Communication, Local Area Networks, and/or Public Networks (e.g., cellular networks, satellite networks, and/or the Internet). A mobile application may process or otherwise execute some or all of the processes of the mobile application using a combination of hardware (e.g., a smart chip, camera, input device, etc.), software, and communications networks and protocols. Systems and methods disclosed herein may be used to manage access to and use of a mobile application based on any suitable combination of hardware, software, and/or communications protocols that are used to execute a transaction.

Figure 9:
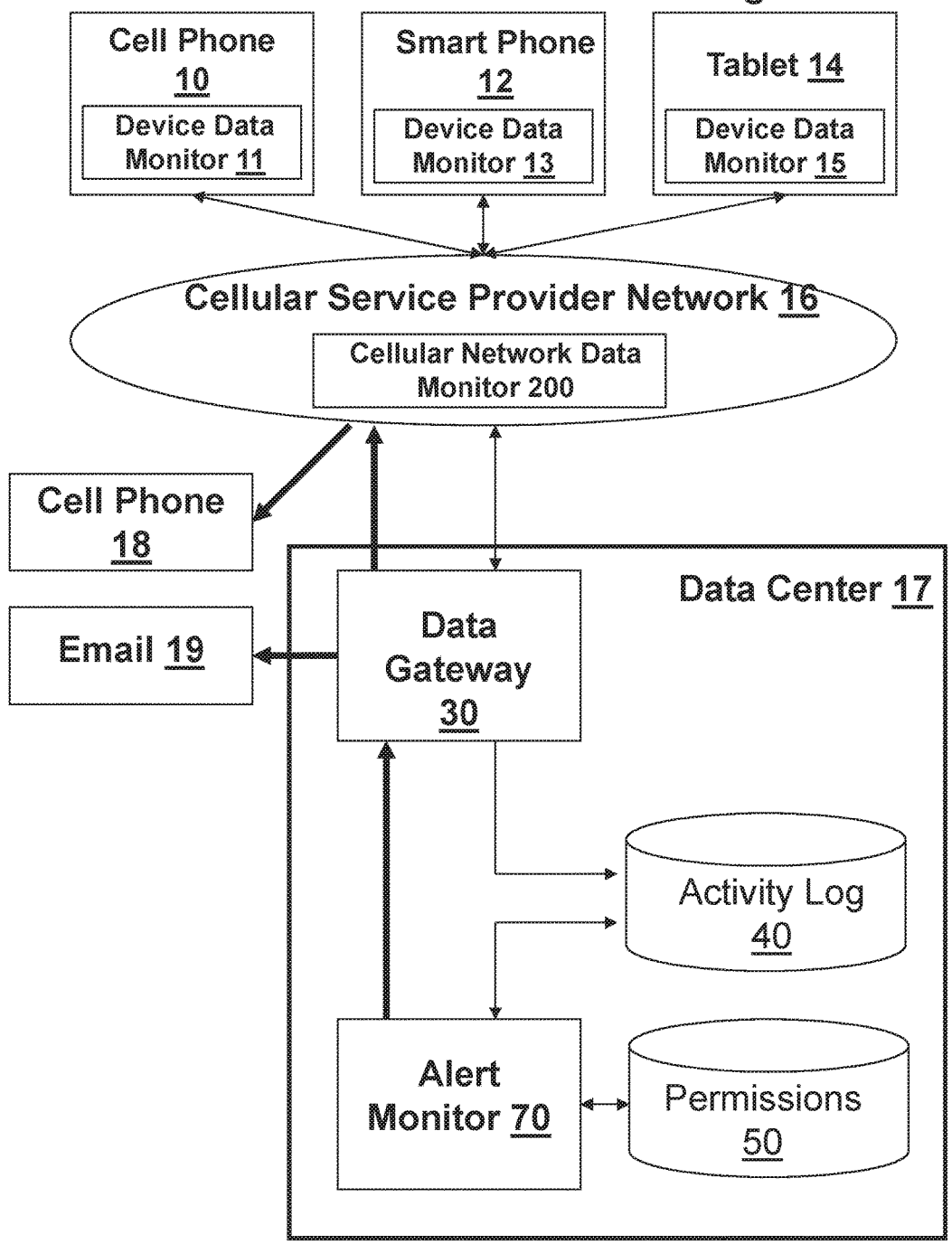
FIG. 9 is a block diagram of a system illustrating techniques to monitor the activities on a wireless device via data monitoring on the wireless device and/or on a carrier network in accordance with an embodiment of the present invention.

As an example, FIG. 9 is a block diagram of a system illustrating techniques to monitor the activities on a wireless device via data monitoring on the wireless device and/or on a communication network (e.g., carrier network) in accordance with an embodiment of the present invention. As can be seen, FIG. 9 is similar to FIG. 1, but further includes a Network Data Monitor 200 (e.g., a cellular-based network data monitoring program tool). Network Data Monitor 200 may be viewed as functioning and implemented in a similar fashion as described for Data Monitoring program tools 11, 13, or 15, but is located within the communications network (e.g., of Cellular Service Provider 16) rather than located within corresponding wireless device (e.g., mobile communications device) 10, 12, or 14. For example, Network Data Monitor 200 may represent software run by a logic device (e.g., a processor) of Cellular Service Provider 16 or a hardware-based logic device of Cellular Service Provider 16.

Network Data Monitor 200 monitors the data services on wireless devices 10, 12, and 14 via communications between wireless devices 10, 12, and 14 and Cellular Service Provider 16 and provides the information collected on data services use to Data Gateway 30. Therefore, Network Data Monitor 200 may monitor and collect the various information on data services use for the various wireless devices (e.g., wireless devices 10, 12, and 14) communicating with Cellular Service Provider 16 and provide this information to Data Center 17 (e.g., via Data Gateway 30 or through any available communications network) such that this information can then be logged, processed, and analyzed in a similar fashion as described herein in reference to FIGS. 1-8.

In accordance with an embodiment, Network Data Monitor 200 may perform the data services use monitoring solely for a wireless device (e.g., wireless device 10) whether or not that wireless device has a Device Data Monitor programming tool (e.g., Device Data Monitor 11). Alternatively in accordance with an embodiment, Network Data Monitor 200 may perform the data services use monitoring solely for a wireless device (e.g., wireless device 10) only if that wireless device does not have a Device Data Monitor programming tool (e.g., Device Data Monitor 11). Alternatively, in accordance with an embodiment, Network Data Monitor 200 may perform the data services use monitoring for a wireless device (e.g., wireless device 10) in combination with the Device Data Monitor programming tool (e.g., Device Data Monitor 11) of the wireless device.

Figure 10:
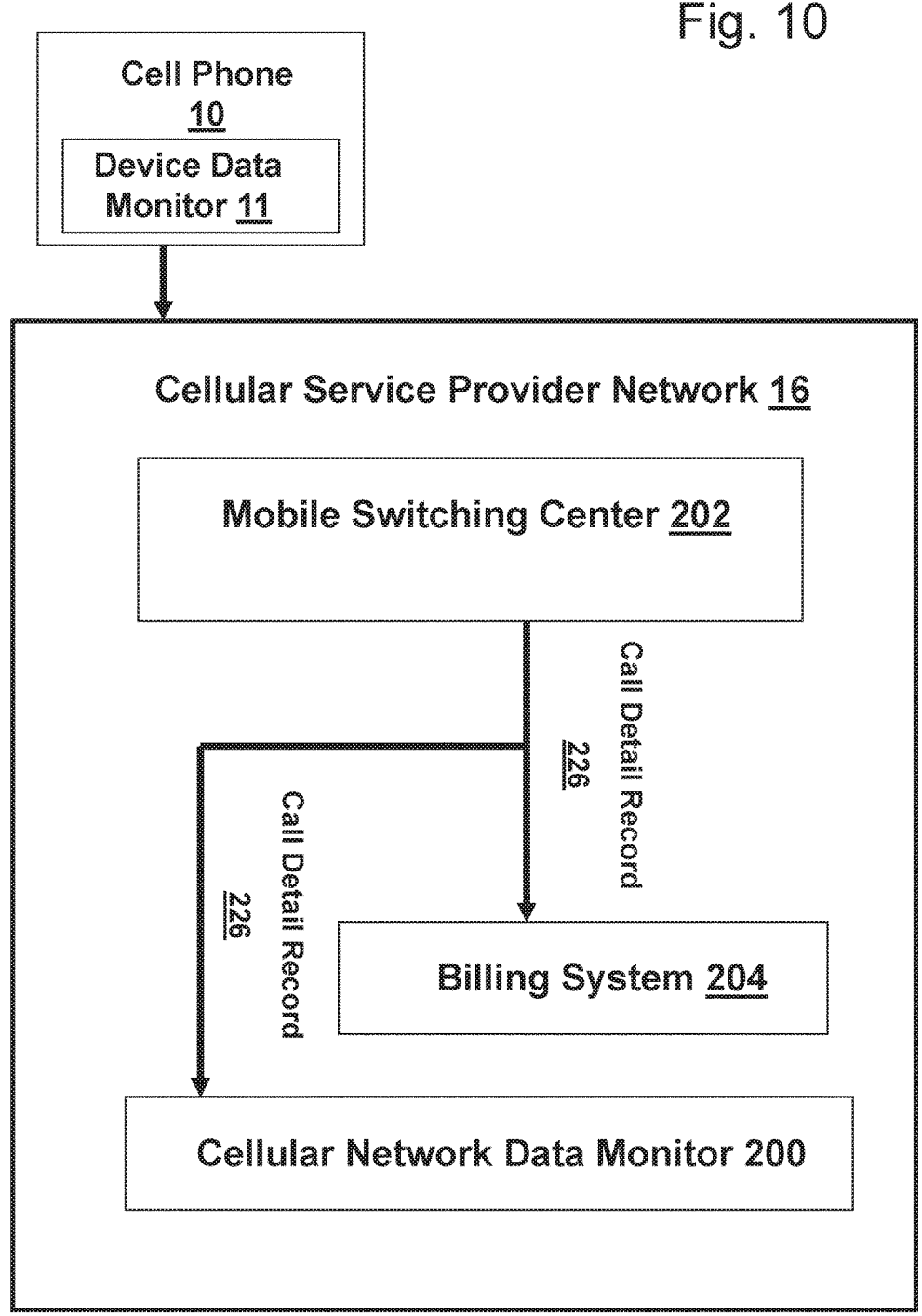
FIG. 10 is a block diagram as an example of a specific system illustrating a monitoring tool associated with a mobile communications device and/or the carrier network in accordance with an embodiment of the present invention.

FIG. 10 is a block diagram as an example of a specific system illustrating monitoring tools associated with a mobile communications device and/or the carrier network in accordance with an embodiment of the present invention. Specifically, FIG. 10 illustrates an example implementation of Network Data Monitor 200 within the network of Cellular Service Provider 16 to monitor data services use for one or more wireless devices (e.g., such as wireless device 10, which optionally may include Device Data Monitor 11).

Cellular Service Provider 16 includes a Mobile Switching Center 202, a Billing System 204, and Network Data Monitor 200. All telephone and SMS is routed through Mobile Switching Center 202 that generates a Call Detail Record (CDR) 226 associated with supporting the communication (e.g., switching or routing the telephone call or data packet (e.g., SMS message)) of wireless device 10. The Call Detail Record 226 (e.g., CDR packet) may then be provided to Billing System 204 of Cellular Service Provider 16 for billing purposes, as would be understood by one skilled in the art. The Call Detail Record 226 may also be provided to Network Data Monitor 200 (e.g., by providing a copy of the Call Detail Record 226 (e.g., CDR packet) via a switch splitter or port spanning (e.g., at the hardware layer)).

Network Data Monitor 200 may then use the Call Detail Record 226 to monitor the data services use of wireless devices (e.g., wireless device 10) using Cellular Service Provider 16 and to provide the information on the data services use to Data Center 17 to perform the various functions as discussed herein (e.g., in reference to FIGS. 1-8). Consequently, for one or more embodiments, the data services use monitoring techniques disclosed herein may be performed solely by Network Data Monitor 200, solely by Device Data Monitoring program tool 11 (if present), and/or by the combination of Network Data Monitor 200 and Device Data Monitoring program tool associated with the particular wireless device (e.g., wireless device 10 with Device Data Monitoring program tool 11) utilizing Cellular Service Provider 16.

Figure 11:
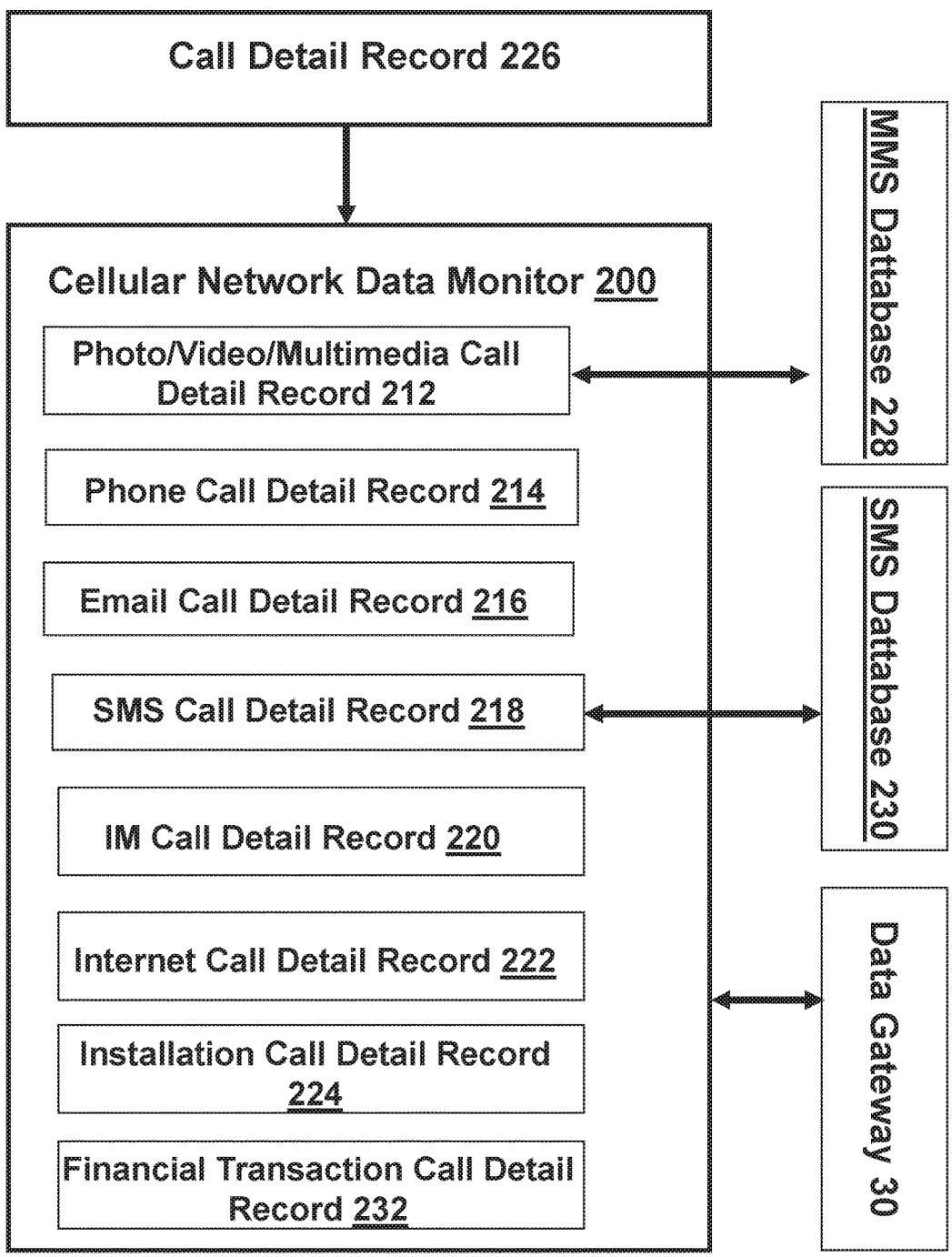
FIGS. 11 and 12 are block diagrams as examples of specific systems illustrating a monitoring tool associated with a mobile communications device and/or the carrier network in accordance with one or more embodiments of the present invention.
Figure 12:
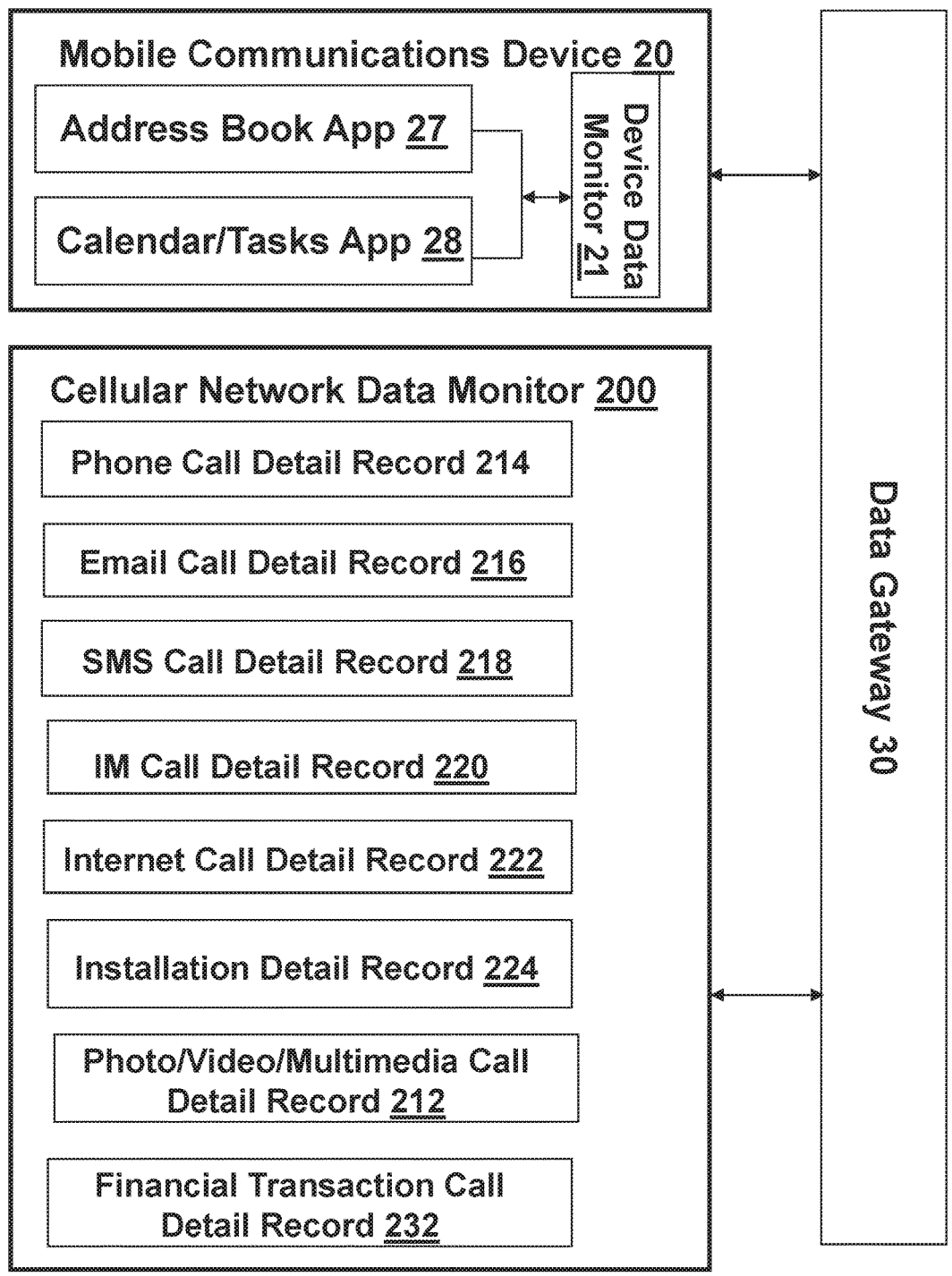

FIGS. 11 and 12 are block diagrams as examples of specific systems illustrating monitoring tools associated with a mobile communications device and/or the carrier network in accordance with one or more embodiments of the present invention. As a specific example for an embodiment, FIG. 11 illustrates Network Data Monitor 200 used to extract various data services use information from Call Detail Record 226.

As shown in FIG. 11, Network Data Monitor 200 may monitor and compile information on various data service uses, such as for example with respect to photos, videos, and multimedia (e.g., Photo/Video/Multimedia Call Detail Record 212), telephone calls (e.g., Phone Cal Detail Record 214), email (Email Call Detail Record 216), SMS communications (e.g., SMS Call Detail Record 218), IM communications (e.g., IM Call Detail Record 220), Internet use (e.g., Internet Call Detail Record 222), Application installations (e.g., modifications, deletions, additions, or Installation Call Detail Record 224) and/or financial transactions (e.g., Financial Transaction Detail Record 232). In general, Network Data Monitor 200 may monitor various data service uses to obtain the desired information for each wireless device in a similar fashion as described in reference to FIG. 2 for Data Monitor 21 (for the various examples of data service uses, such as Phone Application 22 through Photo/Video/Multimedia 31 and/or Wallet Application 33). Depending upon the desired application and specific implementation, prior to providing the data service use information to Data Center 17 (e.g., via Data Gateway 30), Network Data Monitor 200 may be able to extract all of the data service use information desired directly from Call Detail Record 226 or may utilize various databases as required to obtain the desired data service use information (e.g., such as when the source information is being received or transferred from within the carrier network rather than directly from the wireless device, as would be understood by one skilled in the art).

For example, for Photo/Video/Multimedia Call Detail Record 212, Network Data Monitor 200 may utilize an MMS Database 228 (e.g., of Cellular Service Provider 16) to obtain the desired data service use information associated with an MMS payload. As another example, for SMS Call Detail Record 218, Network Data Monitor 200 may utilize an SMS Database 230 (of Cellular Service Provider 16) to obtain the desired data service use information associated with an SMS payload. As another example, for address book, calendar, or task applications, the data services use may be monitored by Network Data Monitor 200 via Call Detail Record 226 if the associated wireless device synchronizes with the corresponding address book, calendar, or task database (e.g., as described in reference to FIGS. 3J-3L).

As another specific example for an embodiment, FIG. 12 illustrates Network Data Monitor 200 and Device Data Monitor 21 used in combination to extract various data services use information (e.g., associated with wireless device 20). As shown for example, Network Data Monitor 200 functions in a similar fashion as described in reference to FIG. 11 to obtain from Call Detail Record 226 (and various databases as needed, such as for MMS or SMS information) various data services use information to provide to Data Gateway 30. Additionally as an example, Device Data Monitor 21 within wireless device 20 functions in a similar fashion as described in reference to FIG. 2 to monitor wireless device 20 and provide various data services use information (e.g., Address Book Application 27 and Calendar/Task Application 28) to Data Gateway 30. The data services use information provided by Network Data Monitor 200 and Device Data Monitor 21 to Data Center 17 (e.g., via Data Gateway 30) may be utilized as described further herein (e.g., in reference to FIGS. 1-8).

In accordance with one or more embodiments of the present invention, the monitoring of the data services usage of a wireless device (e.g., a mobile communications device) may further provide certain benefits to a user (or owner) of the mobile device. For example, as discussed herein, the monitoring of various data services use and activities may include monitoring access to information and/or usage associated with various data services, which may be performed with a token device used to provide permission rules to the data services use and activities. Therefore, a breach of a permission rules related to use of a mobile device when connected to the token device or after connection to the token device may be prevented by monitoring attempts to access information associated with various data services and blocking access to the information or data services use if an attempt violates a rule (e.g., as set forth in Permissions database 50 and for example as described in reference to FIGS. 4-7B).

As a specific example, if an application within the wireless device (e.g., wireless device 20) attempts to gain access to privileged user information and/or services without the user providing permission, the attempt to gain access may be blocked. For example, a particular application may attempt to access the user's telephone book, address book, email records, mobile wallet, or Internet use history without authorization, which may be blocked or the user notified by implementing the techniques disclosed herein. Specifically, the monitoring of this particular data service use (e.g., by Device Data monitor 21 and/or Network Data Monitor 200) may allow the unauthorized access attempt to privileged user information to be blocked using the techniques disclosed herein (e.g., as discussed in reference to FIGS. 5 and 6B) and/or to alert the user of the unauthorized activity (e.g., as discussed in reference to FIGS. 7A-7B).

As another specific example, if a user visits an application store from a wireless device (e.g., wireless device 20) and attempts to make a mobile application purchase using the mobile wallet (e.g., Wallet Application 33), the attempt to complete the transaction or download the application may be blocked for violating one or more rules (e.g., as set forth in Permissions database 50), as enforced on the wireless device through a token device. For example, the administrator of the wireless device may have restricted the transfer of funds to or from a known IDENTITY (e.g., your child's friend Tom or a store such as Target®), block the purchase and/or download from a known IDENTITY (e.g., application store iTunes®), and/or block specific products from a known IDENTITY (e.g., iTunes Videos®) after the wireless device connects to the token device. Specifically, the monitoring of this particular data service use (e.g., by Device Data monitor 21 and/or Network Data Monitor 200) may allow the unauthorized attempt to access funds in a mobile wallet to be blocked using the techniques disclosed herein (e.g., as discussed in reference to FIGS. 5 and 6B) and/or to alert the user of the unauthorized activity (e.g., as discussed in reference to FIGS. 7A-7B).

As discussed herein (e.g., in reference to FIG. 5), the particular rules within Permission database 50 that govern access and other data services use rights may be set by one or more entities (e.g., an administrator, such as the user, parent/guardian of the user, and/or owner/employer) as appropriate for the specific implementation associated with the wireless device. For example, the administrator may set various rules via the wireless device (e.g., by providing an appropriate password) and/or via a web user interface or by various conventional techniques, as would be understood by one skilled in the art. Furthermore, the rules may be applied to one or more wireless devices under an administrator's control (e.g., a family policy of rules or corporate rules applied to a number of wireless devices).

In general (e.g., in reference to FIG. 12), Device Data Monitor 21 may be used to capture the data service activity on a Mobile Communications Device 20 and Network Data Monitor 200 (e.g., Cellular Network Data Monitor) may be used to capture the data service activity originated or sent to a Mobile Communications Device 20 via the Cellular Service Provider 16 in accordance with an embodiment of the present invention. As discussed herein, alternatively or in combination with Device Data Monitor 21, Network Data Monitor 200 monitors the inbound and outbound activity for each of the data services captured at the Cellular Service Provider 16 and sends a detailed log of these activities to a central repository using Cellular Service Provider 16. Network Data Monitor 200 (e.g., Network Data Monitor 200 program tool) may send the activity information through any available communications network, such as for example the Internet, a company network, and/or a public cellular network.

As would be understood by one skilled in the art, embodiments of the present invention provide certain advantages over conventional approaches. For example, a conventional approach may simply provide parental controls, which monitor and block Internet and email access from a Smartphone (i.e., having similar capabilities to a desktop computer) and which primarily prevent access to unwanted content or block the transmission of personally identifiable information. However, a traditional cell phone (i.e., non-Smartphone) may not provide access to vital mobile communication device services such as phone and SMS logs or may contain other limitations inherent to the operating system of these older legacy-type of phones.

In contrast to these conventional approaches and limitations, in accordance with one or more embodiments, Network Data Monitor 200 would augment (or overcome) these limitations by capturing the data at the Cellular Service Provider 16. For example, most legacy cell phones allow the user to send and receive text messages, but the contextual information related to the text message transmission is stored in a Call Detail Record used by the Cellular Service Provider to route the message through its internal network for billing and eventual delivery to the intended recipient. Both the legacy phone as well as the internal carrier network can provide the SMS service, but do not inherently include parental or administrative controls.

As another example of a conventional approach, child and employee monitoring of geographic location may be provided from a cell phone, but this approach typically requires an active search by the administrator, parent or manager to locate the device. Perimeter boundaries or virtual fencing could be deployed using existing location technology, but in combination with other data services activity and usage of wireless token devices, a much more refined forensic alert system can be deployed, which may be location limited for an area associated with the wireless token device.

For example, an employee being in the file room may be within the parameters of the virtual fence established based on the wireless communication range of a wireless token device. Furthermore, taking a picture from a cell phone may be an acceptable activity in accordance with corporate acceptable use policies. However, taking a picture while located within the file room may be reason for concern, especially if followed by sending the picture to a non-corporate destination, which may require immediate attention by internal security personnel.

For example, the GPS information may be provided by Device Data Monitor 21 to Data Center 17, where it is stored in activity log 40, and an alert provided to the administrator if the Mobile Communications Device 20 enters a restricted area or proceeds outside of a defined geographic region. In other embodiments, Mobile Communication Device 20 may have permission rules enforced on Mobile Communication Device 20 through a token device, where Device Data Monitor 21 utilizes the rules on Mobile Communication Device 20. In general, Device Data Monitor 21 permits an administrator (e.g., parent or manager) to monitor and control the activities (e.g., location, communications with a third party, and/or changes to applications or other data within Mobile Communications Device 20) of a user of Mobile Communications Device 20, with an optional alert provided to the administrator if an unauthorized activity occurs.

Embodiments described above illustrate but do not limit the invention. It should also be understood that numerous modifications and variations are possible in accordance with the principles of the present invention. Accordingly, the scope of the invention is defined only by the following claims.

What is claimed is:

1. A mobile communication device, comprising:
a memory configured to store mobile programs and program data associated with mobile applications;
a processor, coupled to the memory and configured to execute the mobile programs stored in the memory;
a communications port configured to wirelessly communicate with a wireless communication device; and
wherein the mobile applications comprise a monitoring program configured to:
receive permission rules on connection to the wireless communication device, wherein the permission rules comprise data services uses allowed using the mobile communication device based on activities of the mobile communication device, and wherein the permission rules are set by an administrator of the wireless communication device prior to the connection to the wireless communication device;
monitor device activity of the mobile communication device, wherein the device activity comprises at least one data services use for the mobile communication device based on at least one activity performed by the mobile communication device, and wherein the at least one activity comprises identification of the at least one data services use; and
determine whether the at least one data services use is allowed based at least in part on whether the identification of the at least one data services use is found in the permission rules for the data services uses allowed based on the activities of the mobile communication device.

2. The mobile communication device of claim 1, wherein the mobile programs comprises at least one of a mobile communication program, a social networking program, a financial program, a photo application, a video application, a multimedia application, a web browser application, and a connected device control application.

3. The mobile communication device of claim 1, wherein the monitoring program is further configured to:

compile the device activity into an activity log of data usage by the mobile communication device, wherein the data usage are generated in part by the at least one data services use; and
transmit the activity log to a data center of a service provider via the communications port;
wherein the service provider comprises an alert monitor program configured to:
alert a third party of the at least one data services use based on the permission rules.

4. The mobile communication device of claim 3, wherein the activity log further comprises the at least one activity and information for a connection between the mobile communication device and the wireless communication device, and wherein the alert monitor program further alerts the third party based on the at least one activity and the information.

5. The mobile communication device of claim 1, wherein the permission rules comprise at least one of application use allowed on the mobile communication device, hardware feature use allowed on the mobile communication device, operability of the mobile communication device, and presence of the mobile communication device.

6. The mobile communication device of claim 1, wherein the at least one data services use comprise one of an application opening, an application use, a request to access or use a device hardware feature, a device identifier, and a device signal response.

7. The mobile communication device of claim 1, wherein the at least one activity comprises at least one of a location of the mobile communication device, detection of the mobile communication device, a time of presence of the mobile communication device at the location, and a use of the mobile communication device at the location.

8. The mobile communication device of claim 1, wherein the wireless communication device comprises one of an RFID token device, a Bluetooth Low Energy beacon device, and an NFC token device.

9. The mobile communication device of claim 1, wherein the monitoring program is further configured to:
deactivate the at least one data services use if the at least one data services use is not allowed based on the permission rules.

10. The mobile communication device of claim 9, wherein the monitoring program is further configured to:
alert a third party of a use or attempted use of the at least one data services use on the mobile communication device.

11. The mobile communication device of claim 10, wherein the third party is further alerted of a location of the mobile communication device, and wherein the location is determined from one of the wireless communication device and a GPS locator device of the mobile communication device.

12. The mobile communication device of claim 1, wherein the monitoring program is further configured to:
activate or install an application the mobile communication device if the at least one data services use for the mobile communication device is allowed based on the at least one activity and the permission rules.

13. The mobile communication device of claim 12, wherein the monitoring program is further configured to:
alert a third party of the application activated or installed on the mobile communication device.

14. The mobile communication device of claim 1, wherein the monitoring program is further configured to:

connect to a separate device associated with the wireless communication device if the at least one data services use is allowed based on the permission rules.

15. The mobile communication device of claim 1, wherein the permission rules are received from the wireless communication device.

16. The mobile communication device of claim 1, wherein the permission rules are received from a service provider, and wherein the mobile communication device retrieves the permissions rules an identifier ID transmitted by the wireless communication device to the mobile communication device.

17. A method of using the system of claim 1, comprising:
receiving the permission rules on connection by the mobile communication device to the wireless communication device, wherein the permission rules comprise the data services uses allowed using the mobile communication device based on the activities of the mobile communication device;
monitoring the device activity of the mobile communication device, wherein the device activity comprises the at least one data services use for the mobile communication device and the at least one activity of the mobile communication device; and
determining whether the at least one data services use is allowed based at least in part on whether the at least one data services use with the at least one activity is found in the permission rules for the data services uses allowed based on the activities of the mobile communication device.

18. A wireless device comprising:
a non-transitory memory configured to store information associated with permission rules for data services uses allowed on a mobile communication device based on activities of the mobile communication device, wherein the permission rules are set by an administrator of the wireless device prior to connection with the mobile communication device by the wireless device;
a communications port configured to wirelessly communicate with the mobile communication device; and
a hardware processor coupled to the non-transitory memory and configured to read the non-transitory memory to:
detect the mobile communication device is in a proximity to the wireless device;
wirelessly connect to the mobile communication device through the communications port; and
configure the mobile communication device using the permission rules through the communications port, wherein at least one data services use is allowed or restricted based at least in part on whether an identification of the at least one data services use from at least one activity performed by the mobile communication device is found in the permission rules for the data services uses allowed based on the activities of the mobile communication device.

19. The wireless device of claim 18, wherein the information comprises one of the permission rules and an identifier (ID) used to retrieve the permission rules from a service provider.

20. The wireless device of claim 19, wherein the communications port comprises a passive antenna responsive to wireless signals, and wherein the passive antenna detects a signal from the mobile communication device and transmit the one of the permission rules and the ID to the mobile communication device.

21. The wireless device of claim 19, wherein the communications port comprises an active antenna configured to actively detect nearby devices through a wireless signal, and wherein the active antenna detects the mobile communication device through the wireless signal and pushes one of the one of the permission rules and the ID to the mobile communication device.

22. The wireless device of claim 18, wherein the wireless device is mounted in one of a secure file area, a secure room at a location, a vehicle, and a personal location.

23. The wireless device of claim 18, wherein the permission rules restrict at least one of a hardware feature, an application, an application process, use, and presence of the mobile communication device at a location associated with the wireless device.

24. The wireless device of claim 18, wherein the wireless device wirelessly connects to the mobile communication device through one of radio frequency communications, near field communications, Bluetooth communications, Bluetooth low energy communications.

25. The wireless device of claim 18, wherein the hardware processor is further configured to:
alert a third party of the at least one data services use with at least one activity of the mobile communication device at a location associated with the wireless device.

26. The wireless device of claim 18, wherein the hardware processor is further configured to:
detect the at least one data services use with at least one activity of the mobile communication device at a location associated with the wireless device,
wherein the mobile communication device is configured using the permission rules to prevent the at least one data services use with at least one activity at the location.

27. The wireless device of claim 18, wherein the hardware processor is further configured to:
detect the at least one data services use with at least one activity of the mobile communication device at a location associated with the wireless device,
wherein the mobile communication device is configured using the permission rules to activate or download an application for the at least one data services use with at least one activity at the location.

28. A method of using the system of claim 18, comprising:
detecting the mobile communication device is in the proximity to the wireless device;
wirelessly connecting to the mobile communication device through the communications port; and
configure the mobile communication device using the permission rules through the communications port, wherein the at least one data services use is allowed or restricted based at least in part on whether the at least one data services use with the at least one activity of the mobile communication device is found in the permission rules for the data services uses allowed based on the activities of the mobile communication device.

29. A method, comprising:
receiving an identifier (ID) for a wireless device, wherein a mobile communication device connects to the wireless device based on device activity of the mobile communication device, wherein the device activity comprises at least one data services use for the mobile communication device based on at least one activity performed by the mobile communication device, and wherein the at least one activity comprises identification of the at least one data services use;

retrieving the device activity from the mobile communication device;
accessing permission rules for at least one of the mobile communication device and the wireless device, wherein the permission rules comprise data services uses allowed using the mobile communication device based on activities of the mobile communication device; and wherein the permission rules are set by an administrator of the wireless device prior to connecting with the mobile communication device by the wireless device; and
determining whether the at least one data services use is allowed based at least in part on whether the identification of the at least one data services use is found in the permission rules for the data services uses allowed based on the activities of the mobile communication device.

30. The method of claim 29, wherein the wireless device comprises one of an RFID token device, a Bluetooth Low Energy beacon device, and an NFC token device.

31. The method of claim 29, further comprising:
configuring the mobile communication device to prevent the at least one data services use if the at least one data services use is not allowed based on the permission rules.

32. The method of claim 29, further comprising:
configuring the mobile communication device to activate or install an application associated with the at least one data services use if the at least one data services use is allowed based on the permission rules.

33. The method of claim 29, further comprising:
alert a third party of the at least one data services use with at least one activity of the mobile communication device at a location associated with the wireless device.

34. A system for implementing the method of claim 29, comprising:
a service provider for a mobile communication device;
a network data monitor associated with the service provider and configured to:
receive the ID for the wireless device, wherein the mobile communication device connects to the wireless device based on the device activity of the mobile communication device, wherein the device activity comprises the at least one data services use for the mobile communication device and the at least one activity of the mobile communication device;
retrieve the device activity from the mobile communication device;
access the permission rules for the at least one of the mobile communication device and the wireless device, wherein the permission rules comprise the data services uses allowed using the mobile communication device based on the activities of the mobile communication device; and
determine whether the at least one data services use is allowed based at least in part on whether the at least one data services use with the at least one activity is found in the permission rules for the data services uses allowed based on the activities of the mobile communication device.

35. A method comprising:
receiving input from an administrator for a wireless device, wherein the input comprises rules data for use of a mobile communication device in a proximity to the wireless device, and wherein the input is received by the wireless device from the administrator of the wireless device prior to the wireless device connecting with the mobile communication device;
establishing permission rules for the wireless device based on the input, wherein the permission rules comprise data services uses allowed using the mobile communication device based on activities of the mobile communication device;
connecting to the wireless device; and
configuring the wireless device with the permission rules, wherein the wireless device configures the mobile communication device to allow or restrict at least one data services use of the mobile communication device based at least in part on whether an identification of the at least one data services use from at least one activity performed by the mobile communication device is found in the permission rules for the data services uses allowed based on the activities of the mobile communication device.

36. The method of claim 35, further comprising:
receiving an alert from the wireless device, wherein the alert comprises a detection of a presence or use of the mobile communication device by the wireless device.

37. The method of claim 35, further comprising:
receiving updates to the permission rules; and
updating the permission rules on the wireless device with the updates.

38. An administrator device for implementing the method of claim 35, comprising:
a memory configured to store applications and the permission rules;
a processor, coupled to the memory and configured to execute the applications stored in the memory;
a communications port configured to wirelessly communicate with a wireless communication device; and
wherein the applications comprise a device data monitor program configured to:
receive the input from the administrator for the wireless device, wherein the input comprises the rules data for use of the mobile communication device in the proximity to the wireless device;
determine the permission rules for the wireless device using the input, wherein the permission rules comprise the data services uses allowed using the mobile communication device based on the activities of the mobile communication device;
connect to the wireless device; and
configure the wireless device with the permission rules, wherein the wireless device configures the mobile communication device to allow or restrict the at least one data services use of the mobile communication device based at least in part on whether the at least one data services use with the at least one activity of the mobile communication device is found in the permission rules for the data services uses allowed based on the activities of the mobile communication device.

* * * * *